(12) United States Patent
Zhu et al.

(10) Patent No.: US 12,376,104 B2
(45) Date of Patent: Jul. 29, 2025

(54) METHOD AND APPARATUS FOR RECEIVING DOWNLINK CHANNELS IN AN INTER-CELL SYSTEM

(71) Applicant: Samsung Electronics Co., Ltd., Suwon-si (KR)

(72) Inventors: Dalin Zhu, Richardson, TX (US); Eko Onggosanusi, Coppell, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 691 days.

(21) Appl. No.: 17/655,928

(22) Filed: Mar. 22, 2022

(65) Prior Publication Data
US 2022/0312455 A1 Sep. 29, 2022

Related U.S. Application Data

(60) Provisional application No. 63/314,161, filed on Feb. 25, 2022, provisional application No. 63/164,943, filed on Mar. 23, 2021.

(51) Int. Cl.
*H04W 72/1273* (2023.01)
*H04B 7/024* (2017.01)

(52) U.S. Cl.
CPC ........ *H04W 72/1273* (2013.01); *H04B 7/024* (2013.01)

(58) Field of Classification Search
CPC . H04W 72/1273; H04W 48/10; H04W 24/08; H04W 56/001; H04W 72/0446;
(Continued)

(56) References Cited

U.S. PATENT DOCUMENTS

2021/0111817 A1* 4/2021 Khoshnevisan ...... H04W 24/08

FOREIGN PATENT DOCUMENTS

| WO | 2020037207 A1 | 2/2020 |
| WO | 2020215108 A2 | 10/2020 |

OTHER PUBLICATIONS

Lenevo—R1-2100275: Enhancements on multi-TRP inter-cell operation Jan. 2021 (Year: 2021).*

(Continued)

*Primary Examiner* — Rina C Pancholi

(57) ABSTRACT

Apparatuses and methods for receiving physical downlink shared channel (PDSCH) or monitoring physical downlink control channel (PDCCH) candidate in an inter-cell system. A method for operating a user equipment includes receiving an indicator for inter-cell operation; receiving first information of one or more first synchronization signal blocks (SSBs) associated with a serving cell physical cell identity (PCI); and receiving second information of one or more second SSBs associated with a PCI different from the serving cell PCI. The method further includes determining, based on the first information, one or more first resources for receiving the one or more first SSBs and determining, based on the second information, one or more second resources for receiving the one or more second SSBs. The first or second resources correspond to at least one of: (1) resource elements (REs), (2) physical resource blocks (PRBs) and (3) orthogonal frequency division multiplexing (OFDM) symbols.

17 Claims, 19 Drawing Sheets

(58) Field of Classification Search
CPC ...... H04B 7/024; H04B 7/022; H04B 7/0617; H04B 7/0697; H04B 17/328; H04L 5/0051; H04L 5/0096; H04L 5/0091; H04J 11/0069
See application file for complete search history.

(56) References Cited

OTHER PUBLICATIONS

Nokia—R1-2101007: Enhancements to enable inter-cell multi-TRP operations, Jan. 2021 (Year: 2021).*
Intel—R1-2100638: Multi-TRP enhancements for inter-cell operation, Jan. 2021 (Year: 2021).*
International Search Report and Written Opinion issued Jul. 19, 2022 regarding International Application No. PCT/KR2022/004061, 7 pages.
Lenovo et al., "Enhancements on Multi-TRP inter-cell operation", 3GPP TSG-RAN WG1 Meeting #104-e, R1-2100275, Jan. 2021, 5 pages.
Nokia et al., "Enhancements to enable inter-cell multi-TRP operations", 3GPP TSG-RAN WG1 Meeting #104-e, R1-2101007, Jan. 2021, 6 pages.
Intel Corporation, "Multi-TRP enhancements for inter-cell operation", 3GPP TSG-RAN WG1 Meeting #104-e, R1-2100638, Jan. 2021, 3 pages.
"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)", 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.

* cited by examiner

| TCI states associated with the SC TRP | | TCI states associated with the NSC TRP | | Rate matching parameters (RMPs) for each TCI state | | | |
|---|---|---|---|---|---|---|---|
| TCI state #A_1 | TCI state #A_2 | TCI state #B_1 | TCI state #B_2 | TCI state #A_1 | TCI state #A_2 | TCI state #B_1 | TCI state #B_2 |
| 1 | 0 | 0 | 0 | RMP_1-1 | RMP_1-2 | RMP_1-3 | RMP_1-4 |
| 0 | 1 | 0 | 0 | RMP_2-1 | RMP_2-2 | RMP_2-3 | RMP_2-4 |
| 0 | 0 | 1 | 0 | RMP_3-1 | RMP_3-2 | RMP_3-3 | RMP_3-4 |
| 0 | 0 | 0 | 1 | RMP_4-1 | RMP_4-2 | RMP_4-3 | RMP_4-4 |
| 1 | 0 | 1 | 0 | RMP_5-1 | RMP_5-2 | RMP_5-3 | RMP_5-4 |
| 1 | 0 | 0 | 1 | RMP_6-1 | RMP_6-2 | RMP_6-3 | RMP_6-4 |
| 0 | 1 | 1 | 0 | RMP_7-1 | RMP_7-2 | RMP_7-3 | RMP_7-4 |
| 0 | 1 | 0 | 1 | RMP_8-1 | RMP_8-2 | RMP_8-3 | RMP_8-4 |

TCI state #A_1 with SSB #A_1 indicated as the QCL source RS
TCI state #A_2 with SSB #A_2 indicated as the QCL source RS
TCI state #B_1 with SSB #B_1 indicated as the QCL source RS
TCI state #B_2 with SSB #B_2 indicated as the QCL source RS

FIG. 10

| TCI states associated with the SC TRP | | TCI states associated with the NSC TRP | | Rate matching parameters (RMPs) for TCI state #A_1, TCI state #A_2, TCI state #B_1 and TCI state #B_2 |
|---|---|---|---|---|
| TCI state #A_1 | TCI state #A_2 | TCI state #B_1 | TCI state #B_2 | |
| 1 | 0 | 0 | 0 | RMP_1 |
| 0 | 1 | 0 | 0 | RMP_2 |
| 0 | 0 | 1 | 0 | RMP_3 |
| 0 | 0 | 0 | 1 | RMP_4 |
| 1 | 0 | 1 | 0 | RMP_5 |
| 0 | 1 | 0 | 1 | RMP_6 |
| 1 | 0 | 0 | 1 | RMP_7 |
| 0 | 1 | 1 | 0 | RMP_8 |

TCI state #A_1 with SSB #A_1 indicated as the QCL source RS
TCI state #A_2 with SSB #A_2 indicated as the QCL source RS
TCI state #B_1 with SSB #B_1 indicated as the QCL source RS
TCI state #B_2 with SSB #B_2 indicated as the QCL source RS

FIG. 11

| TCI states associated with the SC TRP | TCI states associated with the NSC TRP | Rate matching parameters (RMPs) for each TCI state | | | | | | | |
|---|---|---|---|---|---|---|---|---|---|
| | | TCI state #A_1 | TCI state #A_2 | TCI state #B_1 | TCI state #B_2 | | | | |
| TCI state #A_1 & TCI state #A_2 | 0 | RMP_A-1 | RMP_A-2 | RMP_A-3 | RMP_A-4 | | | | |
| | 1 | RMP_B-1 | RMP_B-2 | RMP_B-3 | RMP_B-4 | | | | |
| 0 | 1 | RMP_C-1 | RMP_C-2 | RMP_C-3 | RMP_C-4 | | | | |

TCI state #A_1 with SSB #A_1 indicated as the QCL source RS
TCI state #A_2 with SSB #A_2 indicated as the QCL source RS
TCI state #B_1 with SSB #B_1 indicated as the QCL source RS
TCI state #B_2 with SSB #B_2 indicated as the QCL source RS

FIG. 12

| TCI states associated with the SC TRP | TCI states associated with the NSC TRP | Rate matching parameters (RMPs) for TCI state #A_1, TCI state #A_2, TCI state #B_1 and TCI state #B_2 |
|---|---|---|
| TCI state #A_1 & TCI state #A_2 | TCI state #B_1 & TCI state #B_2 | |
| 1 | 0 | RMP_A |
| 0 | 1 | RMP_B |
| 1 | 1 | RMP_C |

TCI state #A_1 with SSB #A_1 indicated as the QCL source RS
TCI state #A_2 with SSB #A_2 indicated as the QCL source RS
TCI state #B_1 with SSB #B_1 indicated as the QCL source RS
TCI state #B_2 with SSB #B_2 indicated as the QCL source RS

FIG. 13

| TCI states associated with the SC TRP | | TCI states associated with the NSC TRP | | Rate matching parameters (RMPs) for each TCI state | | | |
|---|---|---|---|---|---|---|---|
| TCI state #A'_1 | TCI state #A'_2 | TCI state #B'_1 | TCI state #B'_2 | TCI state #A'_1 | TCI state #A'_2 | TCI state #B'_1 | TCI state #B'_2 |
| 1 | 0 | 1 | 0 | RMP'_1-1 | RMP'_1-2 | RMP'_1-3 | RMP'_1-4 |
| 0 | 1 | 1 | 0 | RMP'_2-1 | RMP'_2-2 | RMP'_2-3 | RMP'_2-4 |
| 0 | 0 | 1 | 1 | RMP'_3-1 | RMP'_3-2 | RMP'_3-3 | RMP'_3-4 |
| 0 | 0 | 1 | 1 | RMP'_4-1 | RMP'_4-2 | RMP'_4-3 | RMP'_4-4 |
| 1 | 0 | 0 | 1 | RMP'_5-1 | RMP'_5-2 | RMP'_5-3 | RMP'_5-4 |
| 1 | 0 | 1 | 1 | RMP'_6-1 | RMP'_6-2 | RMP'_6-3 | RMP'_6-4 |
| 0 | 1 | 0 | 1 | RMP'_7-1 | RMP'_7-2 | RMP'_7-3 | RMP'_7-4 |
| 0 | 1 | 1 | 0 | RMP'_8-1 | RMP'_8-2 | RMP'_8-3 | RMP'_8-4 |

TCI state #A'_1 with TRS #A'_1 indicated as the QCL source RS
TCI state #A'_2 with TRS #A'_2 indicated as the QCL source RS
TCI state #B'_1 with TRS #B'_1 indicated as the QCL source RS
TCI state #B'_2 with TRS #B'_2 indicated as the QCL source RS

FIG. 16

| TCI states associated with the SC TRP | | TCI states associated with the NSC TRP | | Rate matching parameters (RMPs) for TCI state #A'_1, TCI state #A'_2, TCI state #B'_1 and TCI state #B'_2 |
|---|---|---|---|---|
| TCI state #A'_1 | TCI state #A'_2 | TCI state #B'_1 | TCI state #B'_2 | |
| 1 | 0 | 0 | 0 | RMP'_1 |
| 0 | 1 | 0 | 0 | RMP'_2 |
| 0 | 0 | 1 | 0 | RMP'_3 |
| 0 | 0 | 0 | 1 | RMP'_4 |
| 1 | 0 | 1 | 0 | RMP'_5 |
| 1 | 0 | 0 | 1 | RMP'_6 |
| 0 | 1 | 1 | 0 | RMP'_7 |
| 0 | 1 | 0 | 1 | RMP'_8 |

TCI state #A'_1 with TRS #A'_1 indicated as the QCL source RS
TCI state #A'_2 with TRS #A'_2 indicated as the QCL source RS
TCI state #B'_1 with TRS #B'_1 indicated as the QCL source RS
TCI state #B'_2 with TRS #B'_2 indicated as the QCL source RS

FIG. 17

| TCI states associated with the SC TRP | TCI states associated with the NSC TRP | Rate matching parameters (RMPs) for each TCI state | | | | |
|---|---|---|---|---|---|---|
| TCI state #A'_1 & TCI state #A'_2 | TCI state #B'_1 & TCI state #B'_2 | TCI state #A'_1 | TCI state #A'_2 | TCI state #B'_1 | TCI state #B'_2 | |
| 1 | 0 | RMP'_A-1 | RMP'_A-2 | RMP'_A-3 | RMP'_A-4 | |
| 0 | 1 | RMP'_B-1 | RMP'_B-2 | RMP'_B-3 | RMP'_B-4 | |
| 1 | 1 | RMP'_C-1 | RMP'_C-2 | RMP'_C-3 | RMP'_C-4 | |

TCI state #A'_1 with TRS #A'_1 indicated as the QCL source RS
TCI state #A'_2 with TRS #A'_2 indicated as the QCL source RS
TCI state #B'_1 with TRS #B'_1 indicated as the QCL source RS
TCI state #B'_2 with TRS #B'_2 indicated as the QCL source RS

FIG. 18

| TCI states associated with the SC TRP | TCI states associated with the NSC TRP | Rate matching parameters (RMPs) for TCI state #A'_1, TCI state #A'_2, TCI state #B'_1 and TCI state #B'_2 |
|---|---|---|
| TCI state #A'_1 & TCI state #A'_2 | TCI state #B'_1 & TCI state #B'_2 | |
| 1 | 0 | RMP'_A |
| 0 | 1 | RMP'_B |
| 1 | 1 | RMP'_C |

TCI state #A'_1 with TRS #A'_1 indicated as the QCL source RS
TCI state #A'_2 with TRS #A'_2 indicated as the QCL source RS
TCI state #B'_1 with TRS #B'_1 indicated as the QCL source RS
TCI state #B'_2 with TRS #B'_2 indicated as the QCL source RS

FIG. 19

METHOD AND APPARATUS FOR RECEIVING DOWNLINK CHANNELS IN AN INTER-CELL SYSTEM

CROSS-REFERENCE TO RELATED APPLICATIONS AND CLAIM OF PRIORITY

The present application claims priority to U.S. Provisional Patent Application No. 63/164,943, filed on Mar. 23, 2021 and U.S. Provisional Patent Application No. 63/314,161, filed on Feb. 25, 2022. The content of the above-identified patent documents are incorporated herein by reference.

TECHNICAL FIELD

The present disclosure relates generally to wireless communication systems and, more specifically, the present disclosure relates to receiving a physical downlink shared channel (PDSCH) or a physical downlink control channel (PDCCH) in an inter-cell system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to receiving a PDSCH or a PDCCH in an inter-cell system.

In one embodiment, a user equipment (UE) is provided. The UE includes a transceiver configured to receive an indicator for inter-cell operation; receive first information of one or more first synchronization signal blocks (SSBs) associated with a serving cell physical cell identity (PCI); and receive second information of one or more second SSBs associated with a PCI different from the serving cell PCI. The UE further includes a processor operably coupled to the transceiver. The processor is configured to: determine, based on the first information, one or more first resources for receiving the one or more first SSBs and determine, based on the second information, one or more second resources for receiving the one or more second SSBs. The first or second resources correspond to at least one of: (1) resource elements (REs), (2) physical resource blocks (PRBs) and (3) orthogonal frequency division multiplexing (OFDM) symbols.

In another embodiment, a base station (BS) is provided. The BS includes a processor and a transceiver operably coupled to the processor. The transceiver is configured to transmit an indicator for inter-cell operation; transmit first information to indicate one or more first resources for one or more first SSBs associated with a serving cell PCI; transmit second information to indicate one or more second resources for one or more second SSBs associated with a PCI different from the serving cell PCI; and transmit, one the one or more first or second resources, the one or more first or second SSBs, respectively. The first or second resources correspond to at least one of: (1) REs, (2) PRBs and (3) OFDM symbols.

In yet another embodiment, a method is provided. The method includes receiving an indicator for inter-cell operation; receiving first information of one or more first SSBs associated with a serving cell PCI; and receiving second information of one or more second SSBs associated with a PCI different from the serving cell PCI. The method further includes determining, based on the first information, one or more first resources for receiving the one or more first SSBs and determining, based on the second information, one or more second resources for receiving the one or more second SSBs. The first or second resources correspond to at least one of: (1) REs, (2) PRBs and (3) OFDM symbols.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates an example of rate matching parameters/patterns for inter-cell beam indication according to embodiments of the present disclosure;

FIG. 11 illustrates another example of rate matching parameters/patterns for inter-cell beam indication according to embodiments of the present disclosure;

FIG. 12 illustrates yet another example of rate matching parameters/patterns for inter-cell beam indication according to embodiments of the present disclosure;

FIG. 13 illustrates yet another example of rate matching parameters/patterns for inter-cell beam indication according to embodiments of the present disclosure;

FIG. 16 illustrates yet another example of rate matching parameters/patterns for inter-cell beam indication according to embodiments of the present disclosure;

FIG. 17 illustrates yet another example of rate matching parameters/patterns for inter-cell beam indication according to embodiments of the present disclosure;

FIG. 18 illustrates yet another example of rate matching parameters/patterns for inter-cell beam indication according to embodiments of the present disclosure;

FIG. 19 illustrates yet another example of rate matching parameters/patterns for inter-cell beam indication according to embodiments of the present disclosure;

DETAILED DESCRIPTION

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

Figure 1:
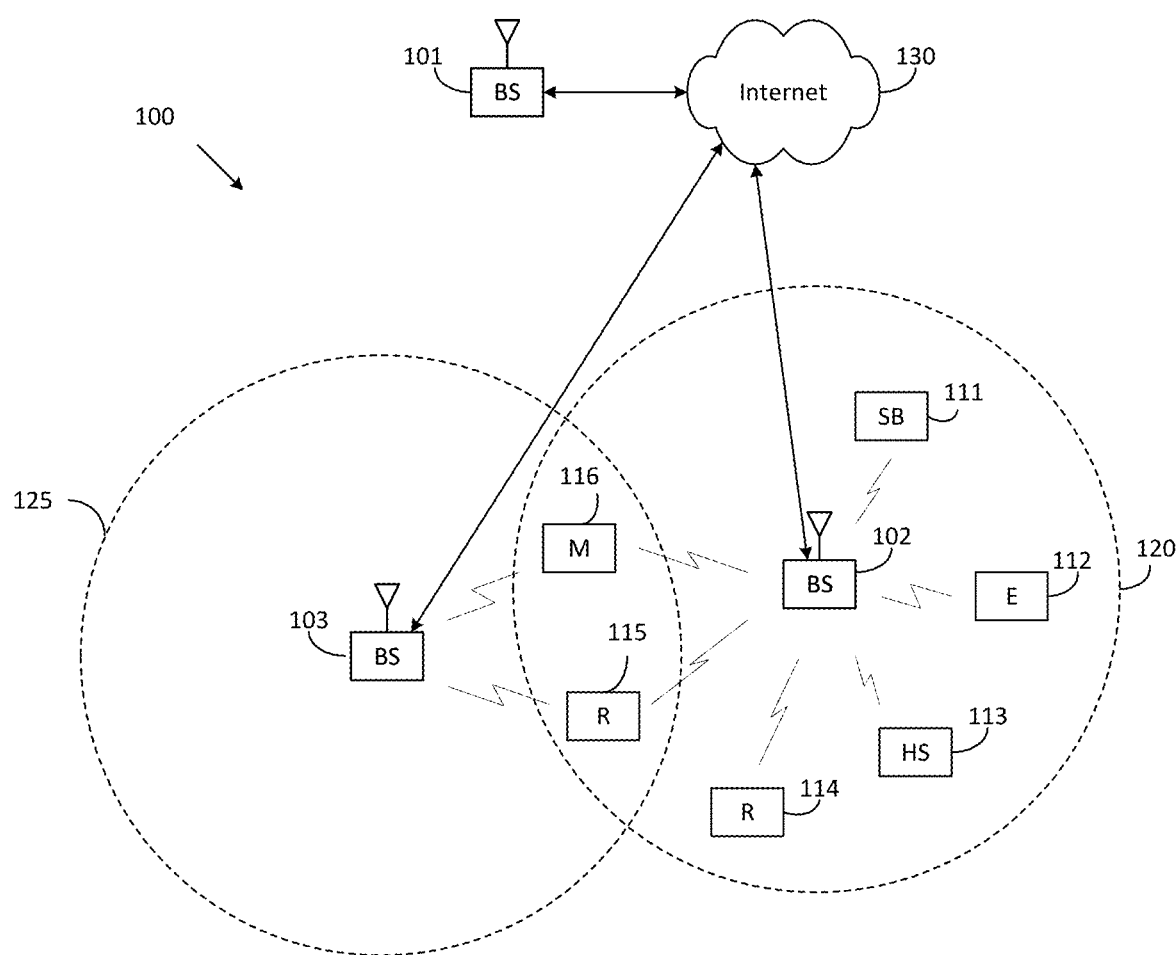
FIG. 1 illustrates an example of wireless network according to embodiments of the present disclosure.
Figure 2:
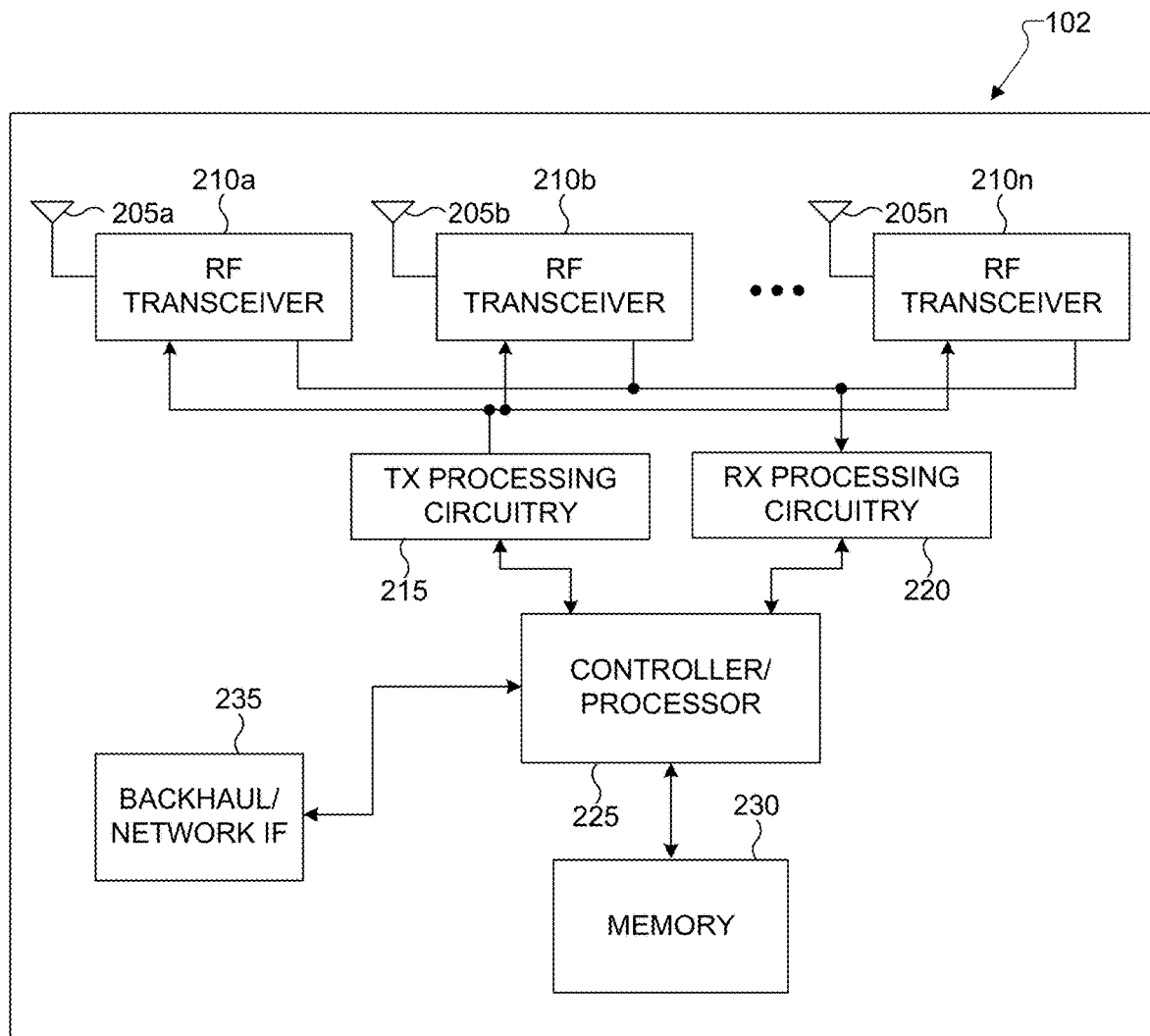
FIG. 2 illustrates an example of gNB according to embodiments of the present disclosure.
Figure 3:
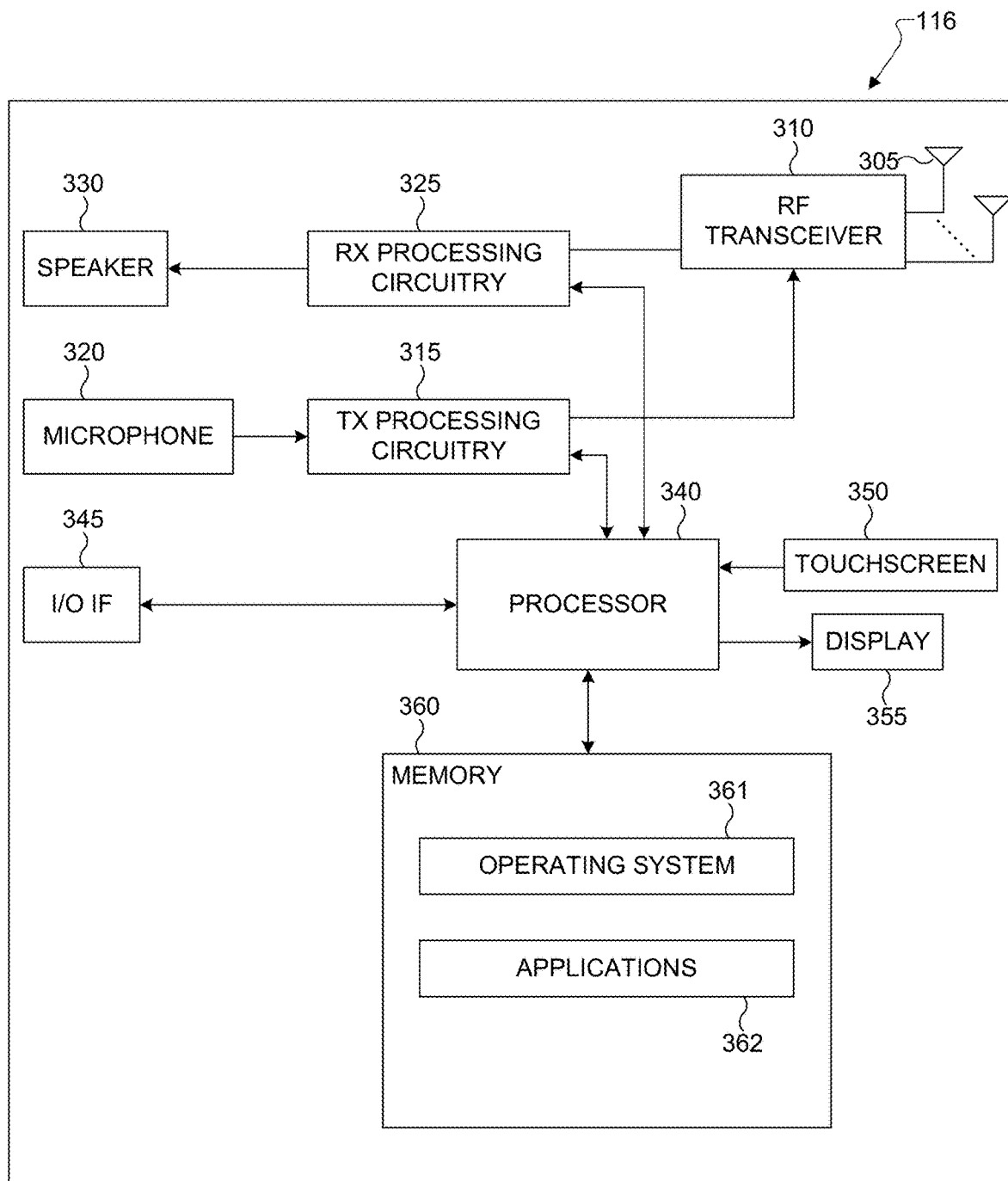
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a PDSCH rate matching in an inter-cell system. In certain embodiments, and one or more of the gNBs 101-103 includes circuitry, programing, or a combination thereof, for a PDSCH rate matching in an inter-cell system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a PDSCH rate matching in an inter-cell system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a PDSCH rate matching in an inter-cell system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, and to enable various vertical applications, 5G communication systems have been developed and are currently being deployed.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 30 KHz or 15 KHz, and so on.

Figure 4:
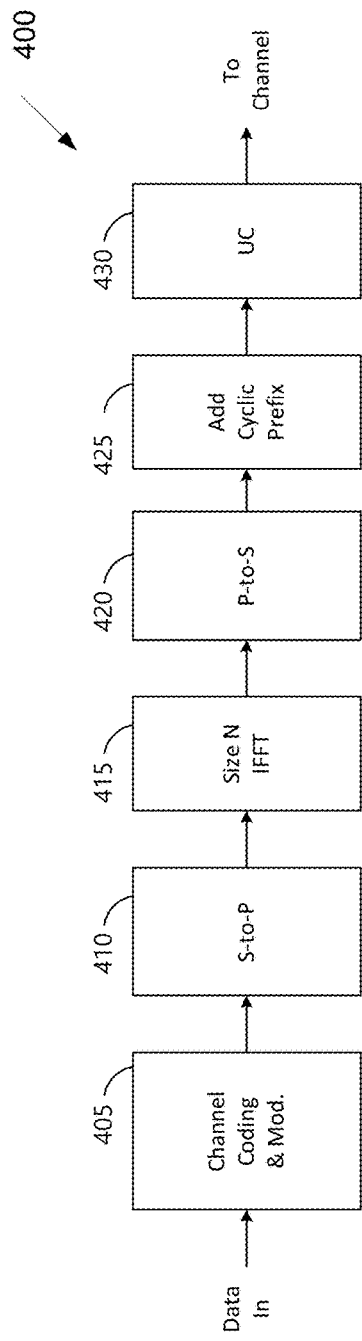
FIGS. 4 and 5 illustrate example of wireless transmit and receive paths according to this disclosure.
Figure 5:
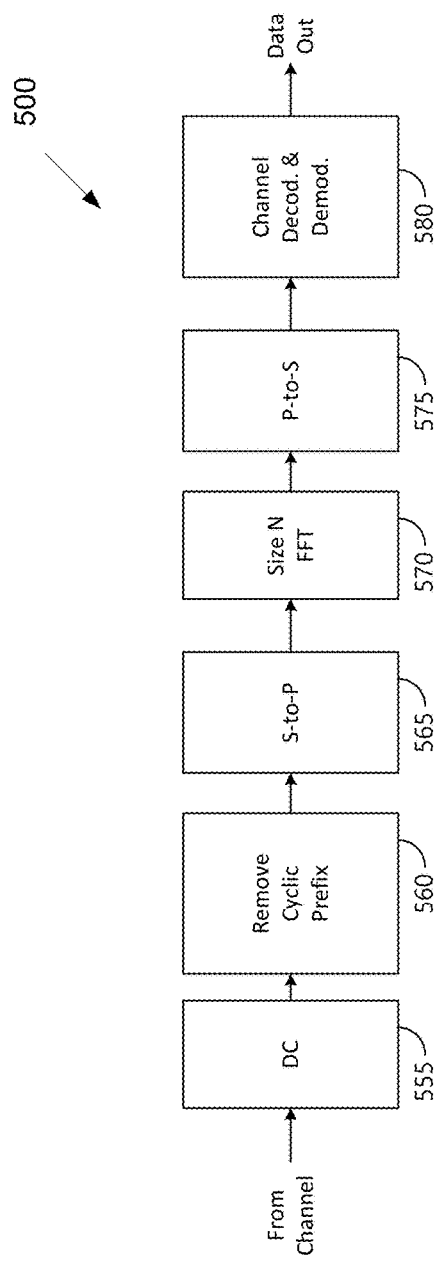

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
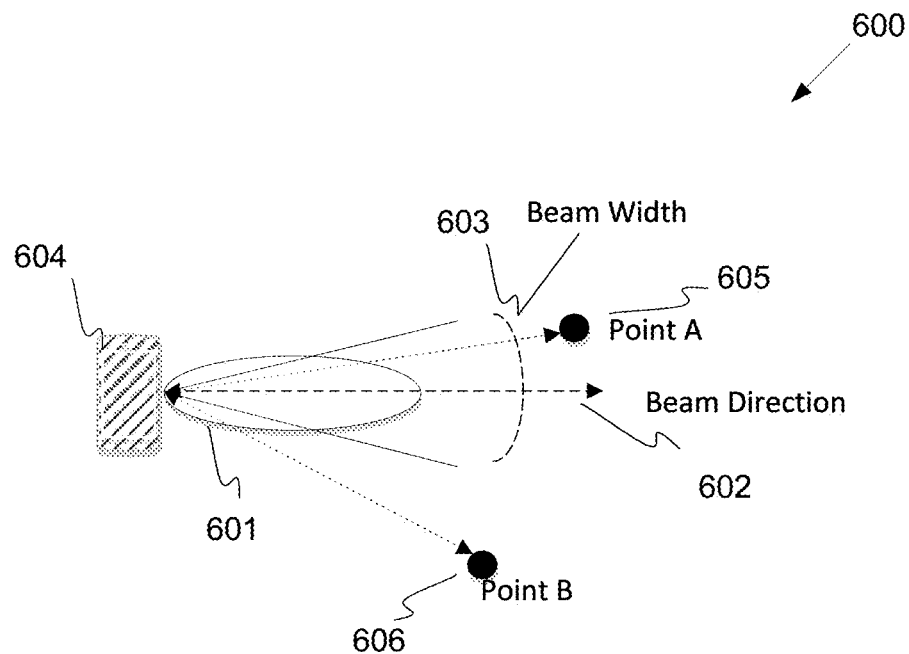
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
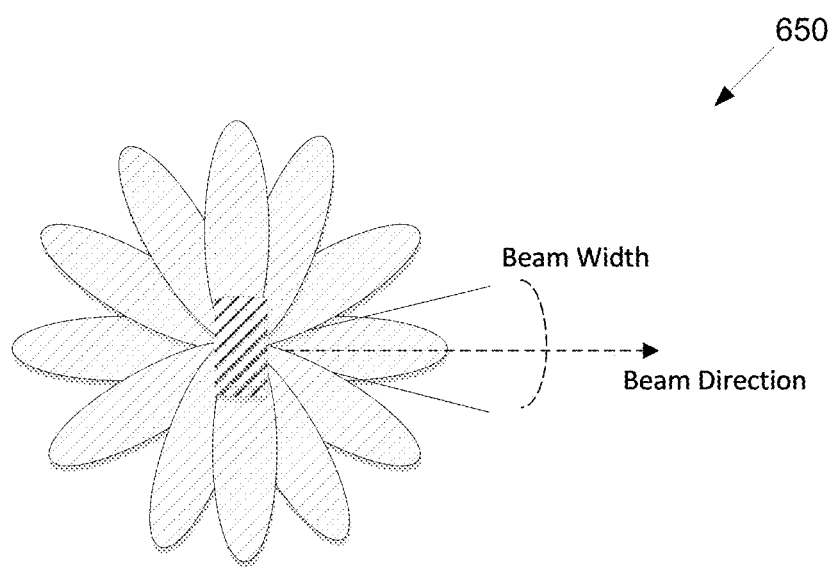
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Figure 7:
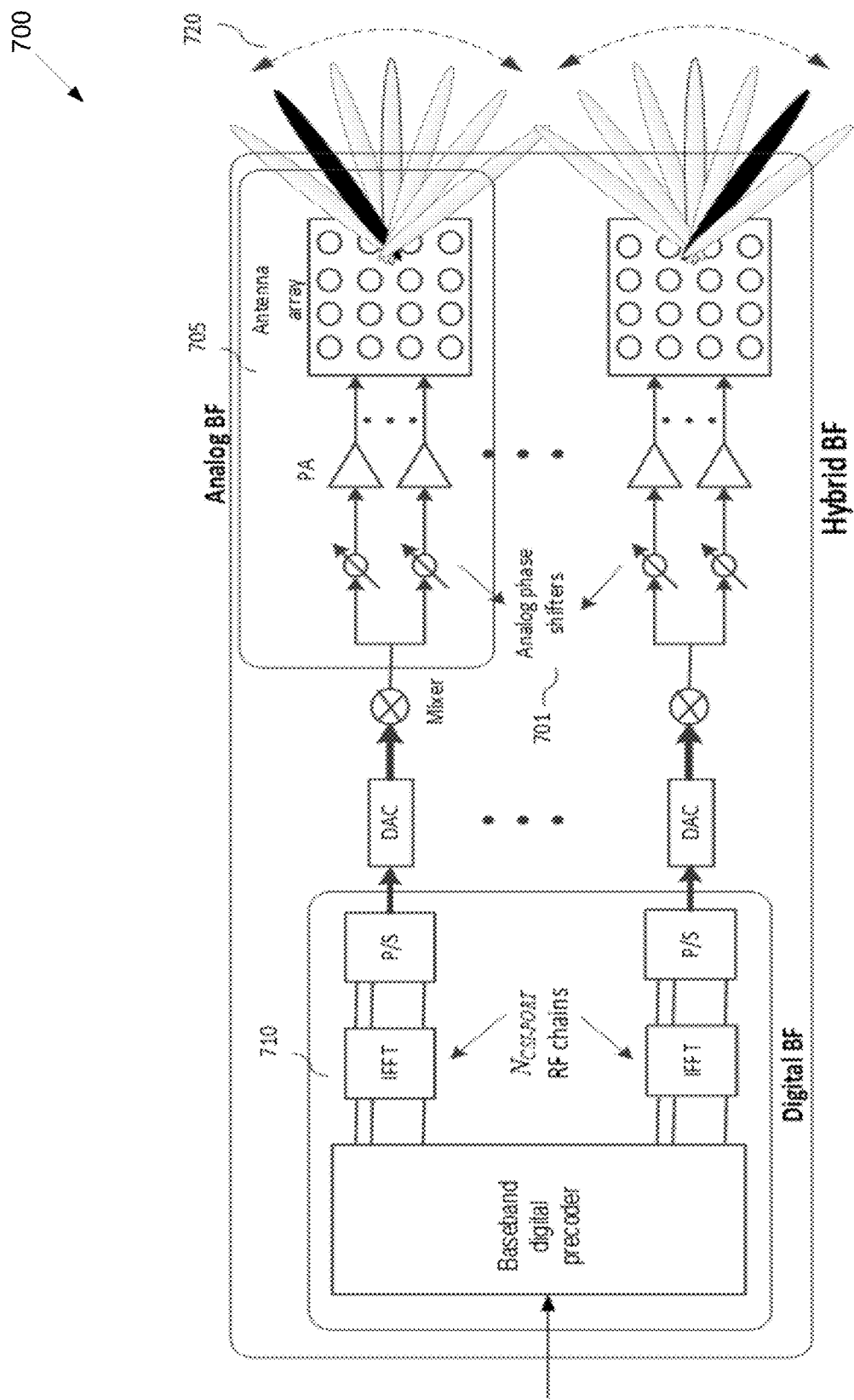
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of ADCs/DACs at mmWave frequencies) as illustrated in FIG. 7. Then, one CSI-RS port can be mapped onto a large number of antenna elements that can be controlled by a bank of analog phase shifters 701. One CSI-RS port can then correspond to one sub-array which produces a narrow analog beam through analog beamforming 705. This analog beam can be configured to sweep across a wider range of angles (720) by varying the phase shifter bank across symbols or slots/subframes. The number of sub-arrays (equal to the number of RF chains) is same as the number of CSI-RS ports $N_{CSI-PORT}$. A digital beamforming unit 710 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting," respectively), and receiving a DL or UL transmission via a selection of a corresponding receive (RX) beam.

The above system is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence larger number of radiators in the array) are needed to compensate for the additional path loss.

Figure 8:
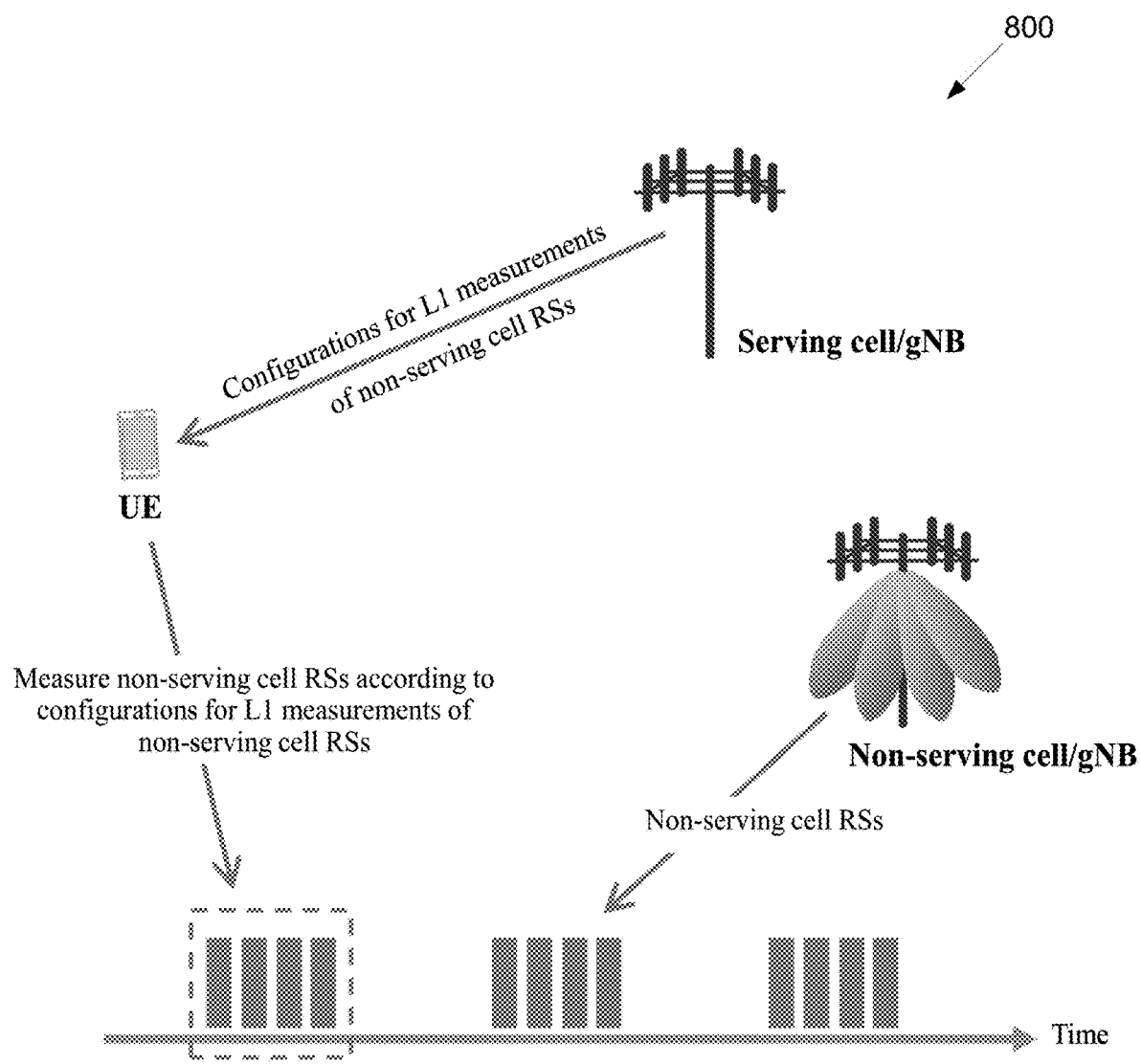
FIG. 8 illustrates an example of layer-1 (L1) measurements in an inter-cell system according to embodiments of the present disclosure.

FIG. 8 illustrates an example of L1 measurements in an inter-cell system 800 according to embodiments of the present disclosure. An embodiment of the L1 measurements in the inter-cell system 800 shown in FIG. 8 is for illustration only.

Figure 9:
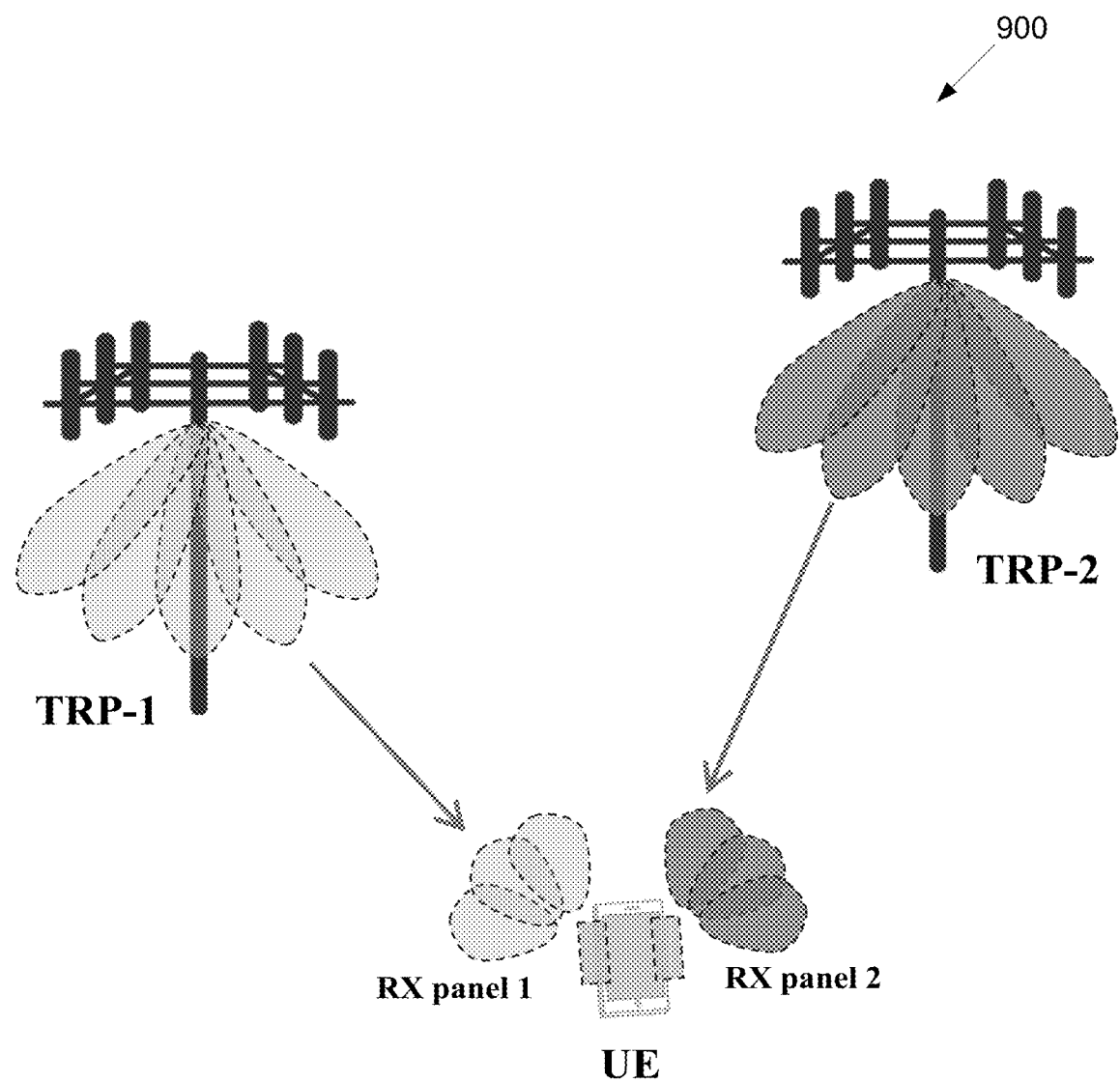
FIG. 9 illustrates an example of multi-TRP operation according to embodiments of the present disclosure.

FIG. 9 illustrates an example of multi-TRP operation 900 according to embodiments of the present disclosure. An embodiment of the multi-TRP operation 900 shown in FIG. 9 is for illustration only.

For inter-cell operation such as inter-cell mobility illustrated in FIG. 8 wherein a UE could transmit/receive certain channel(s)/RS(s) to/from a non-serving cell (NSC) and inter-cell multi-transmission and reception point (TRP) operation shown in FIG. 9 wherein the UE could simultaneously receive from the serving cell (SC) TRP and the non-serving cell TRP(s), the PDSCH(s) transmitted from the serving cell TRP/non-serving cell TRP(s) may need to be rate matched around certain downlink channel(s)/RS(s) transmitted from the serving cell TRP/non-serving cell TRP(s). In this disclosure, a serving cell/non-serving cell TRP can represent a collection of measurement antenna ports, measurement RS resources and/or control resource sets (CORESETs).

For example, a serving cell/non-serving cell TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; and (5) a plurality of CORESETs associated with a TRP-specific index/indicator/identity.

Further, the non-serving cell(s) or the non-serving cell TRP(s) have different physical cell identity(s) (PCI(s)) from that of the serving cell or the serving cell TRP. Without proper rate matching mechanisms for the inter-cell operation (such as those shown in FIG. 8 and FIG. 9), the UE could observe significant interference between the PDSCH(s) and certain downlink channel(s)/RS(s) transmitted from the serving cell TRP/non-serving cell TRP(s). The current 5G NR system does not support NSC's PDSCH rate matching or PDSCH rate matching around NSC's channel(s)/RS(s).

Different TRPs in the multi-TRP system could share/broadcast the same physical cell identity (PCI) or have/broadcast different PCIs. In this disclosure, the non-serving cell(s) or the non-serving cell TRP(s) could have/broadcast different PCIs and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation considered in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex).

In the present disclosure, a non-serving cell PCI can also be referred to as an additional PCI, another PCI or a different PCI (with respect to the serving cell PCI). Furthermore, in the present disclosure, a PCI (either the serving cell PCI or a PCI different from the serving cell PCI) could correspond to a PCI index (either the serving cell PCI index or a PCI index different from the serving cell PCI index) pointing to an entry/PCI in a list of PCIs (including PCIs different from the serving cell PCI or the serving cell PCI) that are higher layer configured to the UE.

The number of bits used to transmit on the PDSCH depends on various factors, not only the number of scheduled resource blocks (RBs)/OFDM symbols, but also an amount of resources overlapping with other channels/RSs. Further, certain an amount of resources could be reserved, e.g., to provide future compatibility, which could also affect the number of bits usable for transmitting the PDSCH. The determination of the number of bits used to transmit on the PDSCH according to the overlapping resources with other channels/RSs and/or the reserved resources could be referred to as PDSCH rate matching. In the 5G NR system, there are various PDSCH rate matching rules/mechanisms.

For instance, the PDSCH could be rate matched around a DMRS, CSI-RS, CORESETs, SSBs and etc. either on an RB/symbol level or a RE level. The indication of the PDSCH rate matching could be via higher layer RRC signaling, MAC CE signaling and/or DCI signaling depending on the rate matching pattern and/or the types of channels/RSs around which the PDSCH is rate matched. As discussed above, the UE could transmit/receive certain channels/RSs to/from at least one NSC TRP in an inter-cell system. Hence, there is a need to specify rules/mechanisms for NSC's PDSCH rate matching and PDSCH rate matching around certain NSC's channels/RSs.

The UE could receive PDCCH(s)/PDSCH(s) transmitted from at least one NSC TRP in an inter-cell system shown in FIG. 8 and FIG. 9. The NSC TRP(s) could have different PCI(s) from that of the SC TRP. That is, in an inter-cell system/operation, the UE could receive PDCCH(s)/PDSCH(s) and the corresponding DM-RS port(s) associated with one or more PCIs/PCI indexes different from the serving cell PCI/PCI index. In the present disclosure, the PDSCH(s) and the corresponding DM-RS port(s) are said to be associated with one or more PCIs/PCI indexes (including those different from the serving cell PCI/PCI index) if the PDSCH(s) and the corresponding DM-RS(s) are quasi co-located with one or more RSs such as SSBs associated with the one or more PCIs/PCI indexes.

Furthermore, in the present disclosure, the PDCCH(s)/PDCCH candidate(s) and the corresponding DM-RS port(s) are said to be associated with one or more PCIs/PCI indexes (including those different from the serving cell PCI/PCI index) if the PDCCH(s)/PDCCH candidate(s) or the DM-RS(s) of the PDCCH(s)/PDCCH candidate(s) received in one or more CORESETs are quasi co-located with one or more RSs such as SSBs associated with the one or more PCIs/PCI indexes. The PDCCH(s)/PDSCH(s) transmitted from the NSC TRP(s) could be rate matched around the SSBs transmitted from the SC TRP or the NSC TRP(s) or both of the SC and NSC TRPs in the inter-cell system. That is, for an inter-cell system/operation, the UE may assume that PRBs containing SSB resources associated with serving cell PCI/PCI index or one or more PCIs/PCI indexes different from the serving cell PCI/PCI index are not available for PDCCH(s)/PDSCH(s) and the corresponding DM-RS(s) associated with the serving cell PCI/PCI index or the one or more PCIs/PCI indexes different from the serving cell PCI/PCI index in the OFDM symbols where the SSBs are transmitted.

The UE needs to know the time-domain position(s) (e.g., the time-domain positions in a burst) and the frequency(s) of the SSBs around which the NSC's PDSCHs could be rate matched according to the above discussions. Further, the rate matching parameters could also depend on the QCL assumptions of the NSC's PDSCHs and the SSBs of interest. The SSBs could be transmitted from the SC TRP, or the NSC TRP(s), or both of the SC and NSC TRPs. The UE could be configured/indicated by the network via higher layer RRC signaling, MAC CE signaling and/or DCI signaling whether the NSC's PDSCHs are rate matched around the SC's SSBs, or the NSC's SSBs, or both of the SC's and NSC's SSBs.

The UE could be indicated by the network the time-domain position(s) of the SSBs in a burst via, e.g., higher layer parameter ssb-PositionInBurst in ServingCellConfigCommon or ServingCellConfig or MeasObjectNR. For the inter-cell system/operation, different cells/TRPs with different PCIs could have different time-domain positions of the SSBs in a burst. For this case, the UE could be provided by the network the time-domain position(s) of the SSBs in a burst (e.g., provided by the higher layer parameter ssb-PositionInBurst) associated with one or more PCIs/PCI indexes. There are various means to indicate to the UE the time-domain positions of the SSBs in a burst associated with different cells/TRPs (PCIs/PCI indexes).

In one example of Option-1, N_Tssb≥1 ssb-PositionInBurst fields could be configured in ServingCellConfigCommon/ServingCellConfig/MeasObjectNR, with each ssb-PositionInBurst field corresponding to a cell/TRP or a PCI/PCI index. The number N_Tssb could be a fixed value (e.g., 2) or dynamically configured by the network. For N_Tssb=1, the single ssb-PositionInBurst field corresponds to the SC or the SC TRP or the serving cell PCI/PCI index.

In TABLE 1, a snippet of the higher layer parameter ServingCellConfigCommon containing N_Tssb=2 ssb-PositionInBurst fields (ssb-PositionInBurst-1 and ssb-PositionInBurst-2) is provided; ssb-PositionInBurst-1 indicates the time-domain positions of the SSBs in a burst associated with the SC TRP or serving cell PCI/PCI index, and ssb-PositionInBurst-2 indicates the time-domain positions of the SSBs in a burst associated with a NSC TRP or a PCI/PCI index different from the serving cell PCI/PCI index. The above described configurations in the higher layer parameter ServingCellConfigCommon could be equally applied/extended to the higher layer parameter ServingCellConfig or MeasObjectNR.

TABLE 1

An example of higher layer parameter ServingCellConfigCommon indicating non-serving cell SSB information

```
-- ASN1START
-- TAG-SERVINGCELLCONFIGCOMMON-START
ServingCellConfigCommon ::=   SEQUENCE {
    physCellId            PhysCellId              OPTIONAL, -- Cond
HOAndServCellAdd,
    downlinkConfigCommon  DownlinkConfigCommon    OPTIONAL, --
Cond HOAndServCellAdd
    uplinkConfigCommon    UplinkConfigCommon      OPTIONAL, --
Need M
    . . .
```

TABLE 1-continued

An example of higher layer parameter ServingCellConfigCommon
indicating non-serving cell SSB information

```
ssb-PositionsInBurst-1          CHOICE {
  shortBitmap         BIT STRING (SIZE (4)),
  mediumBitmap        BIT STRING (SIZE (8)),
  longBitmap          BIT STRING (SIZE (64))
}                        OPTIONAL, -- Cond AbsFreqSSB
ssb-PositionsInBurst-2          CHOICE {
  shortBitmap         BIT STRING (SIZE (4)),
  mediumBitmap        BIT STRING (SIZE (8)),
  longBitmap          BIT STRING (SIZE (64))
}                        OPTIONAL, -- Cond AbsFreqSSB
...
}
-- TAG-SERVINGCELLCONFIGCOMMON-STOP
                              -- ASN1STOP
```

Optionally, the higher layer parameter ServingCellConfigCommon or ServingCellConfig or MeasObjectNR could contain a field (e.g., denoted by SSBInfo-AdditionalPCI) to indicate SSB information for one or more PCIs/PCI indexes different from the serving cell PCI/PCI index. The SSBInfo-AdditionalPCI field could contain/indicate one or more PCIs or PCI indexes pointing/corresponding to PCIs in a list of PCIs that are higher layer configured to the UE, and one or more ssb-PositionInBurst fields each associated with at least a PCI or PCI index pointing/corresponding to a PCI in a list of PCIs that are higher layer configured to the UE. Examples of MeasObjNR containing/indicating the SSBInfo-AdditionalPCI field and the SSBInfo-AdditionalPCI parameter containing/indicating the ssb-PositionInBurst field are provided in TABLE 2A and TABLE 2B. As illustrated in TABLE 2B, the SSB time domain position(s) in a burst (provided by ssb-PositionsInBurst) is associated with the PCI/PCI index indicated in the same higher layer parameter SSBInfo-AdditionalPCI. In the present disclosure, the UE could be first higher layer RRC configured with a list of PCI indexes 0, ..., Nnsc−1 or 1, ..., Nnsc, where Nnsc corresponds to the number of PCIs that are higher layer RRC configured to the UE. For example, Nnsc∈{1, ..., maxNnsc}, where maxNnsc is the maximum number of PCIs that can be configured to the UE. For another example, Nnsc could be 1, 2, 3, 4, 5, 6, 7 or 8.

TABLE 2A

An example of higher layer parameter MeasObjectNR
indicating non-serving cell SSB information

```
MeasObjectNR ::=       SEQUENCE {
  ssbFrequency            ARFCN-ValueNR         OPTIONAL, -- Cond
SSBorAssociatedSSB
  ssbSubcarrierSpacing    SubcarrierSpacing     OPTIONAL, -- Cond
SSBorAssociatedSSB
  smtc-additionalPCI      SSBInfo-AdditionalPCI OPTIONAL, -- Cond
SSBorAssociatedSSB
  ...
  }
```

TABLE 2B

An example of higher layer parameter SSBInfo-AdditionalPCI
indicating time domain positions of SSBs associated with a
PCI/PCI index different from the serving cell PCI/PCI index

```
SSBInfo-AdditionalPCI ::=    SEQUENCE {
  additionalPCI      PhysCellId,
  additionalPCIIndex PCIIndex,
```

TABLE 2B-continued

An example of higher layer parameter SSBInfo-AdditionalPCI
indicating time domain positions of SSBs associated with a
PCI/PCI index different from the serving cell PCI/PCI index

```
  ssb-PositionsInBurst    CHOICE {
    shortBitmap    BIT STRING (SIZE (4)),
    mediumBitmap  BIT STRING (SIZE (8)),
    longBitmap    BIT STRING (SIZE (64))
    }
  ...
  }
```

In one example, for an inter-cell system/operation—e.g., when the UE is provided by the network a higher layer parameter InterCellOperation set to "enabled" or if the UE is provided by/configured with the higher layer parameter SSBInfo-AdditionalPCI or if the UE is provided by/configured with DLorJointTCIState or UL-TCIState, if a PDSCH and the corresponding DM-RS associated with a first PCI/PCI index different from the serving cell PCI/PCI index overlaps with PRBs containing a candidate SSB corresponding to a SSB resource index provided by ssb-PositionsInBurst configured in SSBInfo-AdditionalPCI associated with a second PCI/PCI index different from the serving cell PCI/PCI index, the UE may assume that the PRBs containing SSBs are not available for the PDSCH and the corresponding DM-RS, e.g., in the OFDM symbols where the SSB is transmitted; similarly, if at least one RE for a PDCCH candidate and the corresponding DM-RS associated with a first PCI/PCI index different from the serving cell PCI/PCI index overlaps with at least one RE of a candidate SSB corresponding to a SSB resource index provided by ssb-PositionInBurst configured in SSBInfo-AdditionalPCI associated with a second PCI/PCI index different from the serving cell PCI/PCI index, the UE may not monitor the PDCCH candidate nor receive the corresponding DM-RS, e.g., in the OFDM symbols where the SSB is transmitted. In the present disclosure, the first PCI/PCI index and the second PCI/PCI index could correspond to a same PCI/PCI index, or the first PCI/PCI index could be different from the second PCI/PCI index.

In another example, for an inter-cell system/operation—e.g., when the UE is provided by the network a higher layer parameter InterCellOperation set to "enabled" or if the UE is provided by/configured with the higher layer parameter SSBInfo-AdditionalPCI or if the UE is provided by/configured with DLorJointTCIState or UL-TCIState, if a PDSCH and the corresponding DM-RS associated with a PCI/PCI index different from the serving cell PCI/PCI index overlaps with PRBs containing a candidate SSB corresponding to a SSB resource index provided by ssb-PositionsInBurst configured in serving cell information (e.g., in the higher layer parameter ServingCellConfigCommon) associated with the serving cell PCI/PCI index, the UE may assume that the PRBs containing SSBs are not available for the PDSCH and the corresponding DM-RS, e.g., in the OFDM symbols where the SSB is transmitted; similarly, if at least one RE for a PDCCH candidate and the corresponding DM-RS associated with a PCI/PCI index different from the serving cell PCI/PCI index overlaps with at least one RE of a candidate SSB corresponding to a SSB resource index provided by ssb-PositionInBurst configured in the serving cell information (e.g., in the higher layer parameter ServingCellConfigCommon) associated with the serving cell PCI/PCI index, the UE may not monitor the PDCCH candidate nor receive the corresponding DM-RS, e.g., in the OFDM symbols where the SSB is transmitted.

In yet another example, for an inter-cell system/operation—e.g., when the UE is provided by the network a higher layer parameter InterCellOperation set to "enabled" or if the UE is provided by/configured with the higher layer parameter SSBInfo-AdditionalPCI or if the UE is provided by/configured with DLorJointTCIState or UL-TCIState, if a PDSCH and the corresponding DM-RS associated with the serving cell PCI/PCI index overlaps with PRBs containing a candidate SSB corresponding to a SSB resource index provided by ssb-PositionsInBurst configured in SSBInfo-AdditionalPCI associated with a PCI/PCI index different from the serving cell PCI/PCI index, the UE may assume that the PRBs containing SSBs are not available for the PDSCH and the corresponding DM-RS, e.g., in the OFDM symbols where the SSB is transmitted; similarly, if at least one RE for a PDCCH candidate and the corresponding DM-RS associated with the serving cell PCI/PCI index overlaps with at least one RE of a candidate SSB corresponding to a SSB resource index provided by ssb-PositionInBurst configured in SSBInfo-AdditionalPCI associated with a PCI/PCI index different from the serving cell PCI/PCI index, the UE may not monitor the PDCCH candidate nor receive the corresponding DM-RS, e.g., in the OFDM symbols where the SSB is transmitted.

Furthermore, one or more SSBs associated with the serving cell PCI/PCI index or PCI(s)/PCI index(es) different from the serving cell PCI/PCI index could be used for L1 measurements. That is, for an inter-cell system/operation, a UE could be configured by the network one or more RSs such as SSBs associated with one or more PCIs/PCI indexes different from the serving cell PCI/PCI index for L1 measurements—e.g., L1-RSRP/L1-SINR measurements on the one or more PCIs/PCI indexes different from the serving cell PCI/PCI index.

For this case, when the UE is configured by the network to perform inter-cell measurement—e.g., when the UE is provided by the network a higher layer parameter InterCell-BeamMeasurement set to "enabled" or if the UE is provided by/configured with the higher layer parameter SSBInfo-AdditionalPCI or if the UE is provided by/configured with DLorJointTCIState or UL-TCIState, if a PDSCH and the corresponding DM-RS associated with a PCI/PCI index overlaps with PRBs containing a candidate SSB corresponding to a SSB resource index associated with the same PCI/PCI index (or a different PCI/PCI index) for measurements (e.g., L1 or L3 measurements), the UE may assume that the PRBs containing SSBs are not available for the PDSCH and the corresponding DM-RS in the OFDM symbols where the SSB for measurements is transmitted; if at least one RE for a PDCCH candidate and the corresponding DM-RS associated with a PCI/PCI index overlaps with at least one RE of a candidate SSB corresponding to a SSB resource index associated with the same PCI/PCI index (or a different PCI/PCI index) for measurements (e.g., L1 or L3 measurements), the UE may not monitor the PDCCH candidate nor receive the corresponding DM-RS, e.g., in the OFDM symbols where the SSB for measurements is transmitted.

For example, when the UE is configured by the network to perform inter-cell measurement—e.g., when the UE is provided by the network a higher layer parameter InterCell-BeamMeasurement set to "enabled" or if the UE is provided by/configured with the higher layer parameter SSBInfo-AdditionalPCI or if the UE is provided by/configured with DLorJointTCIState or UL-TCIState, if a PDSCH and the corresponding DM-RS associated with a first PCI/PCI index different from the serving cell PCI/PCI index overlaps with PRBs containing a candidate SSB corresponding to a SSB resource index associated with a second PCI/PCI index different from the serving cell PCI/PCI index for measurements (e.g., L1 or L3 measurements), the UE may assume that the PRBs containing SSBs are not available for the PDSCH and the corresponding DM-RS in the OFDM symbols where the SSB for measurements is transmitted; if at least one RE for a PDCCH candidate and the corresponding DM-RS associated with a first PCI/PCI index different from the serving cell PCI/PCI index overlaps with at least one RE of a candidate SSB corresponding to a SSB resource index associated with a second PCI/PCI index different from the serving cell PCI/PCI index for measurements (e.g., L1 or L3 measurements), the UE may not monitor the PDCCH candidate nor receive the corresponding DM-RS, e.g., in the OFDM symbols where the SSB for measurements is transmitted. In the present disclosure, the first PCI/PCI index and the second PCI/PCI index could correspond to a same PCI/PCI index, or the first PCI/PCI index could be different from the second PCI/PCI index.

For another example, if a PDSCH and the corresponding DM-RS associated with the serving cell PCI/PCI index overlaps with PRBs containing a candidate SSB corresponding to a SSB resource index associated with a PCI/PCI index different from the serving cell PCI/PCI index for measurements (e.g., L1 or L3 measurements), the UE may also assume that the PRBs containing SSBs are not available for the PDSCH and the corresponding DM-RS in the OFDM symbols where the SSB for measurements is transmitted; if at least one RE for a PDCCH candidate and the corresponding DM-RS associated with the serving cell PCI/PCI index overlaps with at least one RE of a candidate SSB corresponding to a SSB resource index associated with a PCI/PCI index different from the serving cell PCI/PCI index for measurements (e.g., L1 or L3 measurements), the UE may not monitor the PDCCH candidate nor receive the corresponding DM-RS, e.g., in the OFDM symbols where the SSB for measurements is transmitted.

Yet for another example, if a PDSCH and the corresponding DM-RS associated with a PCI/PCI index different from the serving cell PCI/PCI index overlaps with PRBs containing a candidate SSB corresponding to a SSB resource index associated with the serving cell PCI/PCI index for measurements (e.g., L1 or L3 measurements), the UE may also assume that the PRBs containing SSBs are not available for the PDSCH and the corresponding DM-RS in the OFDM symbols where the SSB for measurements is transmitted; if at least one RE for a PDCCH candidate and the corresponding DM-RS associated with a PCI/PCI index different from the serving cell PCI/PCI index overlaps with at least one RE of a candidate SSB corresponding to a SSB resource index associated with the serving cell PCI/PCI index for measurements (e.g., L1 or L3 measurements), the UE may not monitor the PDCCH candidate nor receive the corresponding DM-RS, e.g., in the OFDM symbols where the SSB for measurements is transmitted.

The UE could know the association/mapping relationship between the N_Tssb ssb-PositionInBurst fields and the cells/TRPs in an implicit manner. In one example, the first ssb-PositionInBurst field could correspond to the first cell/TRP in a list of cells/TRPs configured/indicated to the UE, the second ssb-PositionInBurst field could correspond to the second cell/TRP in the list of cells/TRPs configured to the UE, and so on, and the last (or the N_Tssb-th) ssb-PositionInBurst field could correspond to the last cell/TRP in the list of cells/TRPs. In another example, the first ssb-PositionInBurst field could correspond to the cell/TRP with the lowest PCI value, the second ssb-PositionInBurst field could correspond to the cell/TRP with the second lowest PCI value, and so on, and the last (or the N_Tssb-th) ssb-PositionInBurst field could correspond to the cell/TRP with the highest PCI value.

Yet in another example, the first ssb-PositionInBurst field could correspond to the cell/TRP with the lowest higher layer signaling index value (e.g., CORESETPoolIndex value), the second ssb-PositionInBurst field could correspond to the cell/TRP with the second lowest higher layer signaling index value (e.g., CORESETPoolIndex value), and so on, and the last (or the N_Tssb-th) ssb-PositionInBurst field could correspond to the cell/TRP with the highest higher layer signaling index value (e.g., CORESETPoolIndex value). For the above examples, the first ssb-PositionInBurst field could correspond to the SC or the SC TRP regardless of its position in the list of cells/TRPs configured/indicated to the UE or its associated PCI value/higher layer signaling index value (such as CORESETPoolIndex value). Other implicit association/mapping relationship between the N_Tssb ssb-PositionInBurst fields and the SC/NSC TRPs are also possible, and shall be known to the UE a prior.

Alternatively, the UE could be explicitly indicated/configured by the network the association/mapping relationship between the N_Tssb ssb-PositionInBurst fields and the SC/NSC TRPs in the inter-cell system. For example, the UE could be higher layer configured by the network a list of PCIs/higher layer signaling indices. The first ssb-PositionInBurst field could correspond to the first entry in the list of PCIs/higher layer signaling indices, the second ssb-PositionInBurst field could correspond to the second entry in the list of PCIs/higher layer signaling indices, and so on, the last ssb-PositionInBurst field could correspond to the last entry in the list of PCIs/higher layer signaling indices.

For another example, the explicit PCI value/higher layer signaling index value such as CORESETPoolIndex value could be incorporated into the ssb-PositionInBurst field. Other explicit configuration/indication methods of the association/mapping relationship between the N_Tssb ssb-PositionInBurst fields and the SC/NSC TRPs are also possible. In TABLE 3, a snippet of the higher layer parameter ServingCellConfigCommon containing N_Tssb=2 fields (ssb-PositionInBurst-1 and ssb-PositionInBurst-2) is provided; an additional parameter is incorporated in both ssb-PositionInBurst-1 and ssb-PositionInBurst-2 to indicate the associated PCI value (or higher layer signaling index value such as CORESETPoolIndex value).

Further, the UE could receive from the network a MAC CE command to activate/select K_Tssb≥1 ssb-PositionInBurst fields out of the total N_Tssb ssb-PositionInBurst fields. The association/mapping relationship between the MAC CE activated/selected K_Tssb ssb-PositionInBurst fields and the SC/NSC TRPs in the inter-cell system could follow the above discussed design examples for N_Tssb. If the time-domain positions of the SSBs in a burst of the NSC TRP(s) are the same as those of the SC TRP, N_Tssb=1 could be configured and/or the UE could be indicated by the network that the NSC TRP(s) and the SC TRP have the same time-domain positions of the SSBs in a burst.

TABLE 3

An example of higher layer parameter ServingCellConfigCommon indicating two ssb-PositionInBurst fields

```
-- ASN1START
-- TAG-SERVINGCELLCONFIGCOMMON-START
ServingCellConfigCommon ::=   SEQUENCE {
    physCellId                 PhysCellId                OPTIONAL, -- Cond
HOAndServCellAdd,
    downlinkConfigCommon       DownlinkConfigCommon      OPTIONAL, --
Cond HOAndServCellAdd
    uplinkConfigCommon         UplinkConfigCommon        OPTIONAL, -- Need
M
    . . .
    ssb-PositionsInBurst-1     CHOICE {
        physCellId-1           PhysCellId                OPTIONAL,
        shortBitmap            BIT STRING (SIZE (4)),
        mediumBitmap           BIT STRING (SIZE (8)),
        longBitmap             BIT STRING (SIZE (64))
    }                          OPTIONAL, -- Cond AbsFreqSSB
    ssb-PositionsInBurst-2     CHOICE {
        physCellId-2           PhysCellId                OPTIONAL,
```

TABLE 3-continued

An example of higher layer parameter ServingCellConfigCommon
indicating two ssb-PositionInBurst fields

```
    shortBitmap          BIT STRING (SIZE (4)),
    mediumBitmap         BIT STRING (SIZE (8)),
    longBitmap           BIT STRING (SIZE (64))
  }                             OPTIONAL, -- Cond AbsFreqSSB
  ...
}
-- TAG-SERVINGCELLCONFIGCOMMON-STOP
                              -- ASN1STOP
```

In one embodiment of Option-2, a single ssb-PositionInBurst field is configured in ServingCellConfigCommon, wherein $N\_ssb\_bm \geq 1$ SSB bitmaps are configured for a given type of bitmap (short/medium/long) each corresponding to a cell/TRP. The number $N\_ssb\_bm$ could be a fixed value (e.g., 2) or dynamically configured by the network. For $N\_ssb\_bm=1$, a single SSB bitmap is configured for a given type of bitmap (short/medium/long).

In TABLE 4, a snippet of the higher layer parameter ServingCellConfigCommon containing a single ssb-PositionInBurst field with $N\_ssb\_bm=2$ SSB bitmaps for a given bitmap type is provided (e.g., shortBitmap-1 and shortBitmap-2 for the short SSB bitmap type); shortBitmap-1/mediumBitmap-1/longBitmap-1 indicates the time-domain positions of the SSBs in a burst from the SC TRP, and shortBitmap-2/mediumBitmap-2/longBitmap-2 indicates the time-domain positions of the SSBs in a burst from a NSC TRP.

In another example, the first SSB bitmap (e.g., shortBitmap-1/mediumBitmap-1/longBitmap-1 in TABLE 4) could correspond to the cell/TRP with the lowest PCI value, the second SSB bitmap (e.g., shortBitmap-2/mediumBitmap-2/longBitmap-2 in TABLE 4) could correspond to the cell/TRP with the second lowest PCI value, and so on, and the last (or the $N\_ssb\_bm$-th) SSB bitmap could correspond to the cell/TRP with the highest PCI value.

Yet in another example, the first SSB bitmap (e.g., shortBitmap-1/mediumBitmap-1/longBitmap-1 in TABLE 4) could correspond to the cell/TRP with the lowest higher layer signaling index value (e.g., CORESETPoolIndex value), the second SSB bitmap (e.g., shortBitmap-2/mediumBitmap-2/longBitmap-2 in TABLE 4) could correspond to the cell/TRP with the second lowest higher layer signaling index value (e.g., CORESETPoolIndex value), and so on, and the last (or the $N\_ssb\_bm$-th) SSB bitmap could corre-

TABLE 4

An example of higher layer parameter ServingCellConfigCommon
indicating separate SSB time domain position bitmaps

```
-- ASN1START
-- TAG-SERVINGCELLCONFIGCOMMON-START
ServingCellConfigCommon ::=    SEQUENCE {
  physCellId              PhysCellId              OPTIONAL, -- Cond
HOAndServCellAdd,
  downlinkConfigCommon    DownlinkConfigCommon    OPTIONAL, --
Cond HOAndServCellAdd
  uplinkConfigCommon      UplinkConfigCommon      OPTIONAL, -- Need
M
  ...
  ssb-PositionsInBurst          CHOICE {
    shortBitmap-1          BIT STRING (SIZE (4)),
    mediumBitmap-1         BIT STRING (SIZE (8)),
    longBitmap-1           BIT STRING (SIZE (64)),
    shortBitmap-2          BIT STRING (SIZE (4)),
    mediumBitmap-2         BIT STRING (SIZE (8)),
    longBitmap-2           BIT STRING (SIZE (64))
  }                             OPTIONAL, -- Cond AbsFreqSSB
  ...
}
-- TAG-SERVINGCELLCONFIGCOMMON-STOP
                              -- ASN1STOP
```

The UE could know the association/mapping relationship between the configured $N\_ssb\_bm$ SSB bitmaps and the cells/TRPs in an implicit manner. In one example, the first SSB bitmap (e.g., shortBitmap-1/mediumBitmap-1/longBitmap-1 in TABLE 4) could correspond to the first cell/TRP in a list of cells/TRPs configured/indicated to the UE, the second SSB bitmap (e.g., shortBitmap-2/mediumBitmap-2/longBitmap-2 in TABLE 4) could correspond to the second cell/TRP in the list of cells/TRPs configured to the UE, and so on, and the last (or the $N\_ssb\_bm$-th) SSB bitmap could correspond to the last cell/TRP in the list of cells/TRPs.

spond to the cell/TRP with the highest higher layer signaling index value (e.g., CORESETPoolIndex value).

For the above examples, the first SSB bitmap (e.g., shortBitmap-1/mediumBitmap-1/longBitmap-1 in TABLE 4) could correspond to the SC or the SC TRP regardless of its position in the list of cells/TRPs configured/indicated to the UE or its associated PCI value/higher layer signaling index value (such as CORESETPoolIndex value). Other implicit association/mapping relationship between the $N\_ssb\_bm$ configured SSB bitmaps in a single ssb-Position- InBurst field and the SC/NSC TRPs are also possible, and shall be known to the UE a prior.

Alternatively, the UE could be explicitly indicated/configured by the network the association/mapping relationship between the N_ssb_sm SSB bitmaps and the SC/NSC TRPs in the inter-cell system. For example, the UE could be higher layer configured by the network a list of PCIs/higher layer signaling indices. The first SSB bitmap (e.g., shortBitmap-1/mediumBitmap-1/longBitmap-1 in TABLE 4) could correspond to the first entry in the list of PCIs/higher layer signaling indices, the second SSB bitmap (e.g., shortBitmap-2/mediumBitmap-2/longBitmap-2 in TABLE 4) could correspond to the second entry in the list of PCIs/higher layer signaling indices, and so on, the last SSB bitmap could correspond to the last entry in the list of PCIs/higher layer signaling indices.

Further, the UE could receive from the network a MAC CE command to activate/select K_ssb_bm≥1 configured SSB bitmaps out of the total N_ssb_bm configured SSB bitmaps in the ssb-PositionsInBurst field. The association/mapping relationship between the MAC CE activated/selected K_ssb_bm SSB bitmaps and the SC/NSC TRPs in the inter-cell system could follow the above discussed design examples for N_ssb_bm. If the time-domain positions of the SSBs in a burst of the NSC TRP(s) are the same as those of the SC TRP, N_ssb_bm=1 could be configured and/or the UE could be indicated by the network that the NSC TRP(s) and the SC TRP have the same time-domain positions of the SSBs in a burst.

In one embodiment of Option-3, in addition to the higher layer parameter ServingCellConfigCommon, the UE could be configured by the network N_nsc≥0 higher layer parameters NonServingCellConfigCommon's; each NonServingCellConfigCommon contains at least the time-domain positions of the SSBs in a burst of a NSC or a NSC TRP and the associated PCI value/higher layer signaling index value such as CORESETPoolIndex value.

In TABLE 5, snippets of two higher layer parameters NonServingCellConfigCommon-1 and NonServingCellConfigCommon-2 are presented, each corresponding a NSC or a NSC TRP. As can be seen from TABLE 5, the higher layer parameter NonServingCellConfigCommon-1/NonServingCellConfigCommon-2 contains at least one ssb-PositionsInSSB field comprising of at least one SSB bitmap for a given SSB bitmap type (short/medium/long); further, the NonServingCellConfigCommon-1/NonServingCellConfigCommon-2 also contains the PCI value (or the higher layer signaling index value such as CORESETPoolIndex value) associated with the corresponding NSC TRP.

TABLE 5

An example of configuring separate non-serving cell SSB information for separate PCIs/PCI indexes different from the serving cell PCI/PCI index

```
-- ASN1START
-- TAG-SERVINGCELLCONFIGCOMMON-START
NonServingCellConfigCommon-1 ::= SEQUENCE {
   physCellId          PhysCellId      OPTIONAL, -- Cond
HOAndServCellAdd,
   ...
   ssb-PositionsInBurst        CHOICE {
      shortBitmap          BIT STRING (SIZE (4)),
      mediumBitmap         BIT STRING (SIZE (8)),
      longBitmap           BIT STRING (SIZE (64)),
   }                            OPTIONAL, -- Cond AbsFreqSSB
   ...
}
```

TABLE 5-continued

An example of configuring separate non-serving cell SSB information for separate PCIs/PCI indexes different from the serving cell PCI/PCI index

```
-- TAG-SERVINGCELLCONFIGCOMMON-STOP
                                         -- ASN1STOP
-- ASN1START
-- TAG-SERVINGCELLCONFIGCOMMON-START
NonServingCellConfigCommon-2 ::= SEQUENCE {
   physCellId          PhysCellId      OPTIONAL, -- Cond
HOAndServCellAdd,
   ...
   ssb-PositionsInBurst        CHOICE {
      shortBitmap          BIT STRING (SIZE (4)),
      mediumBitmap         BIT STRING (SIZE (8)),
      longBitmap           BIT STRING (SIZE (64)),
   }                            OPTIONAL, -- Cond AbsFreqSSB
   ...
}
-- TAG-SERVINGCELLCONFIGCOMMON-STOP
                                         -- ASN1STOP
```

If the explicit PCI value/higher layer signaling index value such as CORESETPoolIndex value is not configured in the NonServingCellConfigCommon, the UE could know the association/mapping relationship between the configured N_nsc NonServingCellConfigCommon's and the cells/TRPs in an implicit manner. In one example, the first configured NonServingCellConfigCommon (e.g., NonServingCellConfigCommon-1 in TABLE 5) could correspond to the first cell/TRP in a list of cells/TRPs configured/indicated to the UE, the second configured NonServingCellConfigCommon (e.g., NonServingCellConfigCommon-2 in TABLE 5) could correspond to the second cell/TRP in the list of cells/TRPs configured to the UE, and so on, and the last (or the N_nsc-th) configured NonServingCellConfigCommon could correspond to the last cell/TRP in the list of cells/TRPs.

In another example, the first configured NonServingCellConfigCommon (e.g., NonServingCellConfigCommon-1 in TABLE 5) could correspond to the cell/TRP with the lowest PCI value, the second configured NonServingCellConfigCommon (e.g., NonServingCellConfigCommon-2 in TABLE 5) could correspond to the cell/TRP with the second lowest PCI value, and so on, and the last (or the N_nsc-th) configured NonServingCellConfigCommon could correspond to the cell/TRP with the highest PCI value.

Yet in another example, the first configured NonServingCellConfigCommon (e.g., NonServingCellConfigCommon-1 in TABLE 5) could correspond to the cell/TRP with the lowest higher layer signaling index value (e.g., CORESETPoolIndex value), the second configured NonServingCellConfigCommon (e.g., NonServingCellConfigCommon-2 in TABLE 5) could correspond to the cell/TRP with the second lowest higher layer signaling index value (e.g., CORESETPoolIndex value), and so on, and the last (or the N_nsc-th) configured NonServingCellConfigCommon could correspond to the cell/TRP with the highest higher layer signaling index value (e.g., CORESETPoolIndex value). Other implicit association/mapping relationship between the N_nsc configured NonServingCellConfigCommon's and the SC/NSC TRPs are also possible, and shall be known to the UE a prior.

Alternatively, the UE could be explicitly indicated/configured by the network the association/mapping relationship between the N_nsc configured NonServingCellConfigCommon's and the SC/NSC TRPs in the inter-cell system. For example, the UE could be higher layer configured by the network a list of PCIs/higher layer signaling indices. The first configured NonServingCellConfigCommon (e.g., NonServingCellConfigCommon-1 in TABLE 5) could correspond to the first entry in the list of PCIs/higher layer signaling indices, the second configured NonServingCellConfigCommon (e.g., NonServingCellConfigCommon-2 in TABLE 5) could correspond to the second entry in the list of PCIs/higher layer signaling indices, and so on, the last configured NonServingCellConfigCommon could correspond to the last entry in the list of PCIs/higher layer signaling indices.

Other explicit configuration/indication methods of the association/mapping relationship between the N_nsc NonServingCellConfigCommon's and the SC/NSC TRPs are also possible. Further, the UE could receive from the network a MAC CE command to activate/select K_nsc≥1 configured NonServingCellConfigCommon's out of the total N_nsc configured NonServingCellConfigCommon's. The association/mapping relationship between the MAC CE activated/selected K_nsc NonServingCellConfigCommon's and the SC/NSC TRPs in the inter-cell system could follow the above discussed design examples for N_nsc. If the time-domain positions of the SSBs in a burst of the NSC TRP(s) are the same as those of the SC TRP, only the ServingCellConfigCommon could be configured (N_nsc=0) and/or the UE could be indicated by the network that the NSC TRP(s) and the SC TRP have the same time-domain positions of the SSBs in a burst.

The UE could be indicated by the network via higher layer RRC signaling, MAC CE signaling and/or dynamic DCI signaling to follow one or more design options (from Option-1, Option-2 and Option-3) to receive the time-domain positions of the SSBs in a burst of the SC/NSC(s).

In addition to the time-domain positions of the SSBs in a burst, the UE could be indicated by the network the frequency(s) of the SSBs via, e.g., higher layer parameter absoluteFrequencySSB in FrequencyInfoDL. For the inter-cell operation, different cells/TRPs with different PCIs could have different SSB frequencies. There are various means to indicate to the UE the SSB frequencies of different cells/TRPs (PCIs).

In one embodiment of Option-I, N_Fssb≥1 absoluteFrequencySSB fields could be configured in FrequencyInfoDL, with each absoluteFrequencySSB field corresponding to a cell/TRP. The number N_Fssb could be a fixed value (e.g., 2) or dynamically configured by the network. For N_Fssb=1, the single absoluteFrequencySSB field corresponds to the SC or the SC TRP.

In TABLE 6, a snippet of the higher layer parameter FrequencyInfoDL containing N_Fssb=2 absoluteFrequencySSB fields (absoluteFrequencySSB-1 and absoluteFrequencySSB-2) is provided; absoluteFrequencySSB-1 indicates the SSB frequency of the SC TRP, and absoluteFrequencySSB-2 indicates the SSB frequency of a NSC TRP.

TABLE 6

An example of higher layer parameter FrequencyInfoDL

-- ASN1START
-- TAG-FREQUENCYINFODL-START
FrequencyInfoDL ::=       SEQUENCE {
    absoluteFrequencySSB-1    ARFCN-ValueNR    OPTIONAL,
                                               -- Cond
SpCellAdd
    absoluteFrequencySSB-2    ARFCN-ValueNR    OPTIONAL,
                                               -- Cond TABLE 6-continued An example of higher layer parameter FrequencyInfoDL SpCellAdd
    . . .
}
-- TAG-FREQUENCYINFODL-STOP
-- ASN1STOP The UE could know the association/mapping relationship between the N_Fssb absoluteFrequencySSB fields and the cells/TRPs in an implicit manner. In one example, the first absoluteFrequencySSB field could correspond to the first cell/TRP in a list of cells/TRPs configured/indicated to the UE, the second absoluteFrequencySSB field could correspond to the second cell/TRP in the list of cells/TRPs configured to the UE, and so on, and the last (or the N_Fssb-th) absoluteFrequencySSB field could correspond to the last cell/TRP in the list of cells/TRPs. In another example, the first absoluteFrequencySSB field could correspond to the cell/TRP with the lowest PCI value, the second absoluteFrequencySSB field could correspond to the cell/TRP with the second lowest PCI value, and so on, and the last (or the N_Fssb-th) absoluteFrequencySSB field could correspond to the cell/TRP with the highest PCI value.

Yet in another example, the first absoluteFrequencySSB field could correspond to the cell/TRP with the lowest higher layer signaling index value (e.g., CORESETPoolIndex value), the second absoluteFrequencySSB field could correspond to the cell/TRP with the second lowest higher layer signaling index value (e.g., CORESETPoolIndex value), and so on, and the last (or the N_Fssb-th) absoluteFrequencySSB field could correspond to the cell/TRP with the highest higher layer signaling index value (e.g., CORESETPoolIndex value). For the above examples, the first absoluteFrequencySSB field could correspond to the SC or the SC TRP regardless of its position in the list of cells/TRPs configured/indicated to the UE or its associated PCI value/higher layer signaling index value (such as CORESETPoolIndex value). Other implicit association/mapping relationship between the N_Fssb absoluteFrequencySSB fields and the SC/NSC TRPs are also possible, and shall be known to the UE a prior.

Alternatively, the UE could be explicitly indicated/configured by the network the association/mapping relationship between the N_Fssb absoluteFrequencySSB fields and the SC/NSC TRPs in the inter-cell system. For example, the UE could be higher layer configured by the network a list of PCIs/higher layer signaling indices. The first ssb-absoluteFrequencySSB field could correspond to the first entry in the list of PCIs/higher layer signaling indices, the second absoluteFrequencySSB field could correspond to the second entry in the list of PCIs/higher layer signaling indices, and so on, the last absoluteFrequencySSB field could correspond to the last entry in the list of PCIs/higher layer signaling indices. Other explicit configuration/indication methods of the association/mapping relationship between the N_Fssb absoluteFrequencySSB fields and the SC/NSC TRPs are also possible.

Further, the UE could receive from the network a MAC CE command to activate/select K_Fssb≥1 absoluteFrequencySSB fields out of the total N_Fssb absoluteFrequencySSB fields. The association/mapping relationship between the MAC CE activated/selected K_Fssb absoluteFrequencySSB fields and the SC/NSC TRPs in the inter-cell system could follow the above discussed design examples for N_Fssb. If the SSB frequency of the NSC TRP(s) is the same as that of the SC TRP, N_Fssb=1 could be configured and/or the UE could be indicated by the network that the NSC TRP(s) and the SC TRP have the same SSB frequency.

In one embodiment of Option-II, the UE could be configured by the network N_freq≥1 higher layer parameters FrequencyInfoDL's; each FrequencyInfoDL contains at least the SSB frequency of the SC TRP or a NSC TRP.

In TABLE 7, snippets of two higher layer parameters FrequencyInfoDL-1 and FrequencyInfoDL-2 are presented; FrequencyInfoDL-1 corresponds the SC or the SC TRP, and FrequencyInfoDL-2 corresponds to a NSC or a NSC TRP. As can be seen from TABLE 7, the higher layer parameter FrequencyInfoDL-1/FrequencyInfoDL-2 contains at least one absoluteFrequencySSB field.

TABLE 7

An example of configuring separate frequency domain
SSB information for separate PCIs/PCI indexes

```
-- ASN1START
-- TAG-FREQUENCYINFODL-START
FrequencyInfoDL-1 ::=    SEQUENCE {
   absoluteFrequencySSB   ARFCN-ValueNR   OPTIONAL, -- Cond SpCellAdd
   ...
}
-- TAG-FREQUENCYINFODL-STOP
-- ASN1STOP
-- ASN1START
-- TAG-FREQUENCYINFODL-START
FrequencyInfoDL-2 ::=    SEQUENCE {
   absoluteFrequencySSB   ARFCN-ValueNR   OPTIONAL, -- Cond SpCellAdd
   ...
}
-- TAG-FREQUENCYINFODL-STOP
-- ASN1STOP
```

The UE could know the association/mapping relationship between the N_freq FrequencyInfoDL's and the cells/TRPs in an implicit manner. In one example, the first FrequencyInfoDL (e.g., FrequencyInfoDL-1 in TABLE 7) could correspond to the first cell/TRP in a list of cells/TRPs configured/indicated to the UE, the second FrequencyInfoDL (e.g., FrequencyInfoDL-2 in TABLE 7) could correspond to the second cell/TRP in the list of cells/TRPs configured to the UE, and so on, and the last (or the N_freq-th) FrequencyInfoDL could correspond to the last cell/TRP in the list of cells/TRPs. In another example, the first FrequencyInfoDL (e.g., FrequencyInfoDL-1 in TABLE 7) could correspond to the cell/TRP with the lowest PCI value, the second FrequencyInfoDL (e.g., FrequencyInfoDL-2 in TABLE 7) could correspond to the cell/TRP with the second lowest PCI value, and so on, and the last (or the N_freq-th) FrequencyInfoDL could correspond to the cell/TRP with the highest PCI value.

Yet in another example, the first FrequencyInfoDL (e.g., FrequencyInfoDL-1 in TABLE 7) could correspond to the cell/TRP with the lowest higher layer signaling index value (e.g., CORESETPoolIndex value), the second FrequencyInfoDL (e.g., FrequencyInfoDL-2 in TABLE 7) could correspond to the cell/TRP with the second lowest higher layer signaling index value (e.g., CORES ETPoolIndex value), and so on, and the last (or the N_freq-th) FrequencyInfoDL could correspond to the cell/TRP with the highest higher layer signaling index value (e.g., CORESETPoolIndex value). For the above examples, the first FrequencyInfoDL (e.g., FrequencyInfoDL-1 in TABLE 7) could correspond to the SC or the SC TRP regardless of its position in the list of cells/TRPs configured/indicated to the UE or its associated PCI value/higher layer signaling index value (such as CORESETPoolIndex value). Other implicit association/mapping relationship between the N_freq FrequencyInfoDL's and the SC/NSC TRPs are also possible, and shall be known to the UE a prior.

TABLE 8

Another example of configuring separate frequency domain
SSB information for separate PCIs/PCI indexes

```
-- ASN1START
-- TAG-FREQUENCYINFODL-START
FrequencyInfoDL-1 ::=       SEQUENCE {
   physCellId          PhysCellId           OPTIONAL, -- Cond HOAndServCellAdd,
   absoluteFrequencySSB    ARFCN-ValueNR        OPTIONAL, -- Cond SpCellAdd
   ...
}
-- TAG-FREQUENCYINFODL-STOP
-- ASN1STOP
-- ASN1START
-- TAG-FREQUENCYINFODL-START
FrequencyInfoDL-2 ::=       SEQUENCE {
   physCellId          PhysCellId           OPTIONAL, -- Cond HOAndServCellAdd,
   absoluteFrequencySSB    ARFCN-ValueNR        OPTIONAL, -- Cond SpCellAdd
   ...
}
-- TAG-FREQUENCYINFODL-STOP
-- ASN1STOP
```

Alternatively, the UE could be explicitly indicated/configured by the network the association/mapping relationship between the N_freq FrequencyInfoDL's and the SC/NSC TRPs in the inter-cell system. For example, the UE could be higher layer configured by the network a list of PCIs/higher layer signaling indices. The first FrequencyInfoDL (e.g., FrequencyInfoDL-1 in TABLE 7) could correspond to the first entry in the list of PCIs/higher layer signaling indices, the second FrequencyInfoDL (e.g., FrequencyInfoDL-2 in TABLE 7) could correspond to the second entry in the list of PCIs/higher layer signaling indices, and so on, the last FrequencyInfoDL could correspond to the last entry in the list of PCIs/higher layer signaling indices. For another example, the explicit PCI value/higher layer signaling index value such as CORESETPoolIndex value could be incorporated into the higher layer parameter FrequencyInfoDL.

In TABLE 8, snippets of two higher layer parameters FrequencyInfoDL-1 and FrequencyInfoDL-2 are presented; FrequencyInfoDL-1 corresponds the SC or the SC TRP, and FrequencyInfoDL-2 corresponds to a NSC or a NSC TRP. As can be seen from TABLE 8, an additional parameter is incorporated in both FrequencyInfoDL-1 and FrequencyInfoDL-2 to indicate the associated PCI value (or higher layer signaling index value such as CORESETPoolIndex value). Other explicit configuration/indication methods of the association/mapping relationship between the N_freq FrequencyInfoDL's and the SC/NSC TRPs are also possible.

Further, the UE could receive from the network a MAC CE command to activate/select K_freq≥1 FrequencyInfoDL's out of the total N_freq FrequencyInfoDL's. The association/mapping relationship between the MAC CE activated/selected K_freq FrequencyInfoDL's and the SC/NSC TRPs in the inter-cell system could follow the above discussed design examples for N_freq. If the SSB frequency of the NSC TRP(s) is the same as that of the SC TRP, N_freq=1 could be configured and/or the UE could be indicated by the network that the NSC TRP(s) and the SC TRP have the same SSB frequency.

The UE could be indicated by the network via higher layer RRC signaling, MAC CE signaling and/or dynamic DCI signaling to follow one or more design options (from Option-I and Option-II) to receive the SSB frequency(s) of the SC/NSC(s).

The rate matching parameters for the NSC's PDSCH around the SSBs of interest could also depend on the QCL assumptions of the NSC's PDSCH and the SSBs from the SC TRP, NSC TRP(s) or both of the SC and NSC TRPs. For the inter-cell operation (e.g., the inter-cell mobility in FIG. 8 and the inter-cell multi-TRP operation in FIG. 9), the QCL source RS for the NSC's PDSCH could be a SC's SSB or a NSC's SSB. For one or more given SSBs (and therefore, their associated time-domain positions in a burst, frequencies and QCL assumptions), there are various means to indicate to the UE the corresponding rate matching parameters for a given NSC's PDSCH (and therefore, its associated QCL assumption).

FIG. 10 illustrates an example of rate matching parameters/patterns 1000 for inter-cell beam indication according to embodiments of the present disclosure. An embodiment of the rate matching parameters/patterns 1000 shown in FIG. 10 is for illustration only.

In one embodiment of Option-A, for a given TCI state, which, e.g., indicates the SSB as the QCL source RS (the given TCI state could indicate other RS than the SSB such as TRS as the QCL source RS), the UE could be higher layer configured/indicated by the network its corresponding rate matching parameter(s) associated with one or more TCI states indicating the SSB as the QCL source RS; the associated one or more TCI states could be associated with different cells/TRPs with different PCIs/higher layer signaling index values such as CORESETPoolIndex values. As the SSB could be from the SC TRP or a NSC TRP, a TCI state could also be associated with the SC TRP or a NSC TRP. There are various means to differentiate the TCI states between the SC TRP and the NSC TRP(s).

For instance, the total TCI states could be divided into multiple TCI state groups, and each TCI state group (and therefore, the TCI states therein) is associated with either the SC TRP or a NSC TRP. For another example, the explicit PCI value/higher layer signaling index value such as CORESETPoolIndex value could be indicated in/associated with each TCI state.

Examples of details about the association between the TCI states and the SC/NSC TRP(s) may be according to US 2022/0046458 filed Aug. 4, 2021 and U.S. patent application Ser. No. 17/584,239 filed Jan. 25, 2022, both of which are incorporated by reference herein.

In this disclosure, for illustrative purpose, the TCI states are categorized as the TCI state(s) associated with the SC TRP and the TCI state(s) associated with the NSC TRP(s). In FIG. 10, a bitmap depicting the association between the rate matching parameters for a given TCI state and one or more other TCI states is presented. In this example, a single NSC TRP is deployed in the inter-cell system, and a total of two TCI states are associated with each TRP (i.e., the SC TRP or the NSC TRP).

It can be seen from FIG. 10 that the rate matching parameters for a given TCI state could be associated with a single TCI state associated with the SC TRP, a single TCI state associated with the NSC TRP, or two separate TCI states associated with the SC TRP and the NSC TRP. For instance, for TCI state #A_1 associated with the SC TRP, the corresponding rate matching parameter (RMP) associated with TCI state #A_1 (associated with the SC TRP) is RMP_1-1. For another example, for TCI state #B_2 associated with the NSC TRP, the corresponding RMP associated with TCI state #A_1 (associated with the SC TRP) and TCI state #B_1 (associated with the NSC TRP) is RMP_5-4. Further, as illustrated in FIG. 10, TCI state #A_1, TCI state #A_2, TCI state #B_1 and TCI state #B_2 contain SSB #A_1, SSB #A_2, SSB #B_1 and SSB #B_2 as the QCL source RSs, respectively.

Hence, if the QCL source RS for a NSC's PDSCH is SSB #A_1 (i.e., TCI state #A_1) and the UE is indicated/configured by the network to rate match the NSC's PDSCH around SSB #A_1 (i.e., TCI state #A_1) and SSB #B_2 (i.e., TCI state #B_2), the corresponding RMP is RMP_6-1. The example shown in FIG. 10 can be generalized to the inter-cell system with more than one NSCs or NSC TRPs with each SC/NSC TRP associated with more than two TCI states.

FIG. 11 illustrates another example of rate matching parameters/patterns 1100 for inter-cell beam indication according to embodiments of the present disclosure. An embodiment of the rate matching parameters/patterns 1100 shown in FIG. 11 is for illustration only.

In one embodiment of Option-B, the UE could be higher layer configured/indicated by the network the rate matching parameter(s) associated with one or more TCI states indicating the SSB as the QCL source RS; the associated one or more TCI states could be associated with different cells/TRPs with different PCIs/higher layer signaling index values such as CORESETPoolIndex values.

In FIG. 11, a bitmap depicting the association between the rate matching parameters and one or more TCI states is presented. In this example, a single NSC TRP is deployed in the inter-cell system, and a total of two TCI states are associated with each TRP (i.e., the SC TRP or the NSC TRP). It can be seen from FIG. 11 that the rate matching parameters could be associated with a single TCI state associated with the SC TRP, a single TCI state associated with the NSC TRP, or two separate TCI states associated with the SC TRP and the NSC TRP. For instance, the rate matching parameter (RMP) associated with TCI state #A_1 (associated with the SC TRP) is RMP_1.

For another example, the RMP associated with TCI state #A_1 (associated with the SC TRP) and TCI state #B_1 (associated with the NSC TRP) is RMP_5. Further, as illustrated in FIG. 11, TCI state #A_1, TCI state #A_2, TCI state #B_1 and TCI state #B_2 contain SSB #A_1, SSB #A_2, SSB #B_1 and SSB #B_2 as the QCL source RSs, respectively. Hence, if the UE is indicated/configured by the network to rate match the NSC's PDSCH around SSB #A_1 (i.e., TCI state #A_1) and SSB #B_2 (i.e., TCI state #B_2), the corresponding RMP is RMP_6.

The example shown in FIG. 11 can be generalized to the inter-cell system with more than one NSCs or NSC TRPs with each SC/NSC TRP associated with more than two TCI states.

In one embodiment of Option-C, for a given TCI state, which, e.g., indicates the SSB as the QCL source RS (the given TCI state could indicate other RS than the SSB such as TRS as the QCL source RS), the UE could be higher layer configured/indicated by the network its corresponding rate matching parameter(s) associated with one or more cells/TRPs (and therefore, their associated TCI states indicating the SSB as the QCL source RS); the associated one or more cells/TRPs could be associated with different PCIs/higher layer signaling index values such as CORESETPoolIndex values.

FIG. 12 illustrates yet another example of rate matching parameters/patterns 1200 for inter-cell beam indication according to embodiments of the present disclosure. An embodiment of the rate matching parameters/patterns 1200 shown in FIG. 12 is for illustration only.

In FIG. 12, a bitmap depicting the association between the rate matching parameters for a given TCI state and the cells/TRPs in the inter-cell system is presented. In this example, a single NSC TRP is deployed in the inter-cell system, and a total of two TCI states are associated with each TRP (i.e., the SC TRP or the NSC TRP).

It can be seen from FIG. 12 that the rate matching parameters for a given TCI state could be associated with the SC TRP (and therefore, its associated TCI states TCI state #A_1 and TCI state #A_2), the NSC TRP (and therefore, its associated TCI states TCI state #B_1 and TCI state #B_2), or both SC and NSC TRPs (and therefore, their associated TCI states TCI state #A_1, TCI state #A_2, TCI state #B_1 and TCI state #B_2).

For instance, for TCI state #A_1 associated with the SC TRP, the corresponding rate matching parameter (RMP) associated with the SC TRP is RMP_A-1. For another example, for TCI state #B_2 associated with the NSC TRP, the corresponding RMP associated with both the SC TRP and the NSC TRP is RMP_C-4. Further, as illustrated in FIG. 12, TCI state #A_1, TCI state #A_2, TCI state #B_1 and TCI state #B_2 contain SSB #A_1, SSB #A_2, SSB #B_1 and SSB #B_2 as the QCL source RSs, respectively. Hence, if the QCL source RS for a NSC's PDSCH is SSB #A_1 (i.e., TCI state #A_1) and the UE is indicated/configured by the network to rate match the NSC's PDSCH around SSB #A_1 (i.e., TCI state #A_1 associated with the SC TRP) and SSB #B_2 (i.e., TCI state #B_2 associated with the NSC TRP), the corresponding RMP is RMP_C-1. The example shown in FIG. 12 can be generalized to the inter-cell system with more than one NSCs or NSC TRPs with each SC/NSC TRP associated with more than two TCI states.

In one embodiment of Option-D, the UE could be higher layer configured/indicated by the network the rate matching parameter(s) associated with one or more cells/TRPs (and therefore, their associated TCI states indicating the SSB as the QCL source RS); the associated one or more cells/TRPs could be associated with different PCIs/higher layer signaling index values such as CORESETPoolIndex values.

FIG. 13 illustrates yet another example of rate matching parameters/patterns 1300 for inter-cell beam indication according to embodiments of the present disclosure. An embodiment of the rate matching parameters/patterns 1300 shown in FIG. 13 is for illustration only.

In FIG. 13, a bitmap depicting the association between the rate matching parameters and the cells/TRPs in the inter-cell system is presented. In this example, a single NSC TRP is deployed in the inter-cell system, and a total of two TCI states are associated with each TRP (i.e., the SC TRP or the NSC TRP). It can be seen from FIG. 13 that the rate matching parameters could be associated with the SC TRP (and therefore, its associated TCI states TCI state #A_1 and TCI state #A_2), the NSC TRP (and therefore, its associated TCI states TCI state #B_1 and TCI state #B_2), or both SC and NSC TRPs (and therefore, their associated TCI states TCI state #A_1, TCI state #A_2, TCI state #B_1 and TCI state #B_2).

For instance, the rate matching parameter (RMP) associated with the SC TRP is RMP_A. For another example, the RMP associated with both the SC TRP and the NSC TRP is RMP_C. Further, as illustrated in FIG. 13, TCI state #A_1, TCI state #A_2, TCI state #B_1 and TCI state #B_2 contain SSB #A_1, SSB #A_2, SSB #B_1 and SSB #B_2 as the QCL source RSs, respectively. Hence, if the UE is indicated/configured by the network to rate match the NSC's PDSCH around SSB #A_1 (i.e., TCI state #A_1 associated with the SC TRP) and SSB #B_2 (i.e., TCI state #B_2 associated with the NSC TRP), the corresponding RMP is RMP_C. The example shown in FIG. 13 can be generalized to the inter-cell system with more than one NSCs or NSC TRPs with each SC/NSC TRP associated with more than two TCI states.

The UE could be indicated by the network via higher layer RRC signaling, MAC CE signaling and/or dynamic DCI signaling to follow one or more design options (from Option-A, Option-B, Option-C, and Option-D) to receive the association between the rate matching parameters and the TCI states associated with the SC/NSC(s).

Figure 14:
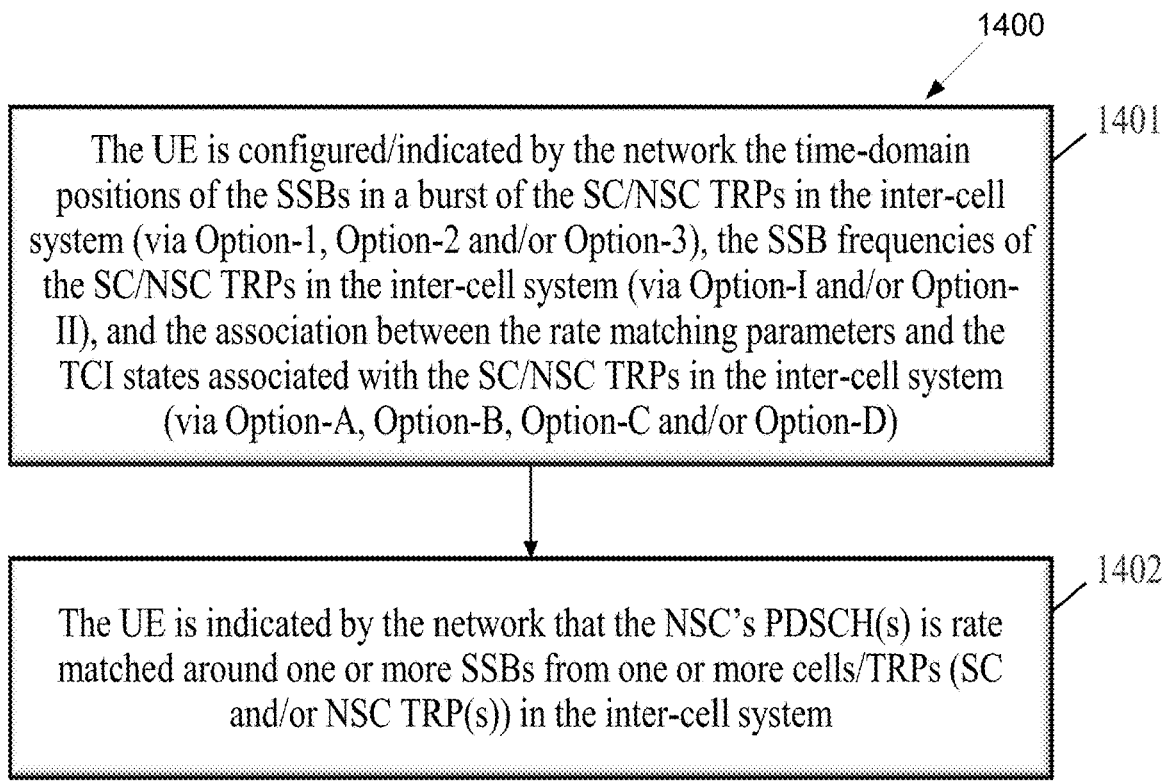
FIG. 14 illustrates a flowchart of UE procedure for rate matching downlink channel(s) according to embodiments of the present disclosure.

FIG. 14 illustrates a flowchart of UE procedure 1400 for rate matching downlink channel(s) according to embodiments of the present disclosure. The UE procedures 1400 as may be performed by a UE (e.g., 111-116 as illustrated in FIG. 1). An embodiment of the UE procedures 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

In FIG. 14, the rate matching mechanism/procedure for the NSC's PDSCH around the SSBs from the SC TRP only, the NSC TRP(s) only or both of the SC and NSC TRPs is presented.

In 1401, the UE is configured/indicated by the network the SSB information of the SC/NSC TRP(s) for PDSCH rate matching, including at least the time-domain positions of the SSBs in a burst (e.g., via Option-1, Option-2, and/or Option-3 discussed above), the SSB frequencies (e.g., via Option-I and/or Option-II discussed above) and the association between the rate matching parameters and the TCI states associated with the SC/NSC TRPs (e.g., via Option-A, Option-B, Option-C, and/or Option-D discussed above). This indication could be via higher layer (RRC) or/and MAC CE or/and DCI based signaling. This indication could be via a separate (dedicated) parameter or joint with another parameter.

In one example, the UE could be configured/indicated by the network the time-domain positions of the SSBs in a burst of the SC TRP or both of the SC TRP and the NSC TRP(s).

In one example, the UE could be configured/indicated by the network the SSB frequencies of the SC TRP or both of the SC TRP and the NSC TRP(s).

In one example, the UE could be configured/indicated by the network the association between the rate matching parameters and the TCI states associated with the SC TRP, the NSC TRP(s) or both of the SC TRP and the NSC TRP(s).

In one example, the UE could be configured/indicated by the network the time-domain positions of the SSBs in a burst and SSB frequencies of the SC TRP or both of the SC TRP and the NSC TRP(s).

In one example, the UE could be configured/indicated by the network the time-domain positions of the SSBs in a burst of the SC TRP and/or the NSC TRP(s) and the association between the rate matching parameters and the TCI states associated with the SC TRP, the NSC TRP(s) or both of the SC TRP and the NSC TRP(s).

In one example, the UE could be configured/indicated by the network the SSB frequencies of the SC TRP or both of the SC TRP and the NSC TRP(s) and the association between the rate matching parameters and the TCI states associated with the SC TRP, the NSC TRP(s) or both of the SC TRP and the NSC TRP(s).

In one example, the UE could be configured/indicated by the network the time-domain positions of the SSBs in a burst of the SC TRP or both of the SC TRP and the NSC TRP(s), and the SSB frequencies of the SC TRP or both of the SC TRP and the NSC TRP(s), and the association between the rate matching parameters and the TCI states associated with the SC TRP, the NSC TRP(s) or both of the SC TRP and the NSC TRP(s).

If the UE is indicated by the network the time-domain positions of the SSBs in a burst of the NSC TRP(s) but not the SSB frequencies of the NSC TRP(s), the UE could assume that the SSB frequencies of the NSC TRP(s) are the same as the SSB frequencies of the SC TRP. If the UE is indicated by the network the SSB frequencies of the NSC TRP(s) but not the time-domain positions of the SSBs in a burst of the NSC TRP(s), the UE could assume that the time-domain positions of the SSBs in a burst of the NSC TRP(s) are the same as those of the SC TRP.

In 1402, the UE is indicated by the network that the PDSCH(s) from the NSC TRP(s) is rate matched around one or more SSBs from one or more cells/TRPs (the SC TRP and/or the NSC TRP(s)). This indication could be via higher layer (RRC) or/and MAC CE or/and DCI based signaling. This indication could be via a separate (dedicated) parameter or joint with another parameter.

The UE could be configured/indicated by the network that the PDSCH(s) transmitted from the NSC TRP(s) is rate matched around one or more SSBs from the SC TRP only: (1) Configuration-1.1: the UE could be configured/indicated by the network that the rate matching parameters for the NSC's PDSCH(s) are determined according to the time-domain positions of the SSBs in a burst and the SSB frequencies of the SC TRP; and (2) Configuration-1.2: the UE could be configured/indicated by the network that the rate matching parameters for the NSC's PDSCH(s) are determined according to the time-domain positions of the SSBs in a burst, the SSB frequencies, the TCI state(s) associated with the NSC's PDSCH(s) and the TCI state(s) associated with the SC TRP indicating the SSB(s) of interest as the QCL source RS(s).

For dynamic DCI based signaling, one or more indicators could be incorporated in the DCI, e.g., in the TCI state(s) associated with the NSC's PDSCH(s), that schedules the NSC's PDSCH(s) to indicate to the UE that one or more of Configuration-1.1 and Configuration-1.2 is used for determining the rate matching parameters for the NSC's PDSCH(s). Other combinations of the time-domain positions of the SSBs in a burst of the SC TRP, the SSB frequencies of the SC TRP, the TCI state(s) associated with the NSC's PDSCH(s) and the TCI state(s) associated with the SC TRP indicating the SSB(s) of interest as the QCL source RS(s) than those presented in Configuration-1.1 and Configuration-1.2 to determine the rate matching parameters for the NSC's PDSCH(s) are also possible.

The UE could be configured/indicated by the network that the PDSCH(s) transmitted from the NSC TRP(s) is rate matched around one or more SSBs from the NSC TRP(s) only: (1) Configuration-2.1: the UE could be configured/indicated by the network that the rate matching parameters for the NSC's PDSCH(s) are determined according to the indicated time-domain positions of the SSBs in a burst of the NSC TRP(s) assuming that the SSB frequencies of the NSC TRP(s) are the same as those of the SC TRP; (2) Configuration-2.2: the UE could be configured/indicated by the network that the rate matching parameters for the NSC's PDSCH(s) are determined according to the indicated SSB frequencies of the NSC TRP(s) assuming that the time-domain positions of the SSBs in a burst of the NSC TRP(s) are the same as those of the SC TRP; (3) Configuration-2.3: the UE could be configured/indicated by the network that the rate matching parameters for the NSC's PDSCH(s) are determined according to the indicated time-domain positions of the SSBs in a burst and the indicated SSB frequencies of the NSC TRP(s); (4) Configuration-2.4: the UE could be configured/indicated by the network that the rate matching parameters for the NSC's PDSCH(s) are determined according to the TCI state(s) associated with the NSC's PDSCH(s) and the TCI state(s) associated with the NSC TRP(s) indicating the SSB(s) of interest as the QCL source RS(s) assuming that the time-domain positions of the SSBs in a burst of the NSC TRP(s) and the SSB frequencies of the NSC TRP(s) are the same as those of the SC TRP; (5) Configuration-2.5: the UE could be configured/indicated by the network that the rate matching parameters for the NSC's PDSCH(s) are determined according to the indicated time-domain positions of the SSBs in a burst of the NSC TRP(s), the TCI state(s) associated with the NSC's PDSCH(s) and the TCI state(s) associated with the NSC TRP(s) indicating the SSB(s) of interest as the QCL source RS(s) assuming that the SSB frequencies of the NSC TRP(s) are the same as those of the SC TRP; (6) Configuration-2.6: the UE could be configured/indicated by the network that the rate matching parameters for the NSC's PDSCH(s) are determined according to the indicated SSB frequencies of the NSC TRP(s), the TCI state(s) associated with the NSC's PDSCH(s) and the TCI state(s) associated with the NSC TRP(s) indicating the SSB(s) of interest as the QCL source RS(s) assuming that the time-domain positions of the SSBs in a burst of the NSC TRP(s) are the same as those of the SC TRP; and (7) Configuration-2.7: the UE could be configured/indicated by the network that the rate matching parameters for the NSC's PDSCH(s) are determined according to the indicated time-domain positions of the SSBs in a burst of the NSC TRP(s), the indicated SSB frequencies of the NSC TRP(s), the TCI state(s) associated with the NSC's PDSCH(s) and the TCI state(s) associated with the NSC TRP(s) indicating the SSB(s) of interest as the QCL source RS(s).

For dynamic DCI based signaling, one or more indicators could be incorporated in the DCI, e.g., in the TCI state(s) associated with the NSC's PDSCH(s), that schedules the NSC's PDSCH(s) to indicate to the UE that one or more of Configuration-2.1, Configuration-2.2, Configuration-2.3, Configuration-2.4, Configuration-2.5, Configuration-2.6, and Configuration-2.7 is used for determining the rate matching parameters for the NSC's PDSCH(s). Other combinations of the time-domain positions of the SSBs in a burst of the NSC TRP(s), the SSB frequencies of the NSC TRP(s), the TCI state(s) associated with the NSC's PDSCH(s) and the TCI state(s) associated with the NSC TRP(s) indicating the SSB(s) of interest as the QCL source RS(s) than those presented in Configuration-2.1, Configuration-2.2, Configuration-2.3, Configuration-2.4, Configuration-2.5, Configuration-2.6, and Configuration-2.7 to determine the rate matching parameters for the NSC's PDSCH(s) are also possible.

The UE could be configured/indicated by the network that the PDSCH(s) transmitted from the NSC TRP(s) is rate matched around the SSBs from both the SC TRP and the NSC TRP(s).

In one example of Configuration-3.1, the UE could be configured/indicated by the network that the rate matching parameters for the NSC's PDSCH(s) are determined according to the indicated time-domain positions of the SSBs in a burst of both the SC TRP and the NSC TRP(s) assuming that the SSB frequencies of the NSC TRP(s) are the same as those of the SC TRP.

In one example of Configuration-3.2, the UE could be configured/indicated by the network that the rate matching parameters for the NSC's PDSCH(s) are determined according to the indicated SSB frequencies of both the SC TRP and the NSC TRP(s) assuming that the time-domain positions of the SSBs of the NSC TRP(s) are the same as those of the SC TRP.

In one example of Configuration-3.3, the UE could be configured/indicated by the network that the rate matching parameters for the NSC's PDSCH(s) are determined according to the indicated time-domain positions of the SSBs in a burst of both the SC TRP and the NSC TRP(s) and the indicated SSB frequencies of both the SC TRP and the NSC TRP(s).

In one example of Configuration-3.4, the UE could be configured/indicated by the network that the rate matching parameters for the NSC's PDSCH(s) are determined according to the TCI state(s) associated with the NSC's PDSCH(s), the TCI state(s) associated with the SC TRP indicating the corresponding SSB(s) of interest as the QCL source RS(s) and the TCI state(s) associated with the NSC TRP(s) indicating the corresponding SSB(s) of interest as the QCL source RS(s) assuming that the time-domain positions of the SSBs of the NSC TRP(s) and the SSB frequencies of the NSC TRP(s) are the same as those of the SC TRP.

In one example of Configuration-3.5, the UE could be configured/indicated by the network that the rate matching parameters for the NSC's PDSCH(s) are determined according to the indicated time-domain positions of the SSBs in a burst of both the SC TRP and the NSC TRP(s), the TCI state(s) associated with the NSC's PDSCH(s), the TCI state(s) associated with the SC TRP indicating the corresponding SSB(s) of interest as the QCL source RS(s), and the TCI state(s) associated with the NSC TRP(s) indicating the corresponding SSB(s) of interest as the QCL source RS(s) assuming that the SSB frequencies of the NSC TRP(s) are the same as those of the SC TRP.

In one example of Configuration-3.6, the UE could be configured/indicated by the network that the rate matching parameters for the NSC's PDSCH(s) are determined according to the indicated SSB frequencies of both the SC TRP and the NSC TRP(s), the TCI state(s) associated with the NSC's PDSCH(s), the TCI state(s) associated with the SC TRP indicating the corresponding SSB(s) of interest as the QCL source RS(s), and the TCI state(s) associated with the NSC TRP(s) indicating the corresponding SSB(s) of interest as the QCL source RS(s) assuming that the time-domain positions of the SSBs of the NSC TRP(s) are the same as those of the SC TRP.

In one example of Configuration-3.7, the UE could be configured/indicated by the network that the rate matching parameters for the NSC's PDSCH(s) are determined according to the indicated time-domain positions of the SSBs in a burst of both the SC TRP and the NSC TRP(s), the indicated SSB frequencies of both the SC TRP and the NSC TRP(s), the TCI state(s) associated with the NSC's PDSCH(s), the TCI state(s) associated with the SC TRP indicating the SSB(s) of interest as the QCL source RS(s), and the TCI state(s) associated with the NSC TRP(s) indicating the SSB(s) of interest as the QCL source RS(s).

For dynamic DCI based signaling, one or more indicators could be incorporated in the DCI, e.g., in the TCI state(s) associated with the NSC's PDSCH(s), that schedules the NSC's PDSCH(s) to indicate to the UE that one or more of Configuration-3.1, Configuration-3.2, Configuration-3.3, Configuration-3.4, Configuration-3.5, Configuration-3.6, and Configuration-3.7 is used for determining the rate matching parameters for the NSC's PDSCH(s). Other combinations of the time-domain positions of the SSBs in a burst of the SC TRP and/or the NSC TRP(s), the SSB frequencies of the SC TRP and/or the NSC TRP(s), the TCI state(s) associated with the NSC's PDSCH(s) and the TCI state(s) associated with the SC TRP and/or the NSC TRP(s) indicating the SSB(s) of interest as the QCL source RS(s) than those presented in Configuration-3.1, Configuration-3.2, Configuration-3.3, Configuration-3.4, Configuration-3.5, Configuration-3.6, and Configuration-3.7 to determine the rate matching parameters for the NSC's PDSCH(s) are also possible.

Also in 1402, the UE could be indicated by the network around which active SSB(s) (e.g., in form of the SSB index) the NSC's PDSCH(s) is rate matched and/or whether the active SSB(s) is from the SC TRP or the NSC TRP(s). This indication could be via higher layer (RRC) or/and MAC CE or/and DCI based signaling. This indication could be via a separate (dedicated) parameter or joint with another parameter. For example, the UE could be higher layer configured (via RRC signaling) one or more bitmaps indicating the active SSB(s) (e.g., in form of the SSB index) from the SC TRP and/or the NSC TRP(s). For another example, the UE could receive one or more MAC CE commands activating one or more SSBs (active SSBs) out of all the SSBs from the SC TRP and/or the NSC TRP(s). Yet for another example, the UE could be indicated via dynamic DCI based signaling, e.g., in the TCI state(s) associated with the NSC's PDSCH(s), the active SSB(s) (e.g., in form of the SSB index) from the SC TRP and/or the NSC TRP(s).

The UE could receive PDSCH(s) transmitted from the SC TRP in an inter-cell system shown in FIG. 8 and FIG. 9. The SC TRP could have a different PCI from that of the NSC TRP(s). The PDSCH(s) transmitted from the SC TRP(s) could be rate matched around the SSBs transmitted from the SC TRP, the NSC TRP(s) or both of the SC and NSC TRPs in the inter-cell system.

The UE needs to know the time-domain position(s) (e.g., the time-domain positions in a burst) and the frequency(s) of the SSBs around which the SC's PDSCHs could be rate matched. Further, the rate matching parameters could also depend on the QCL assumptions of the SC's PDSCHs and the SSBs of interest. The SSBs could be transmitted from the SC TRP, the NSC TRP(s) or both of the SC and NSC TRPs. The UE could be configured/indicated by the network via higher layer RRC signaling, MAC CE signaling and/or DCI signaling whether the SC's PDSCHs are rate matched around the SC's SSBs only, the NSC's SSBs only or both of the SC's and NSC's SSBs. In the current 5G NR system, the SC's PDSCHs are rate matched around the SC's SSBs only.

Figure 15:
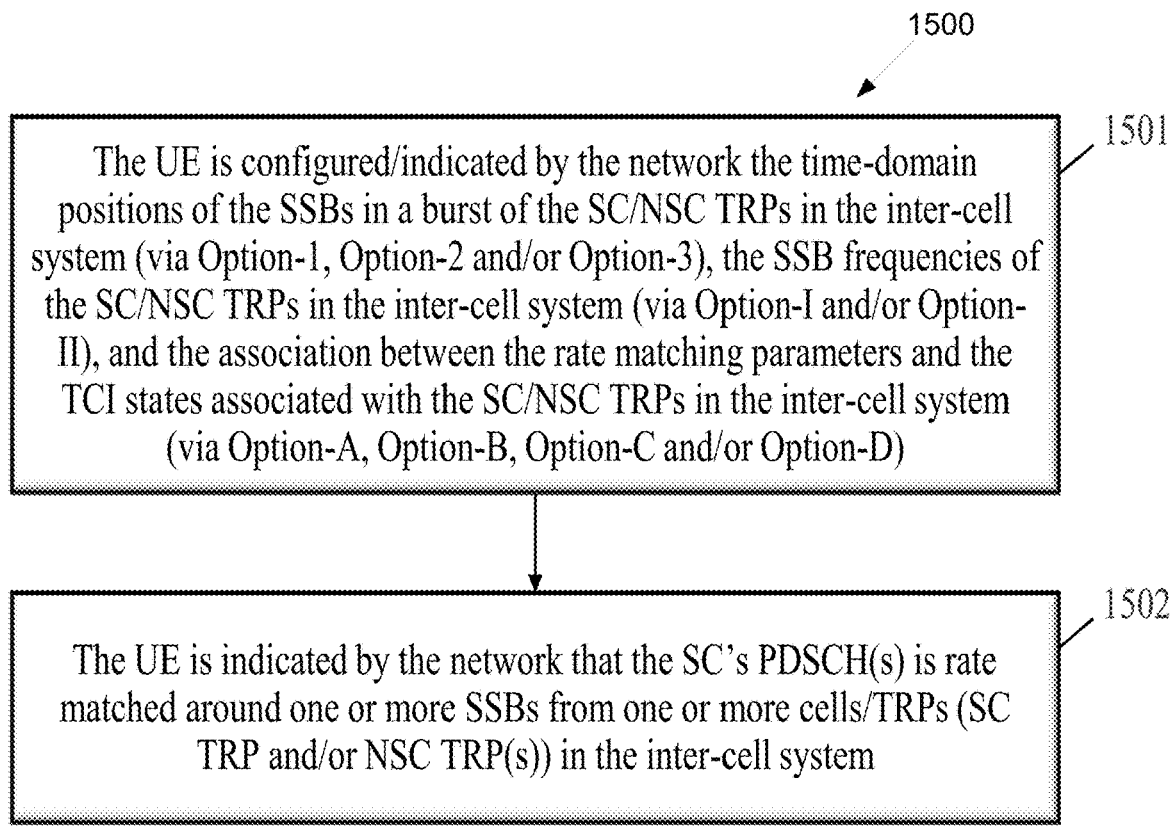
FIG. 15 illustrates another flowchart of UE procedure for rate matching downlink channel(s) according to embodiments of the present disclosure.

FIG. 15 illustrates another flowchart of UE procedure 1500 for rate matching downlink channel(s) according to embodiments of the present disclosure. The UE procedures 1500 as may be performed by a UE (e.g., 111-116 as illustrated in FIG. 1). An embodiment of the UE procedures 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

In FIG. 15, the rate matching mechanism/procedure for the SC's PDSCH around the SSBs from the SC TRP only, the NSC TRP(s) only or both of the SC and NSC TRPs is presented.

As illustrated in FIG. 15, in 1501, the UE is configured/indicated by the network the SSB information of the SC/NSC TRP(s) for PDSCH rate matching, including at least the time-domain positions of the SSBs in a burst (e.g., via Option-1, Option-2 and/or Option-3 discussed above), the SSB frequencies (e.g., via Option-I and/or Option-II discussed above) and the association between the rate matching parameters and the TCI states associated with the SC/NSC TRPs (e.g., via Option-A, Option-B, Option-C and/or Option-D discussed above). This indication could be via higher layer (RRC) or/and MAC CE or/and DCI based signaling. This indication could be via a separate (dedicated) parameter or joint with another parameter.

In one example, the UE could be configured/indicated by the network the time-domain positions of the SSBs in a burst of the SC TRP or both of the SC TRP and the NSC TRP(s).

In one example, the UE could be configured/indicated by the network the SSB frequencies of the SC TRP or both of the SC TRP and the NSC TRP(s).

In one example, the UE could be configured/indicated by the network the association between the rate matching parameters and the TCI states associated with the SC TRP or both of the SC TRP and the NSC TRP(s).

In one example, the UE could be configured/indicated by the network the time-domain positions of the SSBs in a burst and SSB frequencies of the SC TRP or both of the SC TRP and the NSC TRP(s).

In one example, the UE could be configured/indicated by the network the time-domain positions of the SSBs in a burst of the SC TRP or both of the SC TRP and the NSC TRP(s) and the association between the rate matching parameters and the TCI states associated with the SC TRP or both of the SC TRP and the NSC TRP(s).

In one example, the UE could be configured/indicated by the network the SSB frequencies of the SC TRP or both of the SC TRP and the NSC TRP(s) and the association between the rate matching parameters and the TCI states associated with the SC TRP or both of the SC TRP and the NSC TRP(s).

In one example, the UE could be configured/indicated by the network the time-domain positions of the SSBs in a burst of the SC TRP or both of the SC TRP and the NSC TRP(s), and the SSB frequencies of the SC TRP or both of the SC TRP and the NSC TRP(s), and the association between the rate matching parameters and the TCI states associated with the SC TRP or both of the SC TRP and the NSC TRP(s).

If the UE is indicated by the network the time-domain positions of the SSBs in a burst of the NSC TRP(s) but not the SSB frequencies of the NSC TRP(s), the UE could assume that the SSB frequencies of the NSC TRP(s) are the same as the SSB frequencies of the SC TRP. If the UE is indicated by the network the SSB frequencies of the NSC TRP(s) but not the time-domain positions of the SSBs in a burst of the NSC TRP(s), the UE could assume that the time-domain positions of the SSBs in a burst of the NSC TRP(s) are the same as those of the SC TRP.

In 1502, the UE is indicated by the network that the PDSCH(s) from the SC TRP(s) is rate matched around one or more SSBs from one or more cells/TRPs in the inter-cell system. This indication could be via higher layer (RRC) or/and MAC CE or/and DCI based signaling. This indication could be via a separate (dedicated) parameter or joint with another parameter.

The UE could be configured/indicated by the network that the PDSCH(s) transmitted from the SC TRP is rate matched around one or more SSBs from the SC TRP only: (1) Configuration-I.1: the UE could be configured/indicated by the network that the rate matching parameters for the SC's PDSCH(s) are determined according to the time-domain positions of the SSBs in a burst and the SSB frequencies of the SC TRP; and (2) Configuration-I.2: the UE could be configured/indicated by the network that the rate matching parameters for the SC's PDSCH(s) are determined according to the time-domain positions of the SSBs in a burst of the SC TRP, the SSB frequencies of the SC TRP, the TCI state(s) associated with the SC's PDSCH(s) and the TCI state(s) associated with the SC TRP indicating the SSB(s) of interest as the QCL source RS(s).

For dynamic DCI based signaling, one or more indicators could be incorporated in the DCI, e.g., in the TCI state(s) associated with the SC's PDSCH(s), that schedules the SC's PDSCH(s) to indicate to the UE that one or more of Configuration-I.1 and Configuration-I.2 is used for determining the rate matching parameters for the SC's PDSCH(s). Other combinations of the time-domain positions of the SSBs in a burst of the SC TRP, the SSB frequencies of the SC TRP, the TCI state(s) associated with the SC's PDSCH(s) and the TCI state(s) associated with the SC TRP indicating the SSB(s) of interest as the QCL source RS(s) than those presented in Configuration-I.1 and Configuration-I.2 to determine the rate matching parameters for the SC's PDSCH(s) are also possible.

The UE could be configured/indicated by the network that the PDSCH(s) transmitted from the SC TRP is rate matched around one or more SSBs from the NSC TRP(s) only.

In one example of Configuration-II.1, the UE could be configured/indicated by the network that the rate matching parameters for the SC's PDSCH(s) are determined according to the indicated time-domain positions of the SSBs in a burst of the NSC TRP(s) assuming that the SSB frequencies of the NSC TRP(s) are the same as those of the SC TRP.

In one example of Configuration-II.2, the UE could be configured/indicated by the network that the rate matching parameters for the SC's PDSCH(s) are determined according to the indicated SSB frequencies of the NSC TRP(s) assuming that the time-domain positions of the SSBs in a burst of the NSC TRP(s) are the same as those of the SC TRP.

In one example of Configuration-II.3, the UE could be configured/indicated by the network that the rate matching parameters for the SC's PDSCH(s) are determined according to the indicated time-domain positions of the SSBs in a burst and the indicated SSB frequencies of the NSC TRP(s).

In one example of Configuration-II.4, the UE could be configured/indicated by the network that the rate matching parameters for the SC's PDSCH(s) are determined according to the TCI state(s) associated with the SC's PDSCH(s) and the TCI state(s) associated with the NSC TRP(s) indicating the SSB(s) of interest as the QCL source RS(s) assuming that the time-domain positions of the SSBs in a burst of the NSC TRP(s) and the SSB frequencies of the NSC TRP(s) are the same as those of the SC TRP.

In one example of Configuration-II.5, the UE could be configured/indicated by the network that the rate matching parameters for the SC's PDSCH(s) are determined according to the indicated time-domain positions of the SSBs in a burst of the NSC TRP(s), the TCI state(s) associated with the SC's PDSCH(s) and the TCI state(s) associated with the NSC TRP(s) indicating the SSB(s) of interest as the QCL source RS(s) assuming that the SSB frequencies of the NSC TRP(s) are the same as those of the SC TRP.

In one example of Configuration-II.6, the UE could be configured/indicated by the network that the rate matching parameters for the SC's PDSCH(s) are determined according to the indicated SSB frequencies of the NSC TRP(s), the TCI state(s) associated with the SC's PDSCH(s) and the TCI state(s) associated with the NSC TRP(s) indicating the SSB(s) of interest as the QCL source RS(s) assuming that the time-domain positions of the SSBs in a burst of the NSC TRP(s) are the same as those of the SC TRP.

In one example of Configuration-II.7, the UE could be configured/indicated by the network that the rate matching parameters for the SC's PDSCH(s) are determined according to the indicated time-domain positions of the SSBs in a burst of the NSC TRP(s), the indicated SSB frequencies of the NSC TRP(s), the TCI state(s) associated with the SC's PDSCH(s) and the TCI state(s) associated with the NSC TRP(s) indicating the SSB(s) of interest as the QCL source RS(s).

For dynamic DCI based signaling, one or more indicators could be incorporated in the DCI, e.g., in the TCI state(s) associated with the SC's PDSCH(s), that schedules the SC's PDSCH(s) to indicate to the UE that one or more of Configuration-II.1, Configuration-II.2, Configuration-II.3, Configuration-II.4, Configuration-II.5, Configuration-II.6, and Configuration-II.7 is used for determining the rate matching parameters for the SC's PDSCH(s). Other combinations of the time-domain positions of the SSBs in a burst of the NSC TRP(s), the SSB frequencies of the NSC TRP(s), the TCI state(s) associated with the SC's PDSCH(s) and the TCI state(s) associated with the NSC TRP(s) indicating the SSB(s) of interest as the QCL source RS(s) than those presented in Configuration-II.1, Configuration-II.2, Configuration-II.3, Configuration-II.4, Configuration-II.5, Configuration-II.6, and Configuration-II.7 to determine the rate matching parameters for the SC's PDSCH(s) are also possible.

The UE could be configured/indicated by the network that the PDSCH(s) transmitted from the SC TRP(s) is rate matched around the SSBs from both the SC TRP and the NSC TRP(s).

In one example of Configuration-III.1, the UE could be configured/indicated by the network that the rate matching parameters for the SC's PDSCH(s) are determined according to the indicated time-domain positions of the SSBs in a burst of both the SC TRPs and the NSC TRP(s) assuming that the SSB frequencies of the NSC TRP(s) are the same as those of the SC TRP.

In one example of Configuration-III.2, the UE could be configured/indicated by the network that the rate matching parameters for the SC's PDSCH(s) are determined according to the indicated SSB frequencies of both the SC TRP and the NSC TRP(s) assuming that the time-domain positions of the SSBs of the NSC TRP(s) are the same as those of the SC TRP.

In one example of Configuration-III.3, the UE could be configured/indicated by the network that the rate matching parameters for the SC's PDSCH(s) are determined according to the indicated time-domain positions of the SSBs in a burst of both the SC TRP and the NSC TRP(s) and the indicated SSB frequencies of both the SC TRP and the NSC TRP(s).

In one example of Configuration-III.4, the UE could be configured/indicated by the network that the rate matching parameters for the SC's PDSCH(s) are determined according to the TCI state(s) associated with the SC's PDSCH(s), the TCI state(s) associated with the SC TRP indicating the corresponding SSB(s) of interest as the QCL source RS(s) and the TCI state(s) associated with the NSC TRP(s) indicating the corresponding SSB(s) of interest as the QCL source RS(s) assuming that the time-domain positions of the SSBs of the NSC TRP(s) and the SSB frequencies of the NSC TRP(s) are the same as those of the SC TRP.

In one example of Configuration-III.5, the UE could be configured/indicated by the network that the rate matching parameters for the SC's PDSCH(s) are determined according to the indicated time-domain positions of the SSBs in a burst of both the SC TRP and the NSC TRP(s), the TCI state(s) associated with the SC's PDSCH(s), the TCI state(s) associated with the SC TRP indicating the corresponding SSB(s) of interest as the QCL source RS(s), and the TCI state(s) associated with the NSC TRP(s) indicating the corresponding SSB(s) of interest as the QCL source RS(s) assuming that the SSB frequencies of the NSC TRP(s) are the same as those of the SC TRP.

In one example of Configuration-III.6, the UE could be configured/indicated by the network that the rate matching parameters for the SC's PDSCH(s) are determined according to the indicated SSB frequencies of both the SC TRP and the NSC TRP(s), the TCI state(s) associated with the SC's PDSCH(s), the TCI state(s) associated with the SC TRP indicating the corresponding SSB(s) of interest as the QCL source RS(s), and the TCI state(s) associated with the NSC TRP(s) indicating the corresponding SSB(s) of interest as the QCL source RS(s) assuming that the time-domain positions of the SSBs of the NSC TRP(s) are the same as those of the SC TRP.

In one example of Configuration-III.7, the UE could be configured/indicated by the network that the rate matching parameters for the SC's PDSCH(s) are determined according to the indicated time-domain positions of the SSBs in a burst of both the SC TRP and the NSC TRP(s), the indicated SSB frequencies of both the SC TRP and the NSC TRP(s), the TCI state(s) associated with the SC's PDSCH(s), the TCI state(s) associated with the SC TRP indicating the SSB(s) of interest as the QCL source RS(s), and the TCI state(s) associated with the NSC TRP(s) indicating the SSB(s) of interest as the QCL source RS(s).

For dynamic DCI based signaling, one or more indicators could be incorporated in the DCI, e.g., in the TCI state(s) associated with the SC's PDSCH(s), that schedules the SC's PDSCH(s) to indicate to the UE that one or more of Configuration-III.1, Configuration-III.2, Configuration-III.3, Configuration-III.4, Configuration-III.5, Configuration-III.6, and Configuration-III.7 is used for determining the rate matching parameters for the SC's PDSCH(s). Other combinations of the time-domain positions of the SSBs in a burst of the SC TRP and/or the NSC TRP(s), the SSB frequencies of the SC TRP and/or the NSC TRP(s), the TCI state(s) associated with the SC's PDSCH(s) and the TCI state(s) associated with the SC TRP and/or the NSC TRP(s) indicating the SSB(s) of interest as the QCL source RS(s) than those presented in Configuration-III.1, Configuration-III.2, Configuration-III.3, Configuration-III.4, Configuration-III.5, Configuration-III.6, and Configuration-III.7 to determine the rate matching parameters for the SC's PDSCH(s) are also possible.

Also in 1502, the UE could be indicated by the network around which active SSB(s) (e.g., in form of the SSB index) the SC's PDSCH(s) is rate matched and/or whether the active SSB(s) is from the SC TRP or the NSC TRP(s). This indication could be via higher layer (RRC) or/and MAC CE or/and DCI based signaling. This indication could be via a separate (dedicated) parameter or joint with another parameter. For example, the UE could be higher layer configured (via RRC signaling) one or more bitmaps indicating the active SSB(s) (e.g., in form of the SSB index) from the SC TRP and/or the NSC TRP(s). For another example, the UE could receive one or more MAC CE commands activating one or more SSBs (active SSBs) out of all the SSBs from the SC TRP and/or the NSC TRP(s). Yet for another example, the UE could be indicated via dynamic DCI based signaling, e.g., in the TCI state(s) associated with the SC's PDSCH(s), the active SSB(s) (e.g., in form of the SSB index) from the SC TRP and/or the NSC TRP(s).

In one embodiment, PDSCH rate matching around CSI-RSs for tracking (TRSs) and/or CSI-RSs for CSI and/or CSI-RSs for beam management is provided.

The UE could receive CSI-RSs such as tracking reference signals (TRSs) transmitted from the NSC TRP(s) in the inter-cell system shown in FIG. 8 and FIG. 9. Hence, the PDSCH rate matching for the SC TRP and/or the NSC TRP(s) may need to account for certain CSI-RSs such as TRSs transmitted from the SC TRP and/or the NSC TRP(s). The UE could be indicated by the network the CSI-RS resource(s) around which the PDSCH(s) is rate matched and/or whether the corresponding PDSCH rate matching is for the SC TRP, the NSC TRP(s) or both of the SC and NSC TRPs. This indication could be via higher layer (RRC) or/and MAC CE or/and DCI based signaling. This indication could be via a separate (dedicated) parameter or joint with another parameter. Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting.

For example, one or more indicators could be incorporated in the higher layer parameter(s) for CSI resource configuration/setting (e.g., CSI-ResourceConfig) to indicate to the UE: (i) whether the configured CSI-RS resource(s) is used for rate matching the PDSCH(s); for instance, a flag indicator could be incorporated in CSI-ResourceConfig with "1" indicating that the configured CSI-RS resource(s) is used for the PDSCH(s) rate matching and "0" indicating that the configured CSI-RS resource(s) is not used for the PDSCH(s) rate matching, and/or (ii) whether the corresponding rate matching is for the SC's PDSCH(s) and/or the NSC's PDSCH(s); for example, a flag indicator could be incorporated in CSI-ResourceConfig with "1" indicating that the corresponding rate matching is for the SC's PDSCH(s) and "0" indicating that the corresponding rate matching is for the NSC's PDSCH(s); for another example, the PCI value(s)/higher layer signaling index value(s) such as CORESETPoolIndex value(s) could be incorporated in CSI-ResourceConfig indicating the cell(s)/TRP(s) (e.g., the SC TRP or the NSC TRP(s)) from which the rate matched PDSCH(s) is transmitted.

For another example, one or more indicators could be incorporated in the DCI that indicates a non-zero CSI request field to indicate to the UE: (i) whether the aperiodic CSI-RS resource(s) triggered by the CSI request is used for rate matching the PDSCH(s); for instance, a flag indicator could be incorporated in the DCI that indicates the non-zero CSI request with "1" indicating that the triggered aperiodic CSI-RS resource(s) is used for the PDSCH(s) rate matching and "0" indicating that the triggered aperiodic CSI-RS resource(s) is not used for the PDSCH(s) rate matching, and/or (ii) whether the corresponding rate matching is for the SC's PDSCH(s) and/or the NSC's PDSCH(s); for example, a flag indicator could be incorporated in the DCI that indicates the non-zero CSI request with "1" indicating that the corresponding rate matching is for the SC's PDSCH(s) and "0" indicating that the corresponding rate matching is for the NSC's PDSCH(s); for another example, the PCI value(s)/higher layer signaling index value(s) such as CORESETPoolIndex value(s) could be indicated in/associated with the DCI that indicates the non-zero CSI request indicating the cell(s)/TRP(s) (e.g., the SC TRP or the NSC TRP(s)) from which the rate matched PDSCH(s) is transmitted; yet for another example, the DCI that indicates the non-zero CSI request also schedules the corresponding rate matched PDSCH(s) transmitted from the SC TRP, the NSC TRP(s), or both of the SC TRP and the NSC TRP(s).

The UE needs to know the time-frequency CSI-RS resource(s) around which the NSC's PDSCHs could be rate matched. Further, the rate matching parameters could also depend on the QCL assumptions of the NSC's PDSCHs and the CSI-RS(s) such as TRS(s) of interest. The CSI-RS could be transmitted from the SC TRP, or the NSC TRP(s), or both of the SC and NSC TRPs. The UE could be configured/indicated by the network via higher layer RRC signaling, MAC CE signaling and/or DCI signaling whether the NSC's PDSCHs are rate matched around the SC's CSI-RSs, or the NSC's CSI-RSs, or both of the SC's and NSC's CSI-RSs.

The time-frequency CSI-RS resource(s) around which the NSC's PDSCHs could be rate matched could be indicated in the corresponding CSI resource configuration(s)/setting(s)

such as in the higher layer parameter CSI-ResourceConfig. The CSI resource configuration(s)/setting(s) could be associated with the SC TRP and the NSC TRP(s). For example, the explicit PCI value(s)/higher layer signaling index value(s) such as CORESETPoolIndex value(s) could be incorporated into the corresponding CSI resource configuration(s)/setting(s).

Example details about the association between the CSI resource configuration(s)/setting(s) and the SC/NSC TRP(s) may be according to US 2022/0046458 filed Aug. 4, 2021. The rate matching parameters for the NSC's PDSCH around the CSI-RSs of interest could also depend on the QCL assumptions of the NSC's PDSCH and the CSI-RSs from the SC TRP, NSC TRP(s) or both of the SC and NSC TRPs. For the inter-cell operation (e.g., the inter-cell mobility in FIG. 8 and the inter-cell multi-TRP operation in FIG. 9), the QCL source RS for the NSC's PDSCH could be a SC's CSI-RS such as TRS or a NSC's CSI-RS such as TRS. For one or more given CSI-RSs such as TRSs (and therefore, their associated time-frequency resources and QCL assumptions), there are various means to indicate to the UE the corresponding rate matching parameters for a given NSC's PDSCH (and therefore, its associated QCL assumption).

In the present disclosure, for the purpose of illustration, the TRS is used as an example of the CSI-RS for the PDSCH rate matching. The PDSCH rate matching mechanisms developed for the TRS can be extended/generalized to other forms of the CSI-RS such as CSI-RS for CSI, CSI-RS for beam management and etc.

FIG. 16 illustrates yet another example of rate matching parameters/patterns 1600 for inter-cell beam indication according to embodiments of the present disclosure. An embodiment of the rate matching parameters/patterns 1600 shown in FIG. 16 is for illustration only.

In one example of Option-A', for a given TCI state, which, e.g., indicates the TRS as the QCL source RS (the given TCI state could indicate other RS than the TRS such as SSB as the QCL source RS), the UE could be higher layer configured/indicated by the network its corresponding rate matching parameter(s) associated with one or more TCI states indicating the TRS as the QCL source RS; the associated one or more TCI states could be associated with different cells/TRPs with different PCIs/higher layer signaling index values such as CORESETPoolIndex values. As the TRS could be from the SC TRP or a NSC TRP, a TCI state indicating a TRS as the QCL source RS could also be associated with the SC TRP or a NSC TRP. There are various means to differentiate the TCI states between the SC TRP and the NSC TRP(s). For instance, the total TCI states could be divided into multiple TCI state groups, and each TCI state group (and therefore, the TCI states therein) is associated with either the SC TRP or a NSC TRP. For another example, the explicit PCI value/higher layer signaling index value such as CORESETPoolIndex value could be indicated in/associated with each TCI state.

Example details about the association between the TCI states and the SC/NSC TRP(s) may be according to US 2022/0046458 filed Aug. 4, 2021 and U.S. patent application Ser. No. 17/584,239 filed Jan. 25, 2022, as incorporated by reference herein. In this disclosure, for illustrative purpose, the TCI states are categorized as the TCI state(s) associated with the SC TRP and the TCI state(s) associated with the NSC TRP(s).

In FIG. 16, a bitmap depicting the association between the rate matching parameters for a given TCI state and one or more other TCI states is presented. In this example, a single NSC TRP is deployed in the inter-cell system, and a total of two TCI states are associated with each TRP (i.e., the SC TRP or the NSC TRP). It can be seen from FIG. 16 that the rate matching parameters for a given TCI state could be associated with a single TCI state associated with the SC TRP, a single TCI state associated with the NSC TRP, or two separate TCI states associated with the SC TRP and the NSC TRP.

For instance, for TCI state #A'_1 associated with the SC TRP, the corresponding rate matching parameter (RMP) associated with TCI state #A'_1 (associated with the SC TRP) is RMP'_1-1. For another example, for TCI state #B'_2 associated with the NSC TRP, the corresponding RMP associated with TCI state #A'_1 (associated with the SC TRP) and TCI state #B'_1 (associated with the NSC TRP) is RMP'_5-4. Further, as illustrated in FIG. 16, TCI state #A'_1, TCI state #A'_2, TCI state #B'_1 and TCI state #B'_2 contain TRS #A'_1, TRS #A'_2, TRS #B'_1 and TRS #B'_2 as the QCL source RSs, respectively. Hence, if the QCL source RS for a NSC's PDSCH is TRS #A'_1 (i.e., TCI state #A'_1) and the UE is indicated/configured by the network to rate match the NSC's PDSCH around TRS #A'_1 (i.e., TCI state #A'_1) and SSB #B'_2 (i.e., TCI state #B'_2), the corresponding RMP is RMP'_6-1.

The example shown in FIG. 16 can be generalized to the inter-cell system with more than one NSCs or NSC TRPs with each SC/NSC TRP associated with more than two TCI states indicating the TRS as the QCL source RS.

FIG. 17 illustrates yet another example of rate matching parameters/patterns 1700 for inter-cell beam indication according to embodiments of the present disclosure. An embodiment of the rate matching parameters/patterns 1700 shown in FIG. 17 is for illustration only.

In one example of Option-B', the UE could be higher layer configured/indicated by the network the rate matching parameter(s) associated with one or more TCI states indicating the TRS as the QCL source RS; the associated one or more TCI states could be associated with different cells/TRPs with different PCIs/higher layer signaling index values such as CORESETPoolIndex values.

In FIG. 17, a bitmap depicting the association between the rate matching parameters and one or more TCI states is presented. In this example, a single NSC TRP is deployed in the inter-cell system, and a total of two TCI states are associated with each TRP (i.e., the SC TRP or the NSC TRP). It can be seen from FIG. 17 that the rate matching parameters could be associated with a single TCI state associated with the SC TRP, a single TCI state associated with the NSC TRP, or two separate TCI states associated with the SC TRP and the NSC TRP. For instance, the rate matching parameter (RMP) associated with TCI state #A'_1 (associated with the SC TRP) is RMP'_1. For another example, the RMP associated with TCI state #A'_1 (associated with the SC TRP) and TCI state #B'_1 (associated with the NSC TRP) is RMP'_5.

Further, as illustrated in FIG. 17, TCI state #A'_1, TCI state #A'_2, TCI state #B'_1 and TCI state #B'_2 contain TRS #A'_1, TRS #A'_2, TRS #B'_1 and TRS #B'_2 as the QCL source RSs, respectively. Hence, if the UE is indicated/configured by the network to rate match the NSC's PDSCH around TRS #A'_1 (i.e., TCI state #A'_1) and TRS #B'_2 (i.e., TCI state #B'_2), the corresponding RMP is RMP'_6. The example shown in FIG. 17 can be generalized to the inter-cell system with more than one NSCs or NSC TRPs with each SC/NSC TRP associated with more than two TCI states indicating the TRS as the QCL source RS.

In one example of Option-C', for a given TCI state, which, e.g., indicates the TRS as the QCL source RS (the given TCI state could indicate other RS than the TRS such as SSB as the QCL source RS), the UE could be higher layer configured/indicated by the network its corresponding rate matching parameter(s) associated with one or more cells/TRPs (and therefore, their associated TCI states indicating the TRS as the QCL source RS); the associated one or more cells/TRPs could be associated with different PCIs/higher layer signaling index values such as CORESETPoolIndex values.

FIG. 18 illustrates yet another example of rate matching parameters/patterns 1800 for inter-cell beam indication according to embodiments of the present disclosure. An embodiment of the rate matching parameters/patterns 1800 shown in FIG. 18 is for illustration only.

In FIG. 18, a bitmap depicting the association between the rate matching parameters for a given TCI state and the cells/TRPs in the inter-cell system is presented. In this example, a single NSC TRP is deployed in the inter-cell system, and a total of two TCI states are associated with each TRP (i.e., the SC TRP or the NSC TRP). It can be seen from FIG. 18 that the rate matching parameters for a given TCI state could be associated with the SC TRP (and therefore, its associated TCI states TCI state #A'_1 and TCI state #A'_2), the NSC TRP (and therefore, its associated TCI states TCI state #B'_1 and TCI state #B'_2), or both SC and NSC TRPs (and therefore, their associated TCI states TCI state #A'_1, TCI state #A'_2, TCI state #B'_1 and TCI state #B'_2).

For instance, for TCI state #A'_1 associated with the SC TRP, the corresponding rate matching parameter (RMP) associated with the SC TRP is RMP'_A-1. For another example, for TCI state #B'_2 associated with the NSC TRP, the corresponding RMP associated with both the SC TRP and the NSC TRP is RMP'_C-4. Further, as illustrated in FIG. 18, TCI state #A'_1, TCI state #A'_2, TCI state #B'_1 and TCI state #B'_2 contain TRS #A'_1, TRS #A'_2, TRS #B'_1 and TRS #B'_2 as the QCL source RSs, respectively. Hence, if the QCL source RS for a NSC's PDSCH is TRS #A'_1 (i.e., TCI state #A'_1) and the UE is indicated/configured by the network to rate match the NSC's PDSCH around TRS #A'_1 (i.e., TCI state #A'_1 associated with the SC TRP) and TRS #B'_2 (i.e., TCI state #B'_2 associated with the NSC TRP), the corresponding RMP is RMP'_C-1. The example shown in FIG. 18 can be generalized to the inter-cell system with more than one NSCs or NSC TRPs with each SC/NSC TRP associated with more than two TCI states indicating the TRS as the QCL source RS.

In one example of Option-D', the UE could be higher layer configured/indicated by the network the rate matching parameter(s) associated with one or more cells/TRPs (and therefore, their associated TCI states indicating the TRS as the QCL source RS); the associated one or more cells/TRPs could be associated with different PCIs/higher layer signaling index values such as CORESETPoolIndex values.

FIG. 19 illustrates yet another example of rate matching parameters/patterns 1900 for inter-cell beam indication according to embodiments of the present disclosure. An embodiment of the rate matching parameters/patterns 1900 shown in FIG. 19 is for illustration only.

In FIG. 19, a bitmap depicting the association between the rate matching parameters and the cells/TRPs in the inter-cell system is presented. In this example, a single NSC TRP is deployed in the inter-cell system, and a total of two TCI states are associated with each TRP (i.e., the SC TRP or the NSC TRP). It can be seen from FIG. 19 that the rate matching parameters could be associated with the SC TRP (and therefore, its associated TCI states TCI state #A'_1 and TCI state #A'_2), the NSC TRP (and therefore, its associated TCI states TCI state #B'_1 and TCI state #B'_2), or both SC and NSC TRPs (and therefore, their associated TCI states TCI state #A'_1, TCI state #A'_2, TCI state #B'_1 and TCI state #B'_2).

For instance, the rate matching parameter (RMP) associated with the SC TRP is RMP'_A. For another example, the RMP associated with both the SC TRP and the NSC TRP is RMP'_C. Further, as illustrated in FIG. 19, TCI state #A'_1, TCI state #A'_2, TCI state #B'_1 and TCI state #B'_2 contain TRS #A'_1, TRS #A'_2, TRS #B'_1 and TRS #B'_2 as the QCL source RSs, respectively. Hence, if the UE is indicated/configured by the network to rate match the NSC's PDSCH around TRS #A'_1 (i.e., TCI state #A'_1 associated with the SC TRP) and TRS #B'_2 (i.e., TCI state #B'_2 associated with the NSC TRP), the corresponding RMP is RMP'_C. The example shown in FIG. 19 can be generalized to the inter-cell system with more than one NSCs or NSC TRPs with each SC/NSC TRP associated with more than two TCI states indicating the TRS as the QCL source RS.

The UE could be indicated by the network via higher layer RRC signaling, MAC CE signaling and/or dynamic DCI signaling to follow one or more design options (from Option-A', Option-B', Option-C', and Option-D') to receive the association between the rate matching parameters and the TCI states associated with the SC/NSC(s) indicating the TRS as the QCL source RS.

Figure 20:
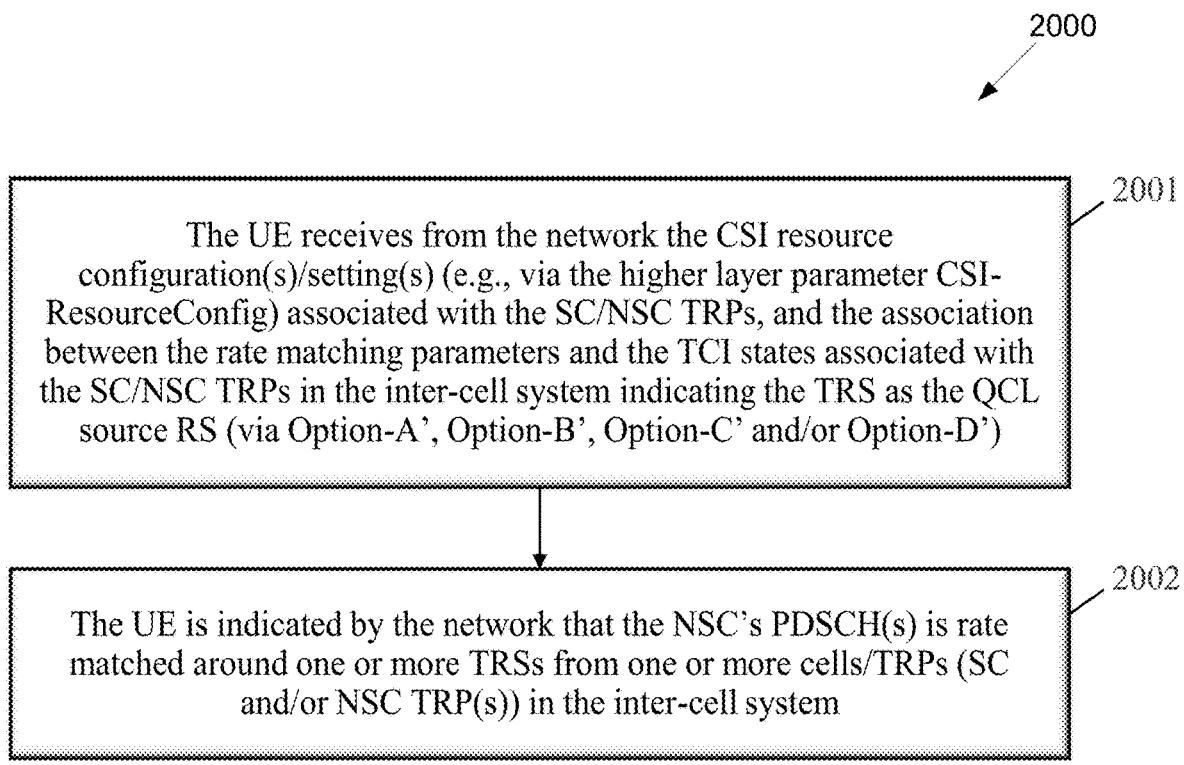
FIG. 20 illustrates another flowchart of UE procedure for rate matching downlink channel(s) according to embodiments of the present disclosure.

FIG. 20 illustrates another flowchart of UE procedure 2000 for rate matching downlink channel(s) according to embodiments of the present disclosure. The UE procedures 2000 as may be performed by a UE (e.g., 111-116 as illustrated in FIG. 1). An embodiment of the UE procedures 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

In FIG. 20, the rate matching mechanism/procedure for the NSC's PDSCH around the TRSs from the SC TRP only, the NSC TRP(s) only or both of the SC and NSC TRPs is presented.

In 2001, the UE receives from the network the CSI resource configuration(s)/setting(s) (e.g., via the higher layer parameter CSI-ResourceConfig) associated with the SC/NSC TRPs, and the association between the rate matching parameters and the TCI states associated with the SC/NSC TRPs indicating the TRS as the QCL source RS (e.g., via Option-A', Option-B', Option-C' and/or Option-D' discussed above). This indication could be via higher layer (RRC) or/and MAC CE or/and DCI based signaling. This indication could be via a separate (dedicated) parameter or joint with another parameter.

In one example, the UE could receive from the network the CSI resource configuration(s)/setting(s) (e.g., via the higher layer parameter CSI-ResourceConfig) associated with the SC TRP, the NSC TRP(s) or both of the SC TRP and the NSC TRP(s).

In one example, the UE could receive from the network the CSI resource configuration(s)/setting(s) (e.g., via the higher layer parameter CSI-ResourceConfig) associated with the SC TRP, the NSC TRP(s) or both of the SC TRP and the NSC TRP(s), and the association between the rate matching parameters and the TCI states associated with the SC TRP, NSC TRP(s) or both of the SC TRP and the NSC TRP(s) indicating the TRS as the QCL source RS.

In 2002, the UE is indicated by the network that the PDSCH(s) from the NSC TRP(s) is rate matched around one or more TRSs from one or more cells/TRPs (the SC TRP and/or the NSC TRP(s)). This indication could be via higher layer (RRC) or/and MAC CE or/and DCI based signaling. This indication could be via a separate (dedicated) parameter or joint with another parameter.

The UE could be configured/indicated by the network that the PDSCH(s) transmitted from the NSC TRP(s) is rate matched around one or more TRSs from the SC TRP only: (1) Configuration-a.1: the UE could be configured/indicated by the network that the rate matching parameters for the NSC's PDSCH(s) are determined according to the time-frequency resources configured for the TRSs in the corresponding CSI resource configuration/setting (e.g., CSI-ResourceConfig) associated with the SC TRP; and (2) Configuration-a.2: the UE could be configured/indicated by the network that the rate matching parameters for the NSC's PDSCH(s) are determined according to the time-frequency resources configured for the TRSs in the corresponding CSI resource configuration/setting (e.g., CSI-ResourceConfig) associated with the SC TRP, the TCI state(s) associated with the NSC's PDSCH(s) and the TCI state(s) associated with the SC TRP indicating the TRS(s) of interest as the QCL source RS(s).

For dynamic DCI based signaling, one or more indicators could be incorporated in the DCI, e.g., in the TCI state(s) associated with the NSC's PDSCH(s), that schedules the NSC's PDSCH(s) to indicate to the UE that one or more of Configuration-a.1 and Configuration-a.2 is used for determining the rate matching parameters for the NSC's PDSCH(s). Other combinations of the time-frequency resources configured for the TRSs in the corresponding CSI resource configuration/setting (e.g., CSI-ResourceConfig) associated with the SC TRP, the TCI state(s) associated with the NSC's PDSCH(s) and the TCI state(s) associated with the SC TRP indicating the TRS(s) of interest as the QCL source RS(s) than those presented in Configuration-a.1 and Configuration-a.2 to determine the rate matching parameters for the NSC's PDSCH(s) are also possible.

The UE could be configured/indicated by the network that the PDSCH(s) transmitted from the NSC TRP(s) is rate matched around one or more TRSs from the NSC TRP(s) only: (1) Configuration-b.1: the UE could be configured/indicated by the network that the rate matching parameters for the NSC's PDSCH(s) are determined according to the time-frequency resources configured for the TRSs in the corresponding CSI resource configuration/setting (e.g., CSI-ResourceConfig) associated with the NSC TRP(s); and (2) Configuration-b.2: the UE could be configured/indicated by the network that the rate matching parameters for the NSC's PDSCH(s) are determined according to the time-frequency resources configured for the TRSs in the corresponding CSI resource configuration/setting (e.g., CSI-ResourceConfig) associated with the NSC TRP(s), the TCI state(s) associated with the NSC's PDSCH(s) and the TCI state(s) associated with the NSC TRP(s) indicating the TRS(s) of interest as the QCL source RS(s).

For dynamic DCI based signaling, one or more indicators could be incorporated in the DCI, e.g., in the TCI state(s) associated with the NSC's PDSCH(s), that schedules the NSC's PDSCH(s) to indicate to the UE that one or more of Configuration-b.1 and Configuration-b.2 is used for determining the rate matching parameters for the NSC's PDSCH(s). Other combinations of the time-frequency resources configured for the TRSs in the corresponding CSI resource configuration/setting (e.g., CSI-ResourceConfig) associated with the NSC TRP(s), the TCI state(s) associated with the NSC's PDSCH(s) and the TCI state(s) associated with the NSC TRP(s) indicating the TRS(s) of interest as the QCL source RS(s) than those presented in Configuration-b.1 and Configuration-b.2 to determine the rate matching parameters for the NSC's PDSCH(s) are also possible.

The UE could be configured/indicated by the network that the PDSCH(s) transmitted from the NSC TRP(s) is rate matched around the TRSs from both the SC TRP and the NSC TRP(s).

In one example of Configuration-c.1, the UE could be configured/indicated by the network that the rate matching parameters for the NSC's PDSCH(s) are determined according to the time-frequency resources configured for the TRSs in the corresponding CSI resource configurations/settings (e.g., CSI-ResourceConfig) associated with both the SC TRP and the NSC TRP(s).

In one example of Configuration-c.2, the UE could be configured/indicated by the network that the rate matching parameters for the NSC's PDSCH(s) are determined according to the time-frequency resources configured for the TRSs in the corresponding CSI resource configurations/settings (e.g., CSI-ResourceConfig) associated with both the SC TRP and the NSC TRP(s), the TCI state(s) associated with the NSC's PDSCH(s), and the TCI state(s) associated with the SC TRP indicating the corresponding TRS(s) of interest as the QCL source RS(s).

In one example of Configuration-c.3, the UE could be configured/indicated by the network that the rate matching parameters for the NSC's PDSCH(s) are determined according to the time-frequency resources configured for the TRSs in the corresponding CSI resource configurations/settings (e.g., CSI-ResourceConfig) associated with both the SC TRP and the NSC TRP(s), the TCI state(s) associated with the NSC's PDSCH(s), and the TCI state(s) associated with the NSC TRP(s) indicating the corresponding TRS(s) of interest as the QCL source RS(s).

In one example of Configuration-c.4, the UE could be configured/indicated by the network that the rate matching parameters for the NSC's PDSCH(s) are determined according to the time-frequency resources configured for the TRSs in the corresponding CSI resource configurations/settings (e.g., CSI-ResourceConfig) associated with both the SC TRP and the NSC TRP(s), the TCI state(s) associated with the NSC's PDSCH(s), the TCI state(s) associated with the SC TRP indicating the corresponding TRS(s) of interest as the QCL source RS(s), and the TCI state(s) associated with the NSC TRP(s) indicating the corresponding TRS(s) of interest as the QCL source RS(s).

For dynamic DCI based signaling, one or more indicators could be incorporated in the DCI, e.g., in the TCI state(s) associated with the NSC's PDSCH(s), that schedules the NSC's PDSCH(s) to indicate to the UE that one or more of Configuration-c.1, Configuration-c.2, Configuration-c.3, and Configuration-c.4 is used for determining the rate matching parameters for the NSC's PDSCH(s). Other combinations of the time-frequency resources configured for the TRSs in the corresponding CSI resource configurations/settings (e.g., CSI-ResourceConfig) associated with the SC TRP and/or the NSC TRP(s), the TCI state(s) associated with the NSC's PDSCH(s) and the TCI state(s) associated with the SC TRP and/or the NSC TRP(s) indicating the TRS(s) of interest as the QCL source RS(s) than those presented in Configuration-c.1, Configuration-c.2, Configuration-c.3 and Configuration-c.4 to determine the rate matching parameters for the NSC's PDSCH(s) are also possible.

Also in 2002, the UE could be indicated by the network around which active TRS(s) (e.g., in form of the CSI-RS resource index in CSI-ResourceConfig) the NSC's PDSCH(s) is rate matched and/or whether the active TRS(s) is from the SC TRP or the NSC TRP(s). This indication could be via higher layer (RRC) or/and MAC CE or/and DCI based signaling. This indication could be via a separate (dedicated) parameter or joint with another parameter. For example, the UE could be higher layer configured (via RRC signaling) one or more bitmaps indicating the active TRS(s) (e.g., in form of the CSI-RS resource index in CSI-ResourceConfig) from the SC TRP and/or the NSC TRP(s). For another example, the UE could receive one or more MAC CE commands activating one or more TRSs (active TRSs) out of all the TRSs configured in the CSI resource configuration(s)/setting(s) associated with the SC TRP and/or the NSC TRP(s). Yet for another example, the UE could be indicated via dynamic DCI based signaling, e.g., in the TCI state(s) associated with the NSC's PDSCH(s), the active TRS(s) (e.g., in form of the CSI-RS resource index in CSI-ResourceConfig) from the SC TRP and/or the NSC TRP(s).

The UE needs to know the time-frequency CSI-RS resource(s) around which the SC's PDSCHs could be rate matched. Further, the rate matching parameters could also depend on the QCL assumptions of the SC's PDSCHs and the CSI-RS(s) such as TRS(s) of interest. The CSI-RS could be transmitted from the SC TRP, or the NSC TRP(s), or both of the SC and NSC TRPs. The UE could be configured/indicated by the network via higher layer RRC signaling, MAC CE signaling and/or DCI signaling whether the SC's PDSCHs are rate matched around the SC's CSI-RSs, or the NSC's CSI-RSs, or both of the SC's and NSC's CSI-RSs.

The time-frequency CSI-RS resource(s) around which the SC's PDSCHs could be rate matched could be indicated in the corresponding CSI resource configuration(s)/setting(s) such as in the higher layer parameter CSI-ResourceConfig. The rate matching parameters for the SC's PDSCH around the CSI-RSs of interest could also depend on the QCL assumptions of the SC's PDSCH and the CSI-RSs from the SC TRP, NSC TRP(s) or both of the SC and NSC TRPs. For the inter-cell operation (e.g., the inter-cell mobility in FIG. 8 and the inter-cell multi-TRP operation in FIG. 9), the QCL source RS for the SC's PDSCH could be a SC's CSI-RS such as TRS or a NSC's CSI-RS such as TRS. For one or more given CSI-RSs such as TRSs (and therefore, their associated time-frequency resources and QCL assumptions), there are various means to indicate to the UE the corresponding rate matching parameters for a given SC's PDSCH (and therefore, its associated QCL assumption). In this disclosure, for the purpose of illustration, the TRS is used as an example of the CSI-RS for the PDSCH rate matching. The PDSCH rate matching mechanisms developed for the TRS can be extended/generalized to other forms of the CSI-RS such as CSI-RS for CSI, CSI-RS for beam management and etc.

Figure 21:
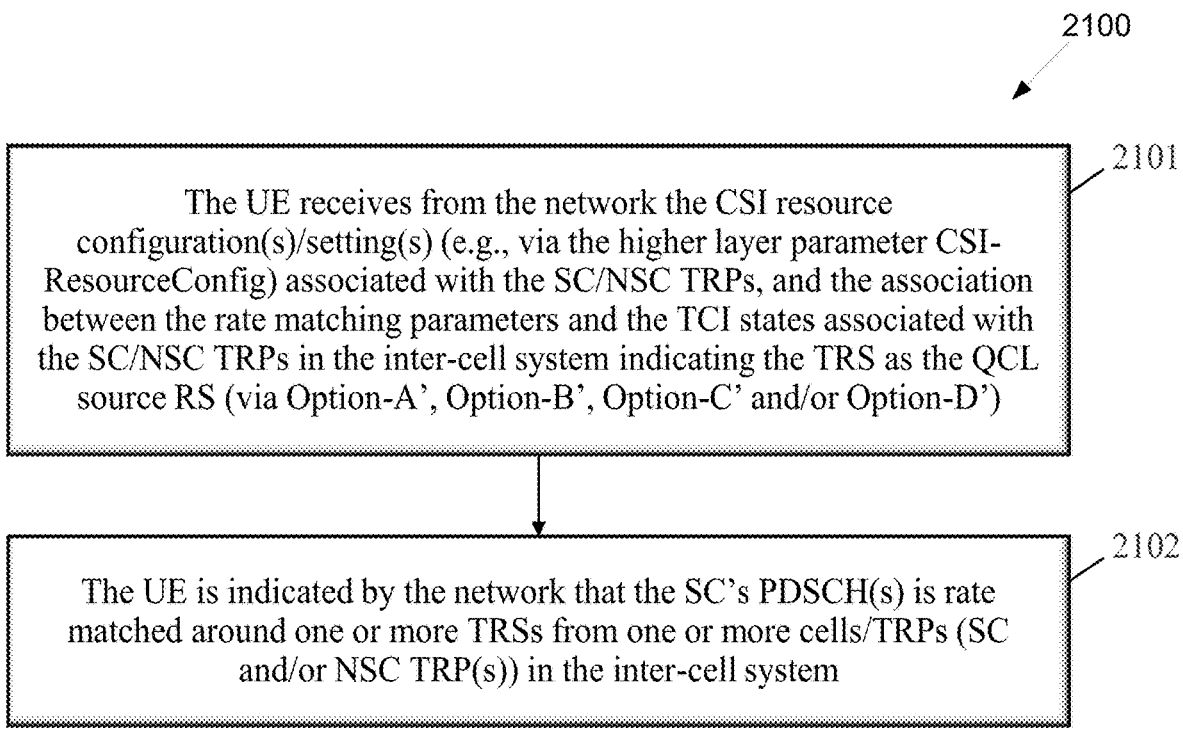
FIG. 21 illustrates another flowchart of UE procedure for rate matching downlink channel(s) according to embodiments of the present disclosure.

FIG. 21 illustrates another flowchart of UE procedure 2100 for rate matching downlink channel(s) according to embodiments of the present disclosure. The UE procedures 2100 as may be performed by a UE (e.g., 111-116 as illustrated in FIG. 1). An embodiment of the UE procedures 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions.

In FIG. 21, the rate matching mechanism/procedure for the SC's PDSCH around the TRSs from the SC TRP only, the NSC TRP(s) only or both of the SC and NSC TRPs is presented.

In 2101, the UE receives from the network the CSI resource configuration(s)/setting(s) (e.g., via the higher layer parameter CSI-ResourceConfig) associated with the SC/NSC TRPs, and the association between the rate matching parameters and the TCI states associated with the SC/NSC TRPs indicating the TRS as the QCL source RS (e.g., via Option-A', Option-B', Option-C' and/or Option-D' discussed above). This indication could be via higher layer (RRC) or/and MAC CE or/and DCI based signaling. This indication could be via a separate (dedicated) parameter or joint with another parameter.

In one example, the UE could receive from the network the CSI resource configuration(s)/setting(s) (e.g., via the higher layer parameter CSI-ResourceConfig) associated with the SC TRP, the NSC TRP(s) or both of the SC TRP and the NSC TRP(s).

In one example, the UE could receive from the network the CSI resource configuration(s)/setting(s) (e.g., via the higher layer parameter CSI-ResourceConfig) associated with the SC TRP, the NSC TRP(s) or both of the SC TRP and the NSC TRP(s), and the association between the rate matching parameters and the TCI states associated with the SC TRP, NSC TRP(s) or both of the SC TRP and the NSC TRP(s) indicating the TRS as the QCL source RS.

In 2102, the UE is indicated by the network that the PDSCH(s) from the SC TRP(s) is rate matched around one or more TRSs from one or more cells/TRPs (the SC TRP and/or the NSC TRP(s)). This indication could be via higher layer (RRC) or/and MAC CE or/and DCI based signaling. This indication could be via a separate (dedicated) parameter or joint with another parameter.

The UE could be configured/indicated by the network that the PDSCH(s) transmitted from the SC TRP(s) is rate matched around one or more TRSs from the SC TRP only: (1) Configuration-A.1: the UE could be configured/indicated by the network that the rate matching parameters for the SC's PDSCH(s) are determined according to the time-frequency resources configured for the TRSs in the corresponding CSI resource configuration/setting (e.g., CSI-ResourceConfig) associated with the SC TRP; and (2) Configuration-A.2: the UE could be configured/indicated by the network that the rate matching parameters for the SC's PDSCH(s) are determined according to the time-frequency resources configured for the TRSs in the corresponding CSI resource configuration/setting (e.g., CSI-ResourceConfig) associated with the SC TRP, the TCI state(s) associated with the SC's PDSCH(s) and the TCI state(s) associated with the SC TRP indicating the TRS(s) of interest as the QCL source RS(s).

For dynamic DCI based signaling, one or more indicators could be incorporated in the DCI, e.g., in the TCI state(s) associated with the SC's PDSCH(s), that schedules the SC's PDSCH(s) to indicate to the UE that one or more of Configuration-A.1 and Configuration-A.2 is used for determining the rate matching parameters for the SC's PDSCH(s). Other combinations of the time-frequency resources configured for the TRSs in the corresponding CSI resource configuration/setting (e.g., CSI-ResourceConfig) associated with the SC TRP, the TCI state(s) associated with the SC's PDSCH(s) and the TCI state(s) associated with the SC TRP indicating the TRS(s) of interest as the QCL source RS(s) than those presented in Configuration-A.1 and Configuration-A.2 to determine the rate matching parameters for the SC's PDSCH(s) are also possible.

The UE could be configured/indicated by the network that the PDSCH(s) transmitted from the SC TRP(s) is rate matched around one or more TRSs from the NSC TRP(s) only: (1) Configuration-B.1: the UE could be configured/indicated by the network that the rate matching parameters for the SC's PDSCH(s) are determined according to the time-frequency resources configured for the TRSs in the corresponding CSI resource configuration/setting (e.g., CSI-ResourceConfig) associated with the NSC TRP(s); and (2) Configuration-B.2: the UE could be configured/indicated by the network that the rate matching parameters for the SC's PDSCH(s) are determined according to the time-frequency resources configured for the TRSs in the corresponding CSI resource configuration/setting (e.g., CSI-ResourceConfig) associated with the NSC TRP(s), the TCI state(s) associated with the SC's PDSCH(s) and the TCI state(s) associated with the NSC TRP(s) indicating the TRS(s) of interest as the QCL source RS(s).

For dynamic DCI based signaling, one or more indicators could be incorporated in the DCI, e.g., in the TCI state(s) associated with the SC's PDSCH(s), that schedules the SC's PDSCH(s) to indicate to the UE that one or more of Configuration-B.1 and Configuration-B.2 is used for determining the rate matching parameters for the SC's PDSCH(s). Other combinations of the time-frequency resources configured for the TRSs in the corresponding CSI resource configuration/setting (e.g., CSI-ResourceConfig) associated with the NSC TRP(s), the TCI state(s) associated with the SC's PDSCH(s) and the TCI state(s) associated with the NSC TRP(s) indicating the TRS(s) of interest as the QCL source RS(s) than those presented in Configuration-B.1 and Configuration-B.2 to determine the rate matching parameters for the SC's PDSCH(s) are also possible.

The UE could be configured/indicated by the network that the PDSCH(s) transmitted from the SC TRP(s) is rate matched around the TRSs from both the SC TRP and the NSC TRP(s).

In one example of Configuration-C.1, the UE could be configured/indicated by the network that the rate matching parameters for the SC's PDSCH(s) are determined according to the time-frequency resources configured for the TRSs in the corresponding CSI resource configurations/settings (e.g., CSI-ResourceConfig) associated with both the SC TRP and the NSC TRP(s).

In one example of Configuration-C.2, the UE could be configured/indicated by the network that the rate matching parameters for the SC's PDSCH(s) are determined according to the time-frequency resources configured for the TRSs in the corresponding CSI resource configurations/settings (e.g., CSI-ResourceConfig) associated with both the SC TRP and the NSC TRP(s), the TCI state(s) associated with the SC's PDSCH(s), and the TCI state(s) associated with the SC TRP indicating the corresponding TRS(s) of interest as the QCL source RS(s).

In one example of Configuration-C.3, the UE could be configured/indicated by the network that the rate matching parameters for the SC's PDSCH(s) are determined according to the time-frequency resources configured for the TRSs in the corresponding CSI resource configurations/settings (e.g., CSI-ResourceConfig) associated with both the SC TRP and the NSC TRP(s), the TCI state(s) associated with the SC's PDSCH(s), and the TCI state(s) associated with the NSC TRP(s) indicating the corresponding TRS(s) of interest as the QCL source RS(s).

In one example of Configuration-C.4, the UE could be configured/indicated by the network that the rate matching parameters for the SC's PDSCH(s) are determined according to the time-frequency resources configured for the TRSs in the corresponding CSI resource configurations/settings (e.g., CSI-ResourceConfig) associated with both the SC TRP and the NSC TRP(s), the TCI state(s) associated with the SC's PDSCH(s), the TCI state(s) associated with the SC TRP indicating the corresponding TRS(s) of interest as the QCL source RS(s), and the TCI state(s) associated with the NSC TRP(s) indicating the corresponding TRS(s) of interest as the QCL source RS(s).

For dynamic DCI based signaling, one or more indicators could be incorporated in the DCI, e.g., in the TCI state(s) associated with the SC's PDSCH(s), that schedules the SC's PDSCH(s) to indicate to the UE that one or more of Configuration-C.1, Configuration-C.2, Configuration-C.3 and Configuration-C.4 is used for determining the rate matching parameters for the SC's PDSCH(s). Other combinations of the time-frequency resources configured for the TRSs in the corresponding CSI resource configurations/settings (e.g., CSI-ResourceConfig) associated with the SC TRP and/or the NSC TRP(s), the TCI state(s) associated with the SC's PDSCH(s) and the TCI state(s) associated with the SC TRP and/or the NSC TRP(s) indicating the TRS(s) of interest as the QCL source RS(s) than those presented in Configuration-C.1, Configuration-C.2, Configuration-C.3, and Configuration-C.4 to determine the rate matching parameters for the SC's PDSCH(s) are also possible.

Also in 2102, the UE could be indicated by the network around which active TRS(s) (e.g., in form of the CSI-RS resource index in CSI-ResourceConfig) the SC's PDSCH(s) is rate matched and/or whether the active TRS(s) is from the SC TRP or the NSC TRP(s). This indication could be via higher layer (RRC) or/and MAC CE or/and DCI based signaling. This indication could be via a separate (dedicated) parameter or joint with another parameter. For example, the UE could be higher layer configured (via RRC signaling) one or more bitmaps indicating the active TRS(s) (e.g., in form of the CSI-RS resource index in CSI-ResourceConfig) from the SC TRP and/or the NSC TRP(s). For another example, the UE could receive one or more MAC CE commands activating one or more TRSs (active TRSs) out of all the TRSs configured in the CSI resource configuration(s)/setting(s) associated with the SC TRP and/or the NSC TRP(s). Yet for another example, the UE could be indicated via dynamic DCI based signaling, e.g., in the TCI state(s) associated with the SC's PDSCH(s), the active TRS(s) (e.g., in form of the CSI-RS resource index in CSI-ResourceConfig) from the SC TRP and/or the NSC TRP(s).

The UE could receive CSI-RSs for mobility transmitted from the NSC TRP(s) in the inter-cell system shown in FIG. 8 and FIG. 9. Hence, the PDSCH rate matching for the SC TRP and/or the NSC TRP(s) may need to account for the CSI-RSs for mobility transmitted from the NSC TRP(s). The UE could be indicated by the network the CSI-RS resource(s) for mobility around which the PDSCH(s) is rate matched and/or whether the corresponding PDSCH rate matching is for the SC TRP, the NSC TRP(s) or both of the SC and NSC TRPs. This indication could be via higher layer (RRC) or/and MAC CE or/and DCI based signaling. This indication could be via a separate (dedicated) parameter or joint with another parameter. Likewise, this indication could be together with the CSI reporting settings (e.g., in the higher layer parameter CSI-ReportConfig) or together with the CSI resource settings (e.g., in the higher layer parameter CSI-ResourceConfig) or together with the CSI request field triggering the CSI reporting.

For example, one or more indicators could be incorporated in the higher layer parameter(s) for CSI resource configuration/setting for mobility (e.g., CSI-RS-Resource-Mobility) to indicate to the UE: (i) whether the configured CSI-RS resource(s) for mobility is used for rate matching the PDSCH(s); for instance, a flag indicator could be incorporated in CSI-RS-Resource-Mobility and/or the corresponding higher layer parameter MeasObjectNR with "1" indicating that the configured CSI-RS resource(s) for mobility is used for the PDSCH(s) rate matching and "0" indicating that the configured CSI-RS resource(s) for mobility is not used for the PDSCH(s) rate matching, and/or (ii) whether the corresponding rate matching is for the SC's PDSCH(s) and/or the NSC's PDSCH(s); for example, a flag indicator could be incorporated in CSI-RS-Resource-Mobility and/or the corresponding higher layer parameter MeasObjectNR with "1" indicating that the corresponding rate matching is for the SC's PDSCH(s) and "0" indicating that the corresponding rate matching is for the NSC's PDSCH(s); for another example, the PCI value(s)/higher layer signaling index value(s) such as CORESETPoolIndex value(s) could be incorporated in CSI-RS-Resource-Mobility and/or the corresponding higher layer parameter MeasObjectNR indicating the cell(s)/TRP(s) (e.g., the SC TRP or the NSC TRP(s)) from which the rate matched PDSCH(s) is transmitted.

The UE needs to know the time-frequency CSI-RS resource(s) for mobility around which the NSC's PDSCHs could be rate matched. Further, the rate matching parameters could also depend on the QCL assumptions of the NSC's PDSCHs and the CSI-RS(s) for mobility of interest. The CSI-RS for mobility could be transmitted from the NSC TRP(s). The UE could be configured/indicated by the network via higher layer RRC signaling, MAC CE signaling and/or DCI signaling whether the NSC's PDSCHs are rate matched around the NSC's CSI-RS(s) for mobility.

The time-frequency CSI-RS resource(s) for mobility around which the NSC's PDSCHs could be rate matched could be indicated in the corresponding CSI resource configuration(s)/setting(s) for mobility such as in the higher layer parameter CSI-RS-Resource-Mobility and/or MeasObjectNR. The rate matching parameters for the NSC's PDSCH around the CSI-RSs for mobility of interest could also depend on the QCL assumptions of the NSC's PDSCH and the CSI-RSs for mobility from the NSC TRP(s). For the inter-cell operation (e.g., the inter-cell mobility in FIG. 8 and the inter-cell multi-TRP operation in FIG. 9), the QCL source RS for the NSC's PDSCH could be a NSC's CSI-RS for mobility. For one or more given CSI-RSs for mobility (and therefore, their associated time-frequency resources and QCL assumptions), there are various means to indicate to the UE the corresponding rate matching parameters for a given NSC's PDSCH (and therefore, its associated QCL assumption).

In one example of Option-A", for a given TCI state, which, e.g., indicates the CSI-RS for mobility as the QCL source RS (the given TCI state could indicate other RS than the CSI-RS for mobility such as SSB and TRS as the QCL source RS), the UE could be higher layer configured/indicated by the network its corresponding rate matching parameter(s) associated with one or more TCI states indicating the CSI-RS for mobility as the QCL source RS; the associated one or more TCI states could be associated with one or more NSC TRP(s).

In one example of Option-B", the UE could be higher layer configured/indicated by the network the rate matching parameter(s) associated with one or more TCI states indicating the CSI-RS for mobility as the QCL source RS; the associated one or more TCI states could be associated with one or more NSC TRP(s).

In one example of Option-C", for a given TCI state, which, e.g., indicates the CSI-RS for mobility as the QCL source RS (the given TCI state could indicate other RS than the CSI-RS for mobility such as SSB and TRS as the QCL source RS), the UE could be higher layer configured/indicated by the network its corresponding rate matching parameter(s) associated with one or more NSC TRPs (and therefore, their associated TCI states indicating the CSI-RS for mobility as the QCL source RS).

In one example of Option-D", the UE could be higher layer configured/indicated by the network the rate matching parameter(s) associated with one or more NSC TRPs (and therefore, their associated TCI states indicating the CSI-RS for mobility as the QCL source RS).

The UE could be indicated by the network via higher layer RRC signaling, MAC CE signaling and/or dynamic DCI signaling to follow one or more design options (from Option-A", Option-B", Option-C", and Option-D") to receive the association between the rate matching parameters and the TCI states associated with the NSC(s) indicating the CSI-RS for mobility as the QCL source RS.

Figure 22:
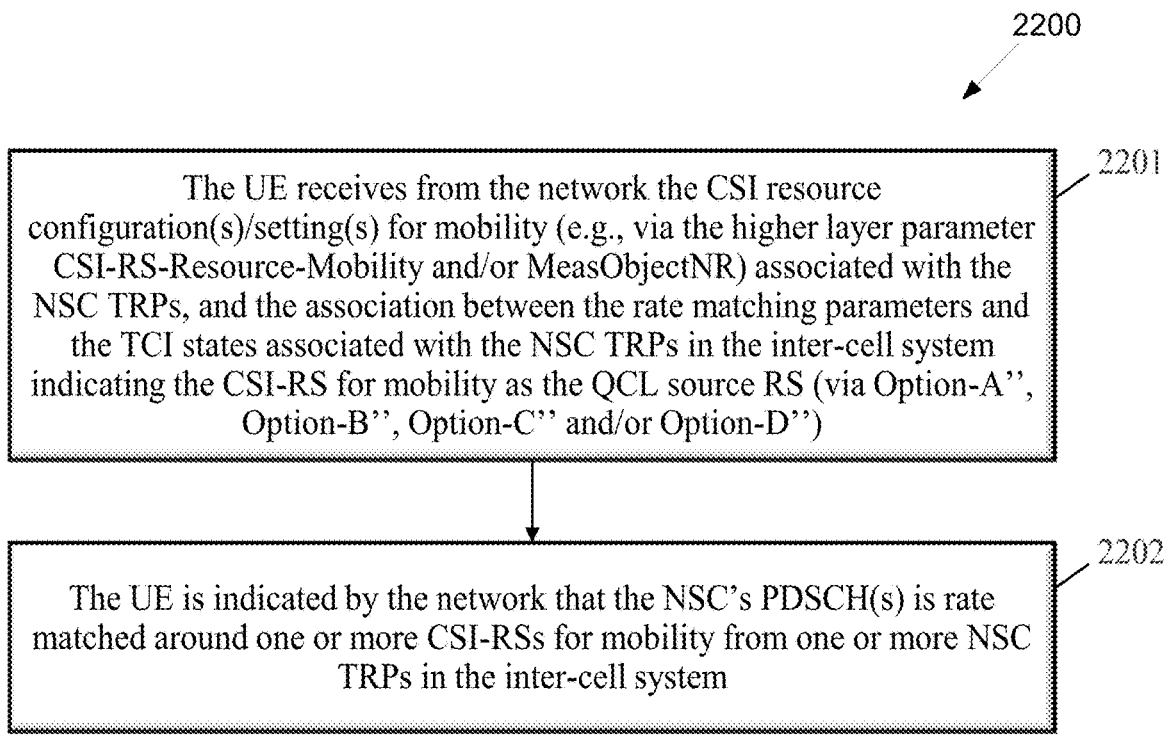
FIG. 22 illustrates another flowchart of UE procedure for rate matching downlink channel(s) according to embodiments of the present disclosure.

FIG. 22 illustrates another flowchart of UE procedure 2200 for rate matching downlink channel(s) according to embodiments of the present disclosure. The UE procedures 2200 as may be performed by a UE (e.g., 111-116 as illustrated in FIG. 1). An embodiment of the UE procedures 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

In FIG. 22, the rate matching mechanism/procedure for the NSC's PDSCH around the CSI-RSs for mobility from the NSC TRP(s) is presented.

In 2201, the UE receives from the network the CSI resource configuration(s)/setting(s) for mobility (e.g., via the higher layer parameter CSI-RS-Resource-Mobility and/or MeasObjectNR) associated with the NSC TRP(s), and the association between the rate matching parameters and the TCI states associated with the NSC TRP(s) indicating the CSI-RS for mobility as the QCL source RS (e.g., via Option-A", Option-B", Option-C" and/or Option-D" discussed above). This indication could be via higher layer (RRC) or/and MAC CE or/and DCI based signaling. This indication could be via a separate (dedicated) parameter or joint with another parameter.

In one example, the UE could receive from the network the CSI resource configuration(s)/setting(s) for mobility (e.g., via the higher layer parameter CSI-RS-Resource-Mobility and/or MeasObjectNR) associated with the NSC TRP(s).

In one example, the UE could receive from the network the CSI resource configuration(s)/setting(s) for mobility (e.g., via the higher layer parameter CSI-RS-Resource-Mobility and/or MeasObjectNR) associated with the NSC TRP(s), and the association between the rate matching parameters and the TCI states associated with the NSC TRP(s) indicating the CSI-RS for mobility as the QCL source RS.

In 2202, the UE is indicated by the network that the PDSCH(s) from the NSC TRP(s) is rate matched around one or more CSI-RSs for mobility from one or more NSC TRPs. This indication could be via higher layer (RRC) or/and MAC CE or/and DCI based signaling. This indication could be via a separate (dedicated) parameter or joint with another parameter.

In one example of Configuration-X, the UE could be configured/indicated by the network that the rate matching parameters for the NSC's PDSCH(s) are determined according to the time-frequency resources configured for the CSI-RSs for mobility in the corresponding CSI resource configuration/setting for mobility (e.g., CSI-RS-Resource-Mobility and/or MeasObjectNR) associated with the NSC TRP(s).

In one example of Configuration-Y, the UE could be configured/indicated by the network that the rate matching parameters for the NSC's PDSCH(s) are determined according to the time-frequency resources configured for the CSI-RSs for mobility in the corresponding CSI resource configuration/setting for mobility (e.g., CSI-RS-Resource-Mobility and/or MeasObjectNR) associated with the NSC TRP(s), the TCI state(s) associated with the NSC's PDSCH(s) and the TCI state(s) associated with the NSC TRP(s) indicating the CSI-RS(s) for mobility of interest as the QCL source RS(s).

For dynamic DCI based signaling, one or more indicators could be incorporated in the DCI, e.g., in the TCI state(s) associated with the NSC's PDSCH(s), that schedules the NSC's PDSCH(s) to indicate to the UE that one or more of Configuration-X and Configuration-Y is used for determining the rate matching parameters for the NSC's PDSCH(s). Other combinations of the time-frequency resources configured for the CSI-RSs for mobility in the corresponding CSI resource configuration/setting for mobility (e.g., CSI-RS-Resource-Mobility and/or MeasObjectNR) associated with the NSC TRP(s), the TCI state(s) associated with the NSC's PDSCH(s) and the TCI state(s) associated with the NSC TRP(s) indicating the CSI-RS(s) for mobility of interest as the QCL source RS(s) than those presented in Configuration-X and Configuration-Y to determine the rate matching parameters for the NSC's PDSCH(s) are also possible.

Also in 2202, the UE could be indicated by the network around which active CSI-RS(s) for mobility (e.g., in form of the CSI-RS resource index in CSI-RS-Resource-Mobility) the NSC's PDSCH(s) is rate matched. This indication could be via higher layer (RRC) or/and MAC CE or/and DCI based signaling. This indication could be via a separate (dedicated) parameter or joint with another parameter. For example, the UE could be higher layer configured (via RRC) signaling) one or more bitmaps indicating the active CSI-RS(s) for mobility (e.g., in form of the CSI-RS resource index in CSI-RS-Resource-Mobility) from the NSC TRP(s). For another example, the UE could receive one or more MAC CE commands activating one or more CSI-RSs for mobility (active CSI-RSs for mobility) out of all the CSI-RSs for mobility configured in the CSI resource configuration(s)/setting(s) for mobility associated with the NSC TRP(s). Yet for another example, the UE could be indicated via dynamic DCI based signaling, e.g., in the TCI state(s) associated with the NSC's PDSCH(s), the active CSI-RS(s) for mobility (e.g., in form of the CSI-RS resource index in CSI-RS-Resource-Mobility) from the NSC TRP(s).

The UE needs to know the time-frequency CSI-RS resource(s) for mobility around which the SC's PDSCHs could be rate matched. Further, the rate matching parameters could also depend on the QCL assumptions of the SC's PDSCHs and the CSI-RS(s) for mobility of interest. The CSI-RS for mobility could be transmitted from the NSC TRP(s). The UE could be configured/indicated by the network via higher layer RRC signaling, MAC CE signaling and/or DCI signaling whether the SC's PDSCHs are rate matched around the NSC's CSI-RSs for mobility.

The time-frequency CSI-RS resource(s) for mobility around which the SC's PDSCHs could be rate matched could be indicated in the corresponding CSI resource configuration(s)/setting(s) for mobility such as in the higher layer parameter CSI-RS-Resource-Mobility and/or MeasObjectNR. The rate matching parameters for the SC's PDSCH around the CSI-RSs for mobility of interest could also depend on the QCL assumptions of the SC's PDSCH and the CSI-RSs for mobility from NSC TRP(s). For the inter-cell operation (e.g., the inter-cell mobility in FIG. 8 and the inter-cell multi-TRP operation in FIG. 9), the QCL source RS for the SC's PDSCH could be a NSC's CSI-RS for mobility. For one or more given CSI-RSs for mobility (and therefore, their associated time-frequency resources and QCL assumptions), there are various means to indicate to the UE the corresponding rate matching parameters for a given SC's PDSCH (and therefore, its associated QCL assumption).

Figure 23:
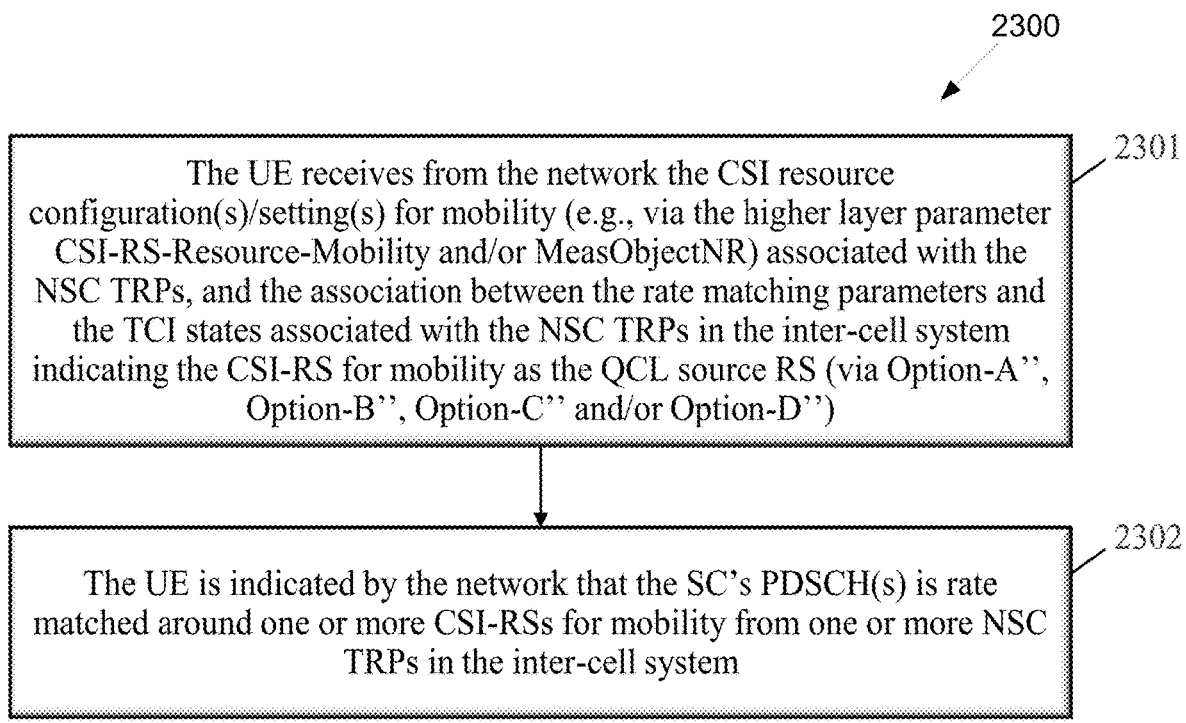
FIG. 23 illustrates another flowchart of UE procedure for rate matching downlink channel(s) according to embodiments of the present disclosure.

FIG. 23 illustrates another flowchart of UE procedures 2300 for rate matching downlink channel(s) according to embodiments of the present disclosure. The UE procedures 2300 as may be performed by a UE (e.g., 111-116 as illustrated in FIG. 1). An embodiment of the UE procedures 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions.

In FIG. 23, the rate matching mechanism/procedure for the SC's PDSCH around the CSI-RSs for mobility from the NSC TRP(s) is presented.

In 2301, the UE receives from the network the CSI resource configuration(s)/setting(s) for mobility (e.g., via the higher layer parameter CSI-RS-Resource-Mobility and/or MeasObjectNR) associated with the NSC TRP(s), and the association between the rate matching parameters and the TCI states associated with the NSC TRP(s) indicating the CSI-RS for mobility as the QCL source RS (e.g., via Option-A", Option-B", Option-C", and/or Option-D" discussed above). This indication could be via higher layer (RRC) or/and MAC CE or/and DCI based signaling. This indication could be via a separate (dedicated) parameter or joint with another parameter.

In one example, the UE could receive from the network the CSI resource configuration(s)/setting(s) for mobility (e.g., via the higher layer parameter CSI-RS-Resource-Mobility and/or MeasObjectNR) associated with the NSC TRP(s).

In one example, the UE could receive from the network the CSI resource configuration(s)/setting(s) for mobility (e.g., via the higher layer parameter CSI-RS-Resource-Mobility and/or MeasObjectNR) associated with the NSC TRP(s), and the association between the rate matching parameters and the TCI states associated with the NSC TRP(s) indicating the CSI-RS for mobility as the QCL source RS.

In 2302, the UE is indicated by the network that the PDSCH(s) from the SC TRP(s) is rate matched around one or more CSI-RSs for mobility from one or more NSC TRPs. This indication could be via higher layer (RRC) or/and MAC CE or/and DCI based signaling. This indication could be via a separate (dedicated) parameter or joint with another parameter.

In one example of Configuration-X', the UE could be configured/indicated by the network that the rate matching parameters for the SC's PDSCH(s) are determined according to the time-frequency resources configured for the CSI-RSs for mobility in the corresponding CSI resource configuration/setting for mobility (e.g., CSI-RS-Resource-Mobility and/or MeasObjectNR) associated with the NSC TRP(s).

In one example of Configuration-Y', the UE could be configured/indicated by the network that the rate matching parameters for the SC's PDSCH(s) are determined according to the time-frequency resources configured for the CSI-RSs for mobility in the corresponding CSI resource configuration/setting for mobility (e.g., CSI-RS-Resource-Mobility and/or MeasObjectNR) associated with the NSC TRP(s), the TCI state(s) associated with the SC's PDSCH(s) and the TCI state(s) associated with the NSC TRP(s) indicating the CSI-RS(s) for mobility of interest as the QCL source RS(s).

For dynamic DCI based signaling, one or more indicators could be incorporated in the DCI, e.g., in the TCI state(s) associated with the SC's PDSCH(s), that schedules the SC's PDSCH(s) to indicate to the UE that one or more of Configuration-X' and Configuration-Y' is used for determining the rate matching parameters for the SC's PDSCH(s). Other combinations of the time-frequency resources configured for the CSI-RSs for mobility in the corresponding CSI resource configuration/setting for mobility (e.g., CSI-RS-Resource-Mobility and/or MeasObjectNR) associated with the NSC TRP(s), the TCI state(s) associated with the SC's PDSCH(s) and the TCI state(s) associated with the NSC TRP(s) indicating the CSI-RS(s) for mobility of interest as the QCL source RS(s) than those presented in Configuration-X' and Configuration-Y' to determine the rate matching parameters for the SC's PDSCH(s) are also possible.

Also in 2302, the UE could be indicated by the network around which active CSI-RS(s) for mobility (e.g., in form of the CSI-RS resource index in CSI-RS-Resource-Mobility) the SC's PDSCH(s) is rate matched. This indication could be via higher layer (RRC) or/and MAC CE or/and DCI based signaling. This indication could be via a separate (dedicated) parameter or joint with another parameter. For example, the UE could be higher layer configured (via RRC signaling) one or more bitmaps indicating the active CSI-RS(s) for mobility (e.g., in form of the CSI-RS resource index in CSI-RS-Resource-Mobility) from the NSC TRP(s). For another example, the UE could receive one or more MAC CE commands activating one or more CSI-RSs for mobility (active CSI-RSs for mobility) out of all the CSI-RSs for mobility configured in the CSI resource configuration(s)/setting(s) for mobility associated with the NSC TRP(s). Yet for another example, the UE could be indicated via dynamic DCI based signaling, e.g., in the TCI state(s) associated with the SC's PDSCH(s), the active CSI-RS(s) for mobility (e.g., in form of the CSI-RS resource index in CSI-RS-Resource-Mobility) from the NSC TRP(s).

In the present disclosure, for Option-A, Option-B, Option-A', Option-B', Option-A", and Option-B" wherein the PDSCH rate matching parameters are determined according to one or more TCI states associated with the SC/NSC TRPs, if the rate matching parameter(s) corresponds to multiple (more than one) TCI states associated with the SC TRP and the NSC TRP(s), the corresponding TCI states could indicate different types of RS such as SSB, CSI-RSs for tracking (TRSs), CSI-RSs for mobility and etc. as the QCL source RS.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
   a transceiver configured to:
      receive an indicator for inter-cell operation;
      receive first information related to one or more first synchronization signal blocks (SSBs) associated with a serving cell physical cell identity (PCI); and
      receive second information related to one or more second SSBs associated with a PCI different from the serving cell PCI; and
   a processor operably coupled to the transceiver, the processor configured to:
      determine, based on the first information, one or more first resources for receiving the one or more first SSBs;
      determine, based on the second information, one or more second resources for receiving the one or more second SSBs;
      determine that a physical downlink shared channel (PDSCH) associated with the PCI different from the serving cell PCI or demodulation reference signals (DMRSs) corresponding to the PDSCH associated with the PCI different from the serving cell PCI are not to be received on the one or more first resources; and
      determine to not monitor, on the one or more first resources, a physical downlink control channel (PDCCH) candidate associated with the PCI different from the serving cell PCI or DMRSs corresponding to the PDCCH candidate associated with the PCI different from the serving cell PCI,
   wherein the one or more first or second resources correspond to at least one of: (1) resource elements (REs), (2) physical resource blocks (PRBs) and (3) orthogonal frequency division multiplexing (OFDM) symbols.

2. The UE of claim 1, wherein the indicator indicates whether to enable or disable the inter-cell operation and is one or more of:
   a radio resource control (RRC) parameter;
   a joint downlink (DL) and uplink (UL) transmission configuration information (TCI) state;
   a joint DL and UL TCI state identity (ID);
   a separate DL or UL TCI state; and
   a separate DL or TCI state ID.

3. The UE of claim 1, wherein:
the first information indicates time domain positions of the one or more first SSBs associated with the serving cell PCI,
the second information indicates time domain positions of the one or more second SSBs associated with the PCI different from the serving cell PCI, and
the time domain positions of the one or more first or second SSBs are provided by one or more bitmaps in a higher layer parameter ssb-PositionInBurst in the first or second information, respectively.

4. The UE of claim 1, wherein the processor is further configured to:
determine that a PDSCH associated with the serving cell PCI or DMRSs corresponding to the PDSCH associated with the serving cell PCI are not to be received on the one or more second resources; and
determine to not monitor, on the one or more second resources, a PDCCH candidate associated with the serving cell PCI or DMRSs corresponding to the PDCCH candidate associated with the serving cell PCI.

5. The UE of claim 1, wherein the processor is further configured to:
determine that the PDSCH associated with the PCI different from the serving cell PCI or demodulation reference signals (DMRSs) corresponding to the PDSCH associated with the PCI different from the serving cell PCI are not to be received on the one or more second resources; and
determine to not monitor, on the one or more second resources, a PDCCH candidate associated with the PCI different from the serving cell PCI or DMRSs corresponding to the PDCCH candidate associated with the PCI different from the serving cell PCI.

6. The UE of claim 1, wherein the processor is further configured to:
measure the one or more first or second SSBs; and
determine, based on the measured one or more first or second SSBs, one or more layer-1 reference signal received powers (L1-RSRPs), one or more layer-1 signal to interference plus noise ratios (L1-SINRs), one or more layer-3 RSRPs (L3-RSRPs), or one or more layer-3 SINRs (L3-SINRs).

7. A base station (BS), comprising:
a processor; and
a transceiver operably coupled to the processor, the transceiver configured to:
transmit an indicator for inter-cell operation;
transmit first information to indicate one or more first resources for one or more first synchronization signal blocks (SSBs) associated with a serving cell physical cell identity (PCI);
transmit second information to indicate one or more second resources for one or more second SSBs associated with a PCI different from the serving cell PCI; and
transmit, on the one or more first or second resources, the one or more first or second SSBs, respectively,
wherein the processor is further configured to determine to not transmit, on the one or more first resources, a physical downlink shared channel (PDSCH) associated with the PCI different from the serving cell PCI or demodulation reference signals (DMRSs) corresponding to the PDSCH associated with the PCI different from the serving cell PCI,
wherein a physical downlink control channel (PDCCH) candidate associated with the PCI different from the serving cell PCI or DMRSs corresponding to the PDCCH candidate associated with the PCI different from the serving cell PCI are not monitored for on the one or more first resources, and
wherein the one or more first or second resources correspond to at least one of: (1) resource elements (REs), (2) physical resource blocks (PRBs) and (3) orthogonal frequency division multiplexing (OFDM) symbols.

8. The base station of claim 7, wherein the indicator indicates whether to enable or disable the inter-cell operation and is one or more of:
a radio resource control (RRC) parameter;
a joint downlink (DL) and uplink (UL) transmission configuration information (TCI) state;
a joint DL and UL TCI state identity (ID);
a separate DL or UL TCI state; and
a separate DL or TCI state ID.

9. The base station of claim 7, wherein:
the first information indicates time domain positions of the one or more first SSBs associated with the serving cell PCI,
the second information indicates time domain positions of the one or more second SSBs associated with the PCI different from the serving cell PCI, and
the time domain positions of the one or more first or second SSBs are provided by one or more bitmaps in a higher layer parameter ssb-PositionInBurst in the first or second information, respectively.

10. The base station of claim 7, wherein:
the processor is further configured to determine to not transmit, on the one or more second resources, a PDSCH associated with the serving cell PCI or DMRSs corresponding to the PDSCH associated with the serving cell PCI, and
a PDCCH candidate associated with the serving cell PCI or DMRSs corresponding to the PDCCH candidate associated with the serving cell PCI are not monitored for on the one or more second resources.

11. The base station of claim 7, wherein:
the processor is further configured to determine not transmit, on the one or more second resources, the PDSCH associated with the PCI different from the serving cell PCI or DMRSs corresponding to the PDSCH associated with the PCI different from the serving cell PCI, and
a PDCCH candidate associated with the PCI different from the serving cell PCI or DMRSs corresponding to the PDCCH candidate associated with the PCI different from the serving cell PCI are not monitored for on the one or more second resources.

12. The base station of claim 7, wherein the one or more first or second SSBs are for determination of one or more layer-1 reference signal received powers (L1-RSRPs), one or more layer-1 signal to interference plus noise ratios (L1-SINRs), one or more layer-3 RSRPs (L3-RSRPs), or one or more layer-3 SINRs (L3-SINRs).

13. A method, comprising:
receiving an indicator for inter-cell operation;
receiving first information related to one or more first synchronization signal blocks (SSBs) associated with a serving cell physical cell identity (PCI);
receiving second information related to one or more second SSBs associated with a PCI different from the serving cell PCI;
determining, based on the first information, one or more first resources for receiving the one or more first SSBs;

determining, based on the second information, one or more second resources for receiving the one or more second SSBs;

determining that a physical downlink shared channel (PDSCH) associated with the PCI different from the serving cell PCI or demodulation reference signals (DMRSs) corresponding to the PDSCH associated with the PCI different from the serving cell PCI are not to be received on the one or more first resources; and determining to not monitor, on the one or more first resources, a physical downlink control channel (PDCCH) candidate associated with the PCI different from the serving cell PCI or DMRSs corresponding to the PDCCH candidate associated with the PCI different from the serving cell PCI, wherein the one or more first or second resources correspond to at least one of: (1) resource elements (REs), (2) physical resource blocks (PRBs) and (3) orthogonal frequency division multiplexing (OFDM) symbols.

14. The method of claim 13, wherein the indicator indicates whether to enable or disable the inter-cell operation and is one or more of:

a radio resource control (RRC) parameter;
a joint downlink (DL) and uplink (UL) transmission configuration information (TCI) state;
a joint DL and UL TCI state identity (ID);
a separate DL or UL TCI state; and
a separate DL or TCI state ID.

15. The method of claim 13, wherein:

the first information indicates time domain positions of the one or more first SSBs associated with the serving cell PCI, the second information indicates time domain positions of the one or more second SSBs associated with the PCI different from the serving cell PCI, and the time domain positions of the one or more first or second SSBs are provided by one or more bitmaps in a higher layer parameter ssb-PositionInBurst in the first or second information, respectively.

16. The method of claim 13, further comprising:

determining that a PDSCH associated with the serving cell PCI or DMRSs corresponding to the PDSCH associated with the serving cell PCI are not to be received on the one or more second resources; and determining to not monitor, on the one or more second resources, a PDCCH candidate associated with the serving cell PCI or DMRSs corresponding to the PDCCH candidate associated with the serving cell PCI.

17. The method of claim 13, further comprising:

determining that the PDSCH associated with the PCI different from the serving cell PCI or demodulation reference signals (DMRSs) corresponding to the PDSCH associated with the PCI different from the serving cell PCI are not to be received on the one or more second resources; and determining to not monitor, on the one or more second resources, a PDCCH candidate associated with the PCI different from the serving cell PCI or DMRSs corresponding to the PDCCH candidate associated with the PCI different from the serving cell PCI.

* * * * *